US012682391B2

(12) United States Patent
Luo et al.

(10) Patent No.: US 12,682,391 B2
(45) Date of Patent: Jul. 14, 2026

(54) DIVISIBLE NON-FUNGIBLE TOKEN AND ITS APPLICATIONS

(71) Applicant: A&C Technology, Inc., Newport Beach, CA (US)

(72) Inventors: Jiayi Luo, Newport Beach, CA (US); Hanhua Jiang, Newport Beach, CA (US); Hao Hsu, Newport Beach, CA (US); Shihao Li, Newport Beach, CA (US); Ye Zhao, Newport Beach, CA (US); Han Qin, Newport Beach, CA (US); Jiayang Qin, Newport Beach, CA (US); Ruiming Wen, Newport Beach, CA (US)

(73) Assignee: A&C Technology, Inc., Newport Beach, CA (US)

( * ) Notice: Subject to any disclaimer, the term of this patent is extended or adjusted under 35 U.S.C. 154(b) by 0 days.

(21) Appl. No.: 18/964,172

(22) Filed: Nov. 29, 2024

(65) Prior Publication Data

US 2025/0095056 A1 Mar. 20, 2025

Related U.S. Application Data

(63) Continuation of application No. PCT/US2023/076893, filed on Oct. 13, 2023.

(Continued)

(51) Int. Cl.
G06Q 30/0645 (2023.01)
G07F 17/00 (2006.01)
(52) U.S. Cl.
CPC ..... *G06Q 30/0645* (2013.01); *G07F 17/0021* (2013.01)

(58) Field of Classification Search
CPC ............... G06Q 20/36; G06Q 30/0645; G06Q 40/0645; G06Q 40/06; G06Q 50/16; G07F 17/0021
See application file for complete search history.

(56) References Cited

U.S. PATENT DOCUMENTS 10,521,780 B1 * 12/2019 Hopkins, III ...... G06Q 20/3825
10,592,979 B2 3/2020 Bell et al.
(Continued)

FOREIGN PATENT DOCUMENTS

JP 2002230303 A 8/2002
KR 20210059589 A 5/2021
WO WO 2024/081917 4/2024

OTHER PUBLICATIONS

A. J. Abualhamayl, M. A. Almalki, F. Al-Doghman, A. A. Alyoubi and F. K. Hussain, "Towards Fractional NFTs for Joint Ownership and Provenance in Real Estate," 2023 IEEE International Conference on e-Business Engineering (ICEBE), Sydney, Australia, 2023, pp. 143-148 (Year: 2023).*

(Continued)

*Primary Examiner* — Maria C Santos-Diaz
(74) *Attorney, Agent, or Firm* — Makoui Law, PC; Ali Makoui

(57) ABSTRACT

A method of renting rentable items using NFTs receives a request from an owner to list a rentable item for rent, causes a distributed ledger system to mint an inheritable rental NFT, and assign the rental NFT to the owner. The method lists the item for rent, receives a request from a renter to rent the item for a first set of time durations, and causes the distributed ledger system to mint a first set of child rental NFTs, where each child rental NFT is associated with a time duration in the first set of time durations, assign the first set of child rental NFTs to the renter, mint a second set of one or more child rental NFTs for the rentable item for time durations (Continued)

other than the first set of time durations, assign the second set of child rental NFTs to the owner, and burn the rental NFT.

20 Claims, 54 Drawing Sheets

Related U.S. Application Data

(60) Provisional application No. 63/503,964, filed on May 24, 2023, provisional application No. 63/415,895, filed on Oct. 13, 2022.

(56) References Cited

U.S. PATENT DOCUMENTS

| | | | |
|---|---|---|---|
| 10,664,923 | B2 | 5/2020 | Lingham et al. |
| 11,068,978 | B1 | 7/2021 | Ferreira |
| 11,263,605 | B2 | 3/2022 | Chalkias |
| 11,295,318 | B2 | 4/2022 | Andon et al. |
| 11,410,039 | B2 | 8/2022 | Katz et al. |
| 11,410,159 | B2 | 8/2022 | Wilson et al. |
| 11,430,066 | B2 | 8/2022 | Doney |
| 11,436,882 | B1 | 9/2022 | Carter |
| 2017/0011460 | A1 | 1/2017 | Molinari et al. |
| 2019/0066206 | A1 | 2/2019 | Marks |
| 2019/0172026 | A1 | 6/2019 | Vessenes et al. |
| 2019/0318433 | A1 | 10/2019 | Mcgee et al. |
| 2020/0192957 | A1 | 6/2020 | Augustine et al. |
| 2021/0256070 | A1 | 8/2021 | Tran et al. |
| 2021/0382966 | A1 | 12/2021 | Shii et al. |
| 2022/0108232 | A1 | 4/2022 | Hardgrave et al. |
| 2022/0114542 | A1 | 4/2022 | Choi |
| 2022/0156737 | A1 | 5/2022 | Wright et al. |
| 2022/0182700 | A1 | 6/2022 | Utile |
| 2022/0198441 | A1 | 6/2022 | Dalton et al. |
| 2022/0261882 | A1 | 8/2022 | Youb et al. |
| 2022/0270421 | A1 | 8/2022 | Carter |
| 2022/0271915 | A1 | 8/2022 | Turner et al. |
| 2023/0281606 | A1* | 9/2023 | Jakobsson ................. H04L 9/50 705/67 |
| 2023/0298117 | A1* | 9/2023 | Barlow .................. G06Q 50/26 705/41 |
| 2024/0070234 | A1* | 2/2024 | Wells .................... H04L 9/3213 |
| 2024/0220964 | A1* | 7/2024 | Doney ................... G06Q 20/40 |

OTHER PUBLICATIONS

I. Abaci and E. E. Ulku, "NFT-based Asset Management System," 2022 International Symposium on Multidisciplinary Studies and Innovative Technologies (ISMSIT), Ankara, Turkey, 2022, pp. 697-701, doi: 10.1109/ISMSIT56059.2022.9932702. (Year: 2022).*

Fairfield J. Property as the law of virtual things. Front Res Metr Anal. Aug. 26, 2022;7:981964. (Year: 2022).*

International Search Report and Written Opinion of the International Searching Authority of the commonly owned PCT/US2023/076893, published as International Publication WO 2024/081917, listed as item #21 above, dated Feb. 28, 2024, 11 pages.

Valastin, Viktor, et al., "Blockchain Based Car-Sharing Platform," International Symposium ELMAR-2019, Sep. 23-25, 2019, Zadar, Croatia, pp. 5-8.

Lesavre, Loic, et al. "Blockchain Networks: Token Design and Management Overview," NIST National Institute of Standards and Technology, U.S. Department of Commerce, Feb. 2021, 84 pages.

* cited by examiner

115
Backend Server(s)

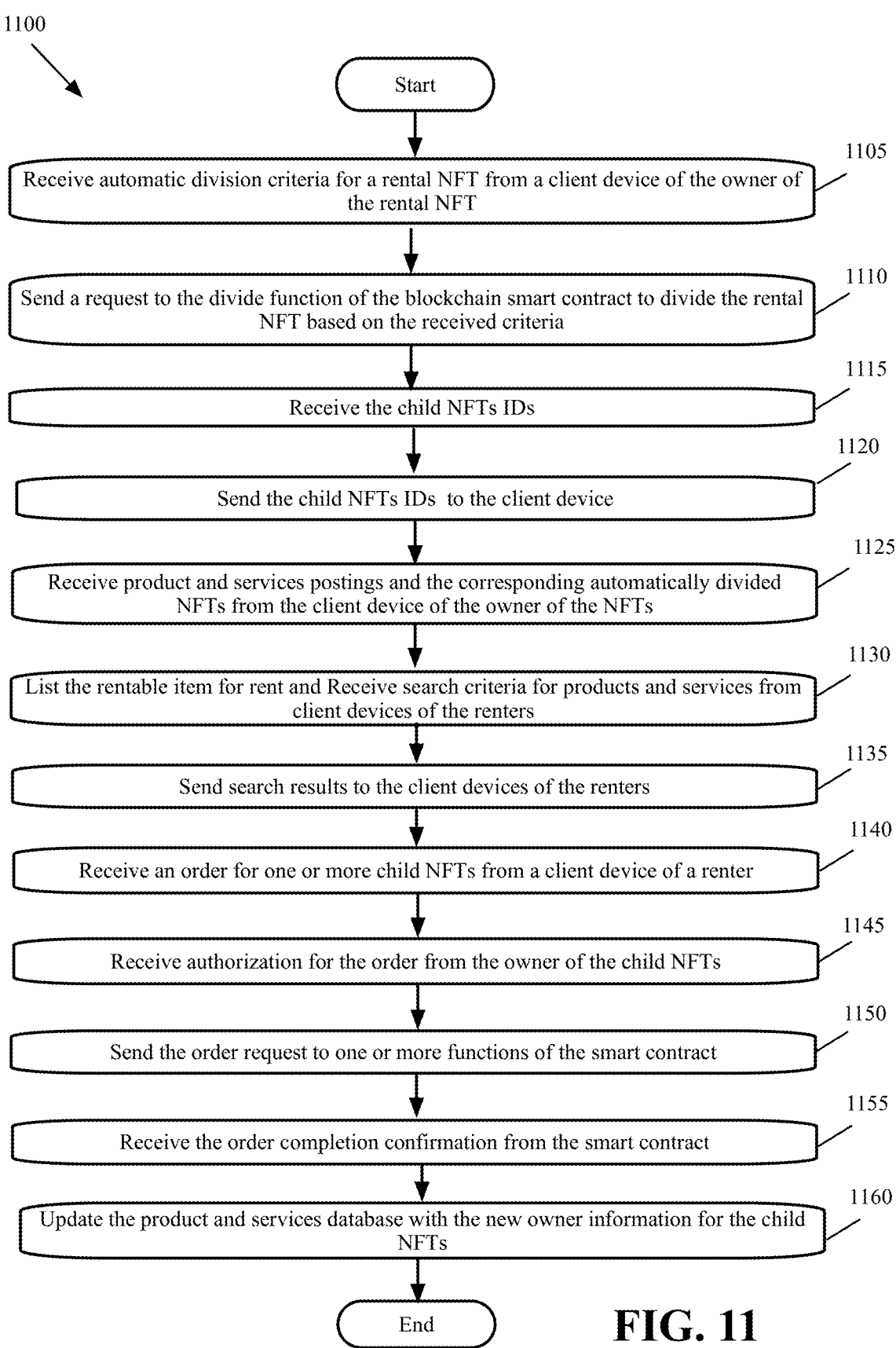

1100

Start

1105
Receive automatic division criteria for a rental NFT from a client device of the owner of the rental NFT 1110
Send a request to the divide function of the blockchain smart contract to divide the rental NFT based on the received criteria 1115
Receive the child NFTs IDs 1120
Send the child NFTs IDs to the client device 1125
Receive product and services postings and the corresponding automatically divided NFTs from the client device of the owner of the NFTs 1130
List the rentable item for rent and Receive search criteria for products and services from client devices of the renters 1135
Send search results to the client devices of the renters 1140
Receive an order for one or more child NFTs from a client device of a renter 1145
Receive authorization for the order from the owner of the child NFTs 1150
Send the order request to one or more functions of the smart contract 1155
Receive the order completion confirmation from the smart contract 1160
Update the product and services database with the new owner information for the child NFTs End

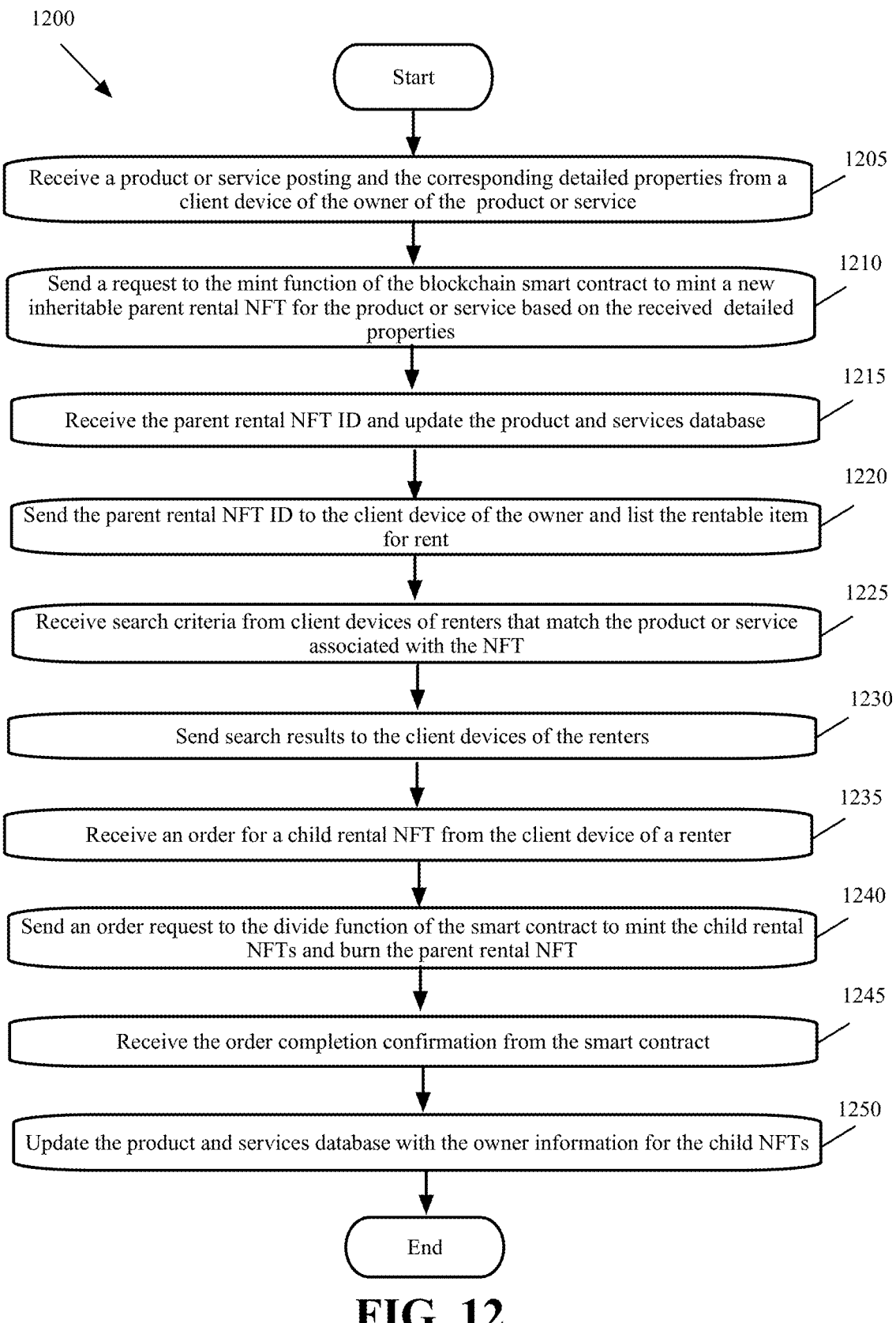

Start

Receive a product or service posting and the corresponding detailed properties from a client device of the owner of the product or service — 1205

Send a request to the mint function of the blockchain smart contract to mint a new inheritable parent rental NFT for the product or service based on the received detailed properties — 1210

Receive the parent rental NFT ID and update the product and services database — 1215

Send the parent rental NFT ID to the client device of the owner and list the rentable item for rent — 1220

Receive search criteria from client devices of renters that match the product or service associated with the NFT — 1225

Send search results to the client devices of the renters — 1230

Receive an order for a child rental NFT from the client device of a renter — 1235

Send an order request to the divide function of the smart contract to mint the child rental NFTs and burn the parent rental NFT — 1240

Receive the order completion confirmation from the smart contract — 1245

Update the product and services database with the owner information for the child NFTs — 1250

End

FIG. 12

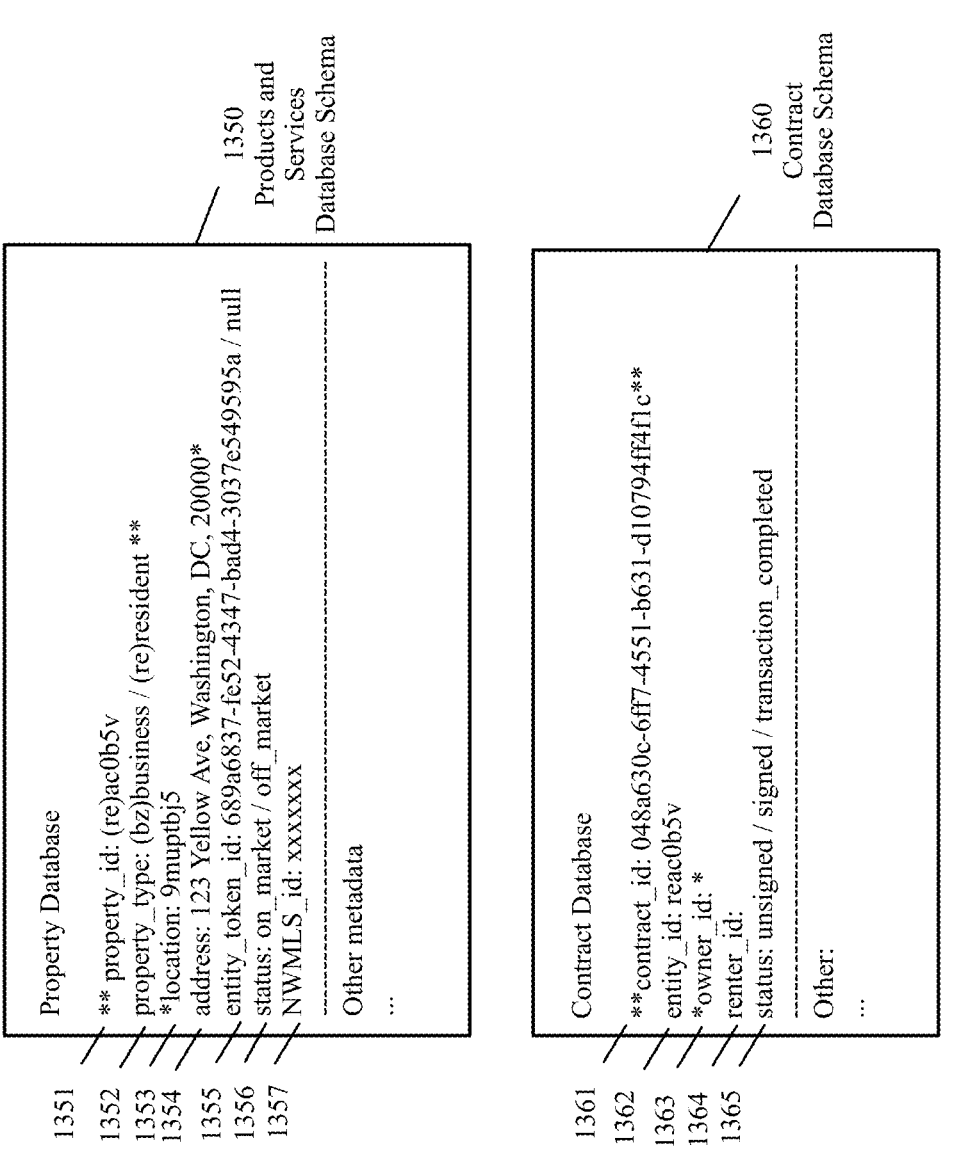

Property Database

1351   ** property_id: (re)ac0b5v
1352   property_type: (bz)business / (re)resident **
1353   *location: 9muptbj5
1354   address: 123 Yellow Ave, Washington, DC, 20000*
1355   entity_token_id: 689a6837-fe52-4347-bad4-3037e549595a / null
1356   status: on_market / off_market
1357   NWMLS_id: xxxxxxx Other metadata
...

1350
Products and
Services
Database Schema

Contract Database

1361   contract_id: 048a630c-6ff7-4551-b631-d10794ff4f1c
1362   entity_id: reac0b5v
1363   *owner_id: *
1364   renter_id:
1365   status: unsigned / signed / transaction_completed Other:
...

1360
Contract
Database Schema

FIG. 13B

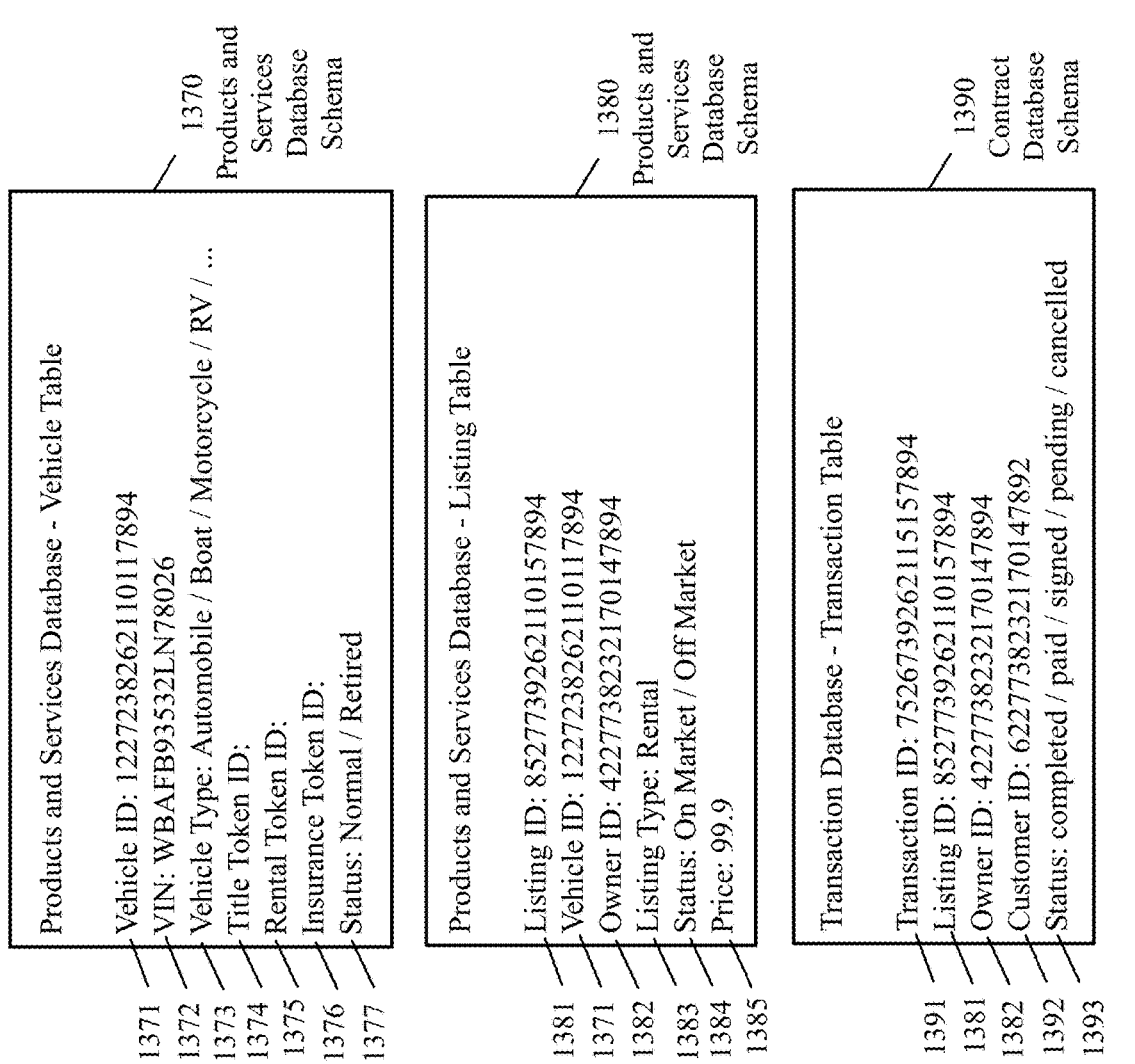

Products and Services Database - Vehicle Table

1371 — Vehicle ID: 1227238262110117894
1372 — VIN: WBAFB93532LN78026
1373 — Vehicle Type: Automobile / Boat / Motorcycle / RV / ...
1374 — Title Token ID:
1375 — Rental Token ID:
1376 — Insurance Token ID:
1377 — Status: Normal / Retired 1370
Products and Services Database Schema Products and Services Database - Listing Table 1381 — Listing ID: 8527739262110157894
1371 — Vehicle ID: 1227238262110117894
1371 — Owner ID: 4227738232170147894
1382 — Listing Type: Rental
1383 — Status: On Market / Off Market
1384 — Price: 99.9

1380
Products and Services Database Schema

Transaction Database - Transaction Table

1391 — Transaction ID: 7526739262115157894
1381 — Listing ID: 8527739262110157894
1382 — Owner ID: 4227738232170147894
1382 — Customer ID: 6227738232170147892
1392 — Status: completed / paid / signed / pending / cancelled
1393

1390
Contract Database Schema

FIG. 13C

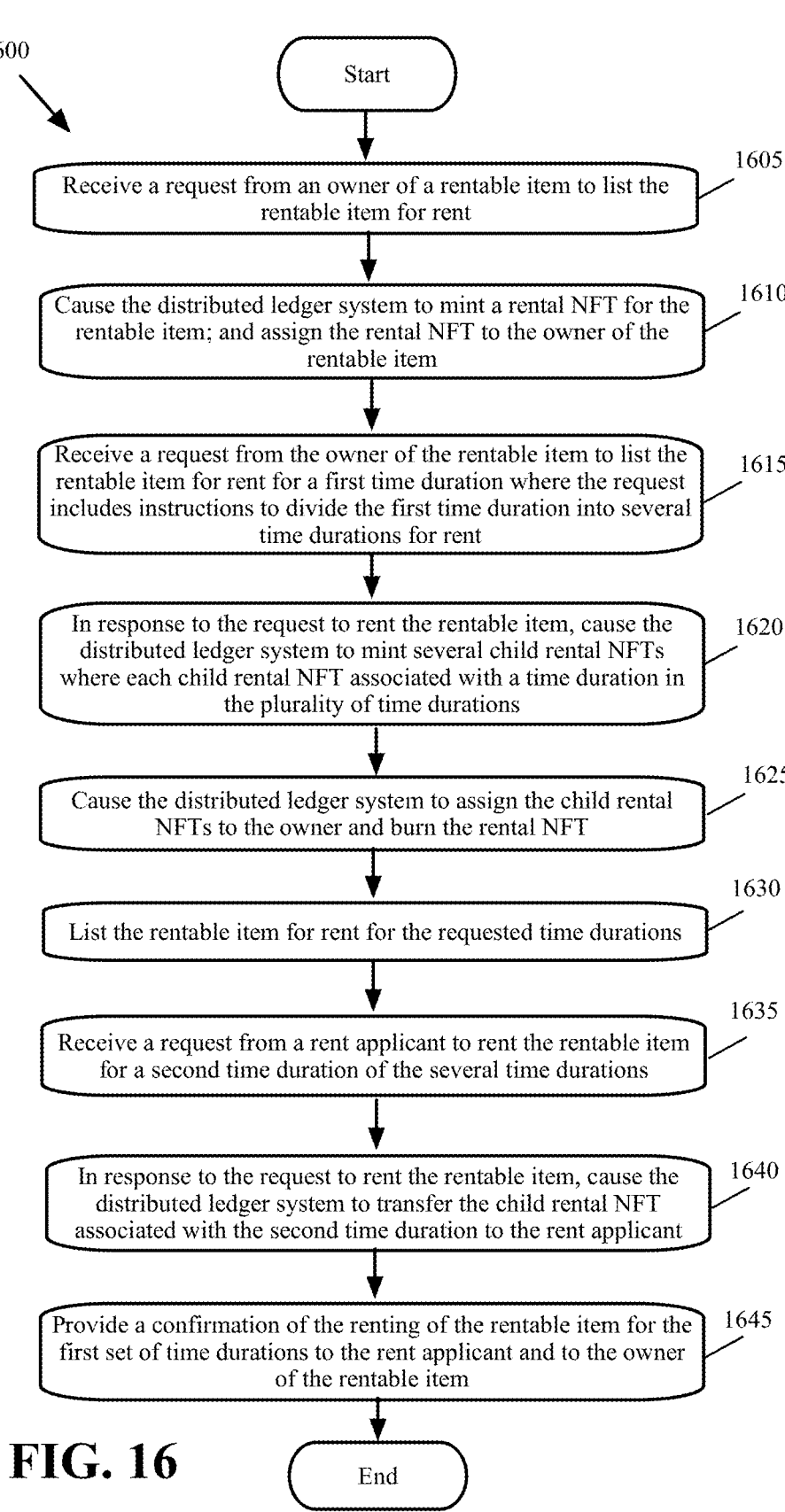

1600

Start

Receive a request from an owner of a rentable item to list the rentable item for rent          1605

Cause the distributed ledger system to mint a rental NFT for the rentable item; and assign the rental NFT to the owner of the rentable item          1610

Receive a request from the owner of the rentable item to list the rentable item for rent for a first time duration where the request includes instructions to divide the first time duration into several time durations for rent          1615

In response to the request to rent the rentable item, cause the distributed ledger system to mint several child rental NFTs where each child rental NFT associated with a time duration in the plurality of time durations          1620

Cause the distributed ledger system to assign the child rental NFTs to the owner and burn the rental NFT          1625

List the rentable item for rent for the requested time durations          1630

Receive a request from a rent applicant to rent the rentable item for a second time duration of the several time durations          1635

In response to the request to rent the rentable item, cause the distributed ledger system to transfer the child rental NFT associated with the second time duration to the rent applicant          1640

Provide a confirmation of the renting of the rentable item for the first set of time durations to the rent applicant and to the owner of the rentable item          1645

End

FIG. 16

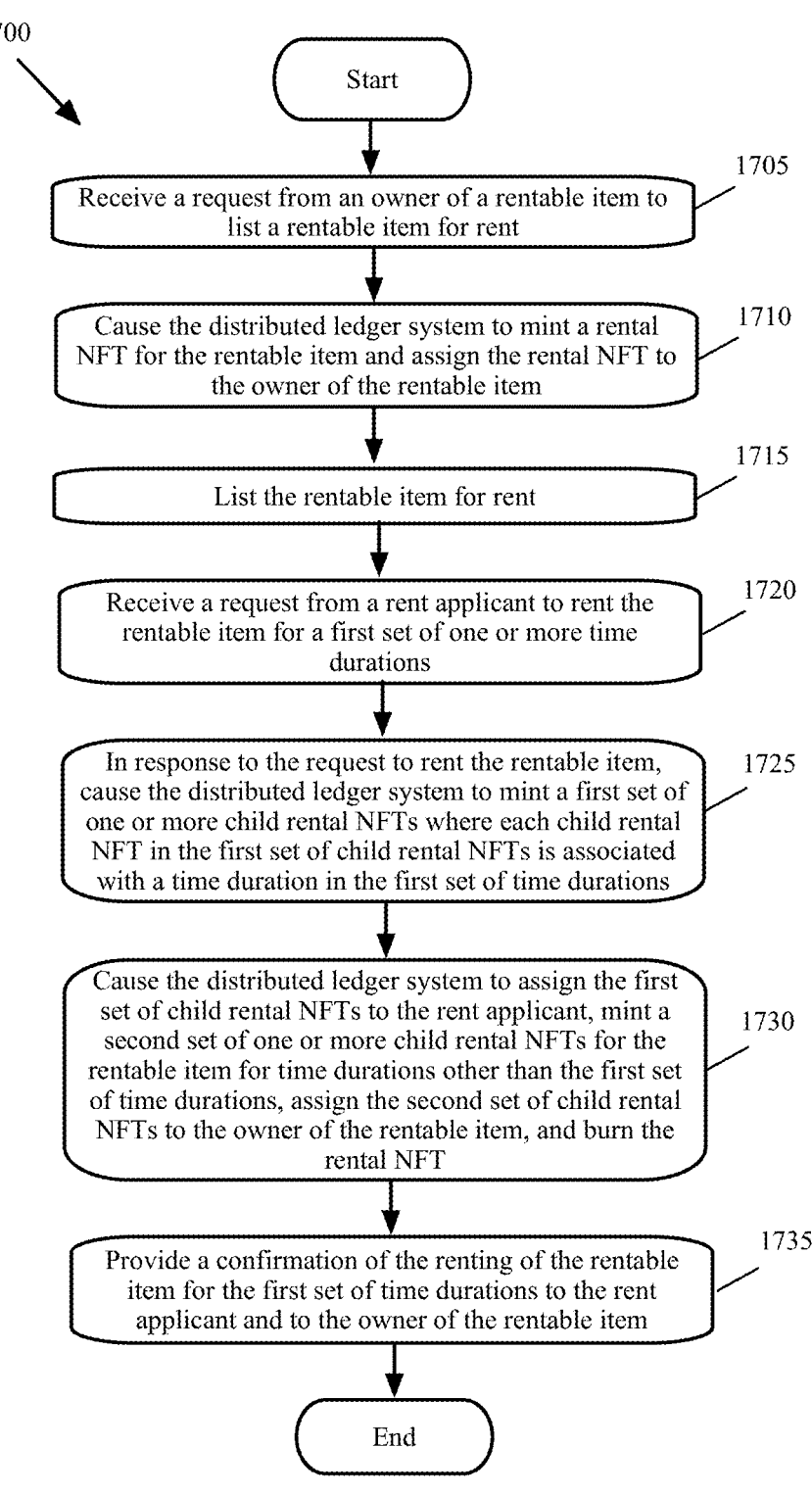

1700

Start

Receive a request from an owner of a rentable item to list a rentable item for rent — 1705

Cause the distributed ledger system to mint a rental NFT for the rentable item and assign the rental NFT to the owner of the rentable item — 1710

List the rentable item for rent — 1715

Receive a request from a rent applicant to rent the rentable item for a first set of one or more time durations — 1720

In response to the request to rent the rentable item, cause the distributed ledger system to mint a first set of one or more child rental NFTs where each child rental NFT in the first set of child rental NFTs is associated with a time duration in the first set of time durations — 1725

Cause the distributed ledger system to assign the first set of child rental NFTs to the rent applicant, mint a second set of one or more child rental NFTs for the rentable item for time durations other than the first set of time durations, assign the second set of child rental NFTs to the owner of the rentable item, and burn the rental NFT — 1730

Provide a confirmation of the renting of the rentable item for the first set of time durations to the rent applicant and to the owner of the rentable item — 1735

End

FIG. 17

DIVISIBLE NON-FUNGIBLE TOKEN AND ITS APPLICATIONS

CLAIM OF BENEFIT TO PRIOR APPLICATIONS

This application is a continuation application of PCT Application PCT/US2023/076893, filed on Oct. 13, 2023, published as WO 2024081917. PCT Application PCT/US2022/029898_claims the benefit of U.S. Provisional Patent Application Ser. No. 63/503,964, filed on May 24, 2023, and U.S. Provisional Patent Application Ser. No. 63/415,895, filed on Oct. 13, 2022. The contents of PCT Application PCT/US2023/076893, published as WO 2024081917; U.S. Provisional Patent Application 63/503,964; and U.S. Provisional Patent Application 63/415,895 are hereby incorporated by reference.

BACKGROUND

Non-fungible token (NFT) is a type of crypto assets that provides proven ownership for physical or non-physical assets backed by the blockchain technology. The NFT typically holds the reference to an identifiable and unique asset, and the transaction history details of the NFT are permanently recorded on the blockchain which are managed by smart contracts.

A smart contract is a program published and executed on the blockchain. It is a collection of codes and data which exist on a specific address on the blockchain that belongs to a specific user or organization. The codes are open sourced to the public and the results are predictable, thus the inputs are determined. The codes are executed automatically and cannot be deterred. Smart contracts execute the terms of an agreement or contract from outside the blockchain and automate the actions that would otherwise be completed by the parties in the agreement, therefore, removing the need for both parties to trust each other.

In addition, due to the nature of the blockchain, it is not possible to modify either the code or the data without notifying other users on the chain. This feature provides fairness to both parties participating in a transaction and prevents data manipulation.

The smart contracts on the blockchain are open to every node and the results of the transactions are predictable and provable by modern cryptography. These characters maintain NFT a desired measure for safe, immutable, and traceable transactions.

BRIEF DESCRIPTION OF THE DRAWINGS

The various embodiments of the present divisible non-fungible token and its applications now will be discussed in detail with an emphasis on highlighting the advantageous features. These embodiments depict the novel and non-obvious divisible non-fungible token and its applications shown in the accompanying drawings, which are for illustrative purposes only. These drawings include the following figures, in which like numerals indicate like parts:

FIG. 11 is a flowchart illustrating an example process for performing the automatic division of rental NFTs, according to various aspects of the present disclosure;

FIG. 12 is a flowchart illustrating an example process for performing the on-demand division of rental NFTs, according to various aspects of the present disclosure;

FIG. 13B is a functional block diagram illustrating database schemas for real property data of a decentralized real property and vehicle rental system, according to various aspects of the present disclosure;

FIG. 13C is a functional block diagram illustrating database schemas for vehicle data of a decentralized real property and vehicle rental system, according to various aspects of the present disclosure;

FIG. 16 is a flowchart illustrating an example process for performing an automatic division of inheritable NFTs by an electronic, according to various aspects of the present disclosure;

FIG. 17 is a flowchart illustrating an example process for performing an on-demand division of inheritable NFTs by an electronic, according to various aspects of the present disclosure;

DETAILED DESCRIPTION

Figure 1A:
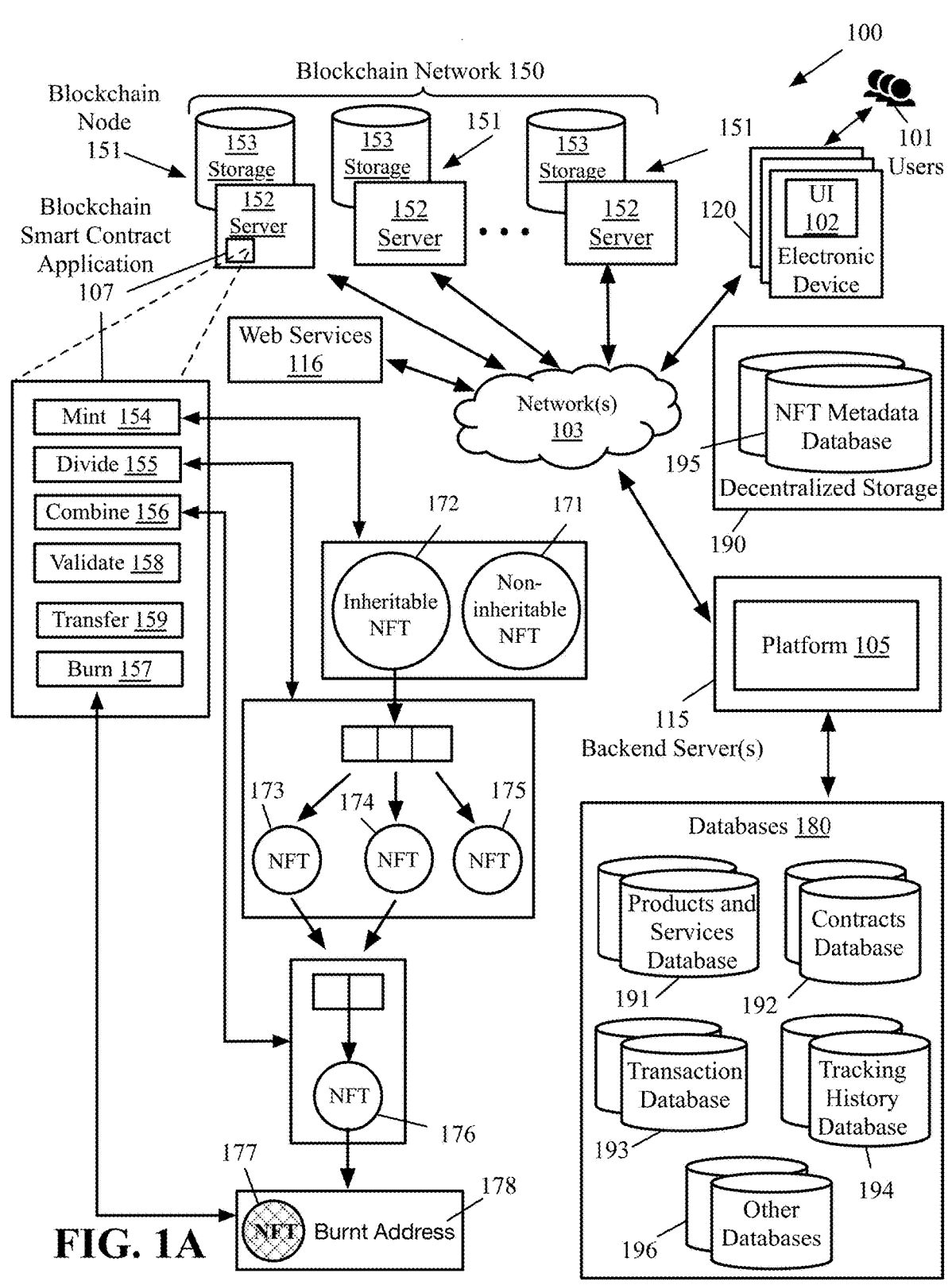
FIG. 1A is a functional block diagram illustrating an example system for handling divisible NFTs, according to various aspects of the present disclosure.

One aspect of the present embodiments includes the realization that NFTs may be easily attached to real-world assets such as real estate, tickets, cars, or virtual items such as pictures and in-game perks. Although these NFTs may possess great values, they may not be affordable to everyone. On the other hand, renting these NFTs for temporary use is much less expensive and may be quite enough for certain users. The partial usage or rental of the NFT is of great need in real world applications. However, NFT rental mechanisms and standards are not well developed or established yet. Current on-chain transactions only allow the transfer of the entire NFT's ownership, which cannot support the complex functions for a rental system. If the system design uses only the off-chain operation for the rental without actual transfer of the NFT ownership during the rental period, it leads to vulnerability from attackers and the renter's ownership during the rental period may not be fully protected and validated. In addition, the ownership of a certain rental NFT during certain time periods may not be put into the market again, unless the renter withdraws or returns the ownership to the user, and then the owner sells the rental NFT again in the market.

Another one of the main problems facing the real estate market today is the restricted access to crucial information about properties, such as their facts and prices. Another challenge is the complexity of real estate transactions, which may be daunting for both renters and landlords, particularly those new to the market. Real estate properties have their unique characteristics, such as multi-family or duplex structures that may be rented out by rooms or blocks. The vehicle rental market faces similar issues and challenges.

Some of the present embodiments solve the aforementioned problems by providing a mechanism to allow generating small NFTs (child NFTs) which belong to the original NFT (parent NFT) and establishing the NFT rental standards. This mechanism grants child NFT owners some benefits related to the parent NFT during the period of the child NFTs' effective time or space, such as the right to use the reference object of the parent NFT. The present embodiments provide a trustworthy and applicable method for NFT rental. The child NFTs cannot have overlapped time or space properties with each other and with the parent NFT. As such, after the child NFTs are minted, the parent NFT is burnt to avoid overlap properties with the child NFTs.

Some of the present embodiments provide a parent-and-child NFT mechanism that may be applied to existing peer-to-peer product and service rental applications such as housing or vehicle rental management systems. These embodiments utilize parent-and-child NFTs to build a trustworthy and applicable peer-to-peer renting management system without any middlepersons. The smart contract, on the other hand, is the oracle which defines the transfer role and executes the program to handle all operations in the rental management system. In the present embodiments, renters may search, rent, or bid for products and owners may rent or confirm bids from the system of the present products without any middlepersons involved.

Some of the present embodiments provide a decentralized transaction system powered by blockchain technology. By eliminating intermediaries such as agents and brokers, the decentralized transaction platforms of the present embodiments leverage the transparency offered by blockchain to provide valuable information such as transaction history and market statistics to both renters and owners. Empowering users with direct access to this data eases the pain of purchasing and renting a home.

Simplifying the complexity of real estate transactions could greatly benefit all parties involved. By leveraging the unique feature of NFTs that they are non-replaceable and impossible to replicate, they may serve as a secure and tamper-proof representation of real estate properties, ultimately replacing traditional titles as a proof of ownership.

The decentralized transaction platform of the present embodiments enables NFTs to be divided by a property's specific features, such as by time and space. By allowing renters to purchase an NFT representing a specific space (e.g., a specific unit or room) and available time within a property, the platforms of the present embodiments simplify the rental process and provide greater flexibility for both landlords and tenants. The use of the NFTs becomes a valuable tool for the real estate market, transforming the way the properties are rented and managed.

Some of the present embodiments use NFTs in the real estate industry. Some of the present embodiments provide a new method for dividing NFTs in the real estate transaction. The method has the ability to divide a single NFT into multiple NFTs, each of which serves as a subset of their parent, containing a portion of its parent NFT in terms of property access authorization. This approach to NFT division allows for more efficient and effective transfer of property ownership and the right of use, as well as creating new opportunities for real estate ownership and investment. The use of blockchain technology and NFTs in real estate transactions provides a novel solution to the challenges faced by traditional real estate transactions, allowing for greater transparency, cost savings and accessibility for all parties involved.

The platform of the present embodiments seamlessly integrates innovative hardware components, such as smart locks and cameras, to further enhance the overall user experience and ensure maximum security. The platform provides for flexibility through the open sourcing of application programing interfaces (APIs) for the built-in system components and services. The platform also offers a component marketplace, allowing for easy sharing and utilization of community plugins, further expanding the versatility and customization options for all users.

Another aspect of the present embodiments includes the realization that in the realm of vehicle transactions, the integrity of records and histories is of utmost importance, and decentralization is the key to maintaining that integrity. The existing centralized service providers often lack transparency, making it challenging to access essential information.

Some of the present embodiments solve the aforementioned problems by providing a decentralized peer-to-peer marketplace for vehicle transactions. By leveraging the blockchain technology, the platform provides more valuable information, such as comprehensive vehicle histories and market analytics. The usage of blockchain technology mitigates the pain points people face when purchasing or leasing a vehicle.

The decentralized approach of the present embodiments ensures records of repairs, maintenance, accidents, and other incidents remain unalterable once onboarded, eliminating the potential for forgery or modification. Additionally, the rental histories, including the renters, owners, and price, may be disclosed, providing complete transparency to all parties involved.

Some of the present embodiments utilize NFTs in the industry of automobiles and other vehicles. The decentralized platform of the present embodiments simplifies and automates the rental operation. More beneficially, it is possible to eliminate agents or intermediaries within the transaction to lower the cost for both parties.

The platform of the present embodiments may have smart hardware units, such as the smart vehicle key and tracking devices, integrated in order to provide a seamless experience for car rental. Consequently, users may easily have access to the vehicle they rent without the necessity to arrange a trip to the counter and pick up the key. Individual owners and rental companies may track the position of the vehicle effortlessly to avoid the possibility of violations and abuses in use when the vehicle is in customer's possession.

As a result, the decentralized vehicle transaction platform brings value to clients by simplifying the renting processes. The renting process may be performed by swapping ownership of the rental NFTs attached to vehicles. The rental procedure could be abstracted to be a simple division of NFT by authorized time and the NFT may also be the key to the vehicle directly without any hassle to get in touch with the other party.

The remaining detailed description describes the present embodiments with reference to the drawings. In the drawings, reference numbers label elements of the present embodiments. These reference numbers are reproduced below in connection with the discussion of the corresponding drawing features.

I. Divisible NFTs

Figure 1B:
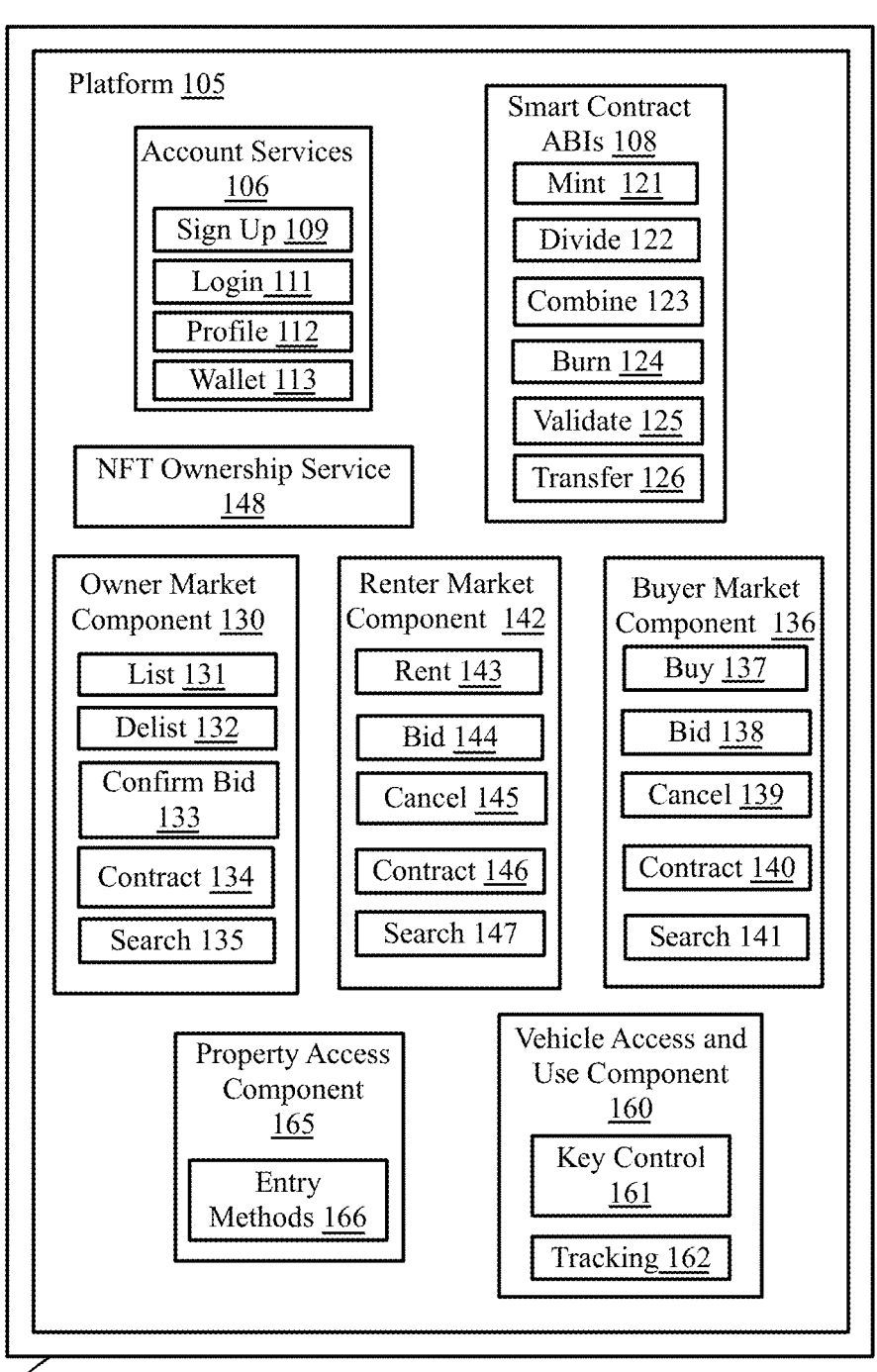
FIG. 1B is a functional block diagram illustrating examples of some of the components of the platform of FIG. 1A, according to various aspects of the present disclosure.

FIG. 1A is a functional block diagram illustrating an example system 100 for handling divisible NFTs, according to various aspects of the present disclosure. FIG. 1B is a functional block diagram illustrating examples of some of the components of the platform 105 of FIG. 1A, according to various aspects of the present disclosure.

As shown in FIG. 1A, the system 100 may include a platform 105, several electronic devices 120, and a blockchain network 150. The platform 105, in some embodiments, may be implemented on one or more electronic devices, such as the backend server 115. The backend server 115 may have access to one or more databases 191-193.

The users 101 may be owners or renters of products and services and may communicate with the web services 116 and the backend server 115 through user interfaces (UIs) 102 on their electronic devices 120. The users 101 may access different services of the platform 105 through the UI 102 on their electronic devices 120. The web services 116 may access the services of the platform 105 to provide different services to the users 101.

In some cases, where the products and services are real property, the owners may also function as landlords who may want to rent out their properties. The renters are tenants who are willing to pay for the right to occupy the house. The terms lease and rent in the present disclosure are used interchangeably herein to refer to a contract between a landlord and a tenant that outlines the terms and conditions of the tenancy, such as the duration of the tenancy, the amount of the rent, and the rights and duties of the landlord and the tenant. The terms real property, real estate, and property are used interchangeably herein to refer to land and any structure attached to it. The terms are used to refer to residential or commercial properties and may include houses, rooms, condominiums, apartments, buildings, shops, etc.

Blockchain networks provide a distributed, immutable ledger. The blockchain networks may be public, private, or government blockchains. Examples of blockchain networks include Bitcoin, Ethereum, IBM Blockchain, Corda, etc. A blockchain network provides an infrastructure that allows applications to access ledger and smart contract services. Smart contracts may be used to originate transactions, which are transmitted to each node of the blockchain network and recorded on their copy of the ledger.

With reference to FIG. 1A, the blockchain network 150 may be a decentralized network of blockchain nodes 151. Each blockchain node 151 may include at least one server 152 and storage media 153. The nodes 151 of the blockchain network 150 may communicate with each other through one or more networks 103. The network(s) 103 may include the Internet, user's networks (e.g., Wi-Fi, Ethernet, etc.), telecommunication networks (e.g., public switched telephone networks (PSTNs), packet-switched networks, etc.), networks of servers and backend devices, etc.

The blockchain smart contract application 107 may run on any of the blockchain nodes 151. For example, the blockchain smart contract application 107 may run on a virtual machine (VM) implemented on any of the nodes 151. A VM is an emulation (or software implementation) of a particular computer system.

The blockchain smart contract application 107 may be accessed through an application binary interface (ABI), such as the blockchain smart contract ABIs 108 of FIG. 1B. An ABI is an interface between two program modules, one of which is often at the level of machine code. The interface is the de facto method for encoding and decoding data into and out of the machine code. For example, in the Ethereum blockchain network, programmers may use ABIs to encode Solidity contract calls for the Ethereum virtual machine (EVM). The programmers may use ABIs to read the data out of transactions. An ABI acts as a function selector, defining the specific functions that may be called to a smart contract for execution.

With reference to FIGS. 1A and 1B, when a platform 105 function (e.g., the list function 131 of FIG. 1B) requires a smart contract function (e.g., the mint function 154 of FIG. 1A), the platform 105 function may trigger a call to the corresponding ABI call (e.g., to the mint ABI 121 of FIG. 1B) on the platform 105. The ABI call may then execute a corresponding ABI function (e.g., the mint function 154) in the blockchain smart contract application 107. When the function executes, it may emit events. These events are permanently stored on the blockchain. Meanwhile, the platform 105 may always listen to the blockchain events and if the corresponding event is emitted, the platform 105 may get the results and may provide the required response.

In the example of the blockchain smart contract application 107 of FIG. 1A, the smart contract application functions mint 154, divide 155, combine 156, burn 157, validate 158, and transfer 159 may be selected by the corresponding mint 121, divide 122, combine 123, burn 124, validate 125, and transfer interfaces of the ABIs 108. The ABIs 108 encode the function signatures and variable declarations into information that allows the VM that implements the blockchain smart contract application 107 to know which function is to be executed and what parameters are passed to the function. The blockchain smart contract application 107 may be configured to perform transactions for renting or purchasing different products and services such as, real properties, vehicles, etc.

With reference to FIG. 1B, the platform 105 may include one or more functional components that may be implemented by machine-readable instructions. The functional components, in some embodiments, may include the account services component 106, the owner market component 130, the buyer market component 136, the renter market component 142, and the smart contract ABIs 108. The platform 105 may include the blockchain smart contract ABIs 108, described above.

The account services component 106 may provide backend services for account management services and may include a sign-up function 109 for signing up an account, a log in function 111 for logging into an existing account, a profile function 112 for checking and updating the contents of the user's account such as name, address, phots, linked payment methods, credit profile, and a wallet (or wallet connect) function 113 for connecting to a digital wallet (e.g., to pay, to make a payment, or to provide signature).

The owner market component 130 may be configured for the owners or the products and services to rent or sell their products and services. The owners may list or delist their products and services for renting or selling through list component 131 and delist component 132, respectively. If the products and services is listed and one or more renters or buyers have bid for the products and services, the owner may confirm one of the bids through confirm bid component 133. The contract component 134 may be configured for the house owners to sign, receive, and update the contract they may generate when they sell or rent out their products and services. The search component 135 may be configured for the owners to retrieve information regarding their products and services. The search component 135 may take in searching keywords and filters from the owners and may return with a list of results that match the search criteria The renter market component 142 may be configured for the renters to rent products and services. The renters may pay, for example, and without limitations, with cryptocurrency to rent real properties through the rent component 143. The renters may bid a price or cancel bids through the bid component 144 and the cancel bid component 145, respectively. The contract component 146 may be configured for the renters to sign, receive, and update the contracts when they rent products and services. The search component 147 may be used by the renters to search for products and services to rent. The search component 147 may include different types of searches. For example, the renters may search by time, by location, by price, by products and services owners, etc. The renters of real property may also search for one or more rooms in a larger property. The search component 147 may take in searching keywords and filters from the renters and may return with a list of results that match the search criteria.

The buyer market component 136 may be configured for the buyers to buy the properties they want. The buyers may buy the properties through the buy component 137. The buyer may bid a price for buying the house through the bid component 138. The buyer may cancel an existing bid when needed through the cancel bid component 139. The contract component 140 may be configured for the renters to sign, receive, and update the contracts when they buy properties. The search component 141 may be configured for the buyers to search for the properties and all corresponding data they want to buy. The search component 141 may take in searching keywords and filters from the buyers and may return with a list of results that match the search criteria. The NFT ownership service component 148 may be used by other components of the platform 105 (e.g., with the smart contract application 107) to transfer the NFTs which represent the title and legal ownership or use for the buyer or renter after a transaction.

The property access component 165 may include an entry method component that provides different access methods (e.g., facial recognition, fingerprint, voice, 3D face point cloud, quick-response code (QR code), bar code, near field communication (NFC), etc.) to a real property. A face point cloud is a set of data point in a three-dimensional (3D) coordinate system to represent the 3D geometry information of a person's face. The platform 105 may include a vehicle access and use component that is tailored to vehicle transactions. The vehicle key component 161 may be used for authorizing or deauthorizing a key's ability to provide entry to a vehicle and/or to turn on the vehicle engine under various circumstances. The tracking component 162 may handle the tracking device, which is essential for a moving property like the vehicle, providing the owner and renter the ability to keep track of rental vehicles.

The system 100, in some embodiments, may provide several smart contract services: mint, divide, combine, burn, validate, and transfer. The mint function 154 may be configured to generate two types of NFTs according to the instruction received from the electronic devices 120: non-inheritable NFTs 171 and inheritable NFTs 172. An NFT 171 that is non-inheritable may not be used to generate child NFTs. The non-inheritable NFTs, such as the NFT 171, may be used for permanent certifications such as driver licenses that cannot be divided into, or combined with, other driver licenses.

An inheritable NFT 172 may be used as a parent NFT to generate child NFTs that inherit nonoverlapping portions of different properties such as time and space from the parent NFT. As shown, the divide service 155 of the smart contract application 107 may handle the division work according to the instructions received from the electronic devices 120. In the example of FIG. 1A, the properties of the inheritable NFT 172 may be divided by time into three portions for the three inheritable child NFTs: NFT 173, NFT 174, and NFT 175.

The combine function 156 of the smart contract application 107 may do the opposite operation by merging two conflict-free inheritable NFTs 173 and 174 into one new inheritable NFT 176 and discarding the NFTs 173 and 174. The burn function 157 of the smart contract application 107 may be used to disable the NFTs which may not be used again. The burn function 157 may alter the internal address of burnt NFTs 177 to a vacant burnt address 178 which is inaccessible. Each time an NFT is processed, the validate function 158 of the smart contract application 107 may perform NFT validation, ensuring the integrity of the NFT. The transfer function 159 may be used to transfer the ownership of an existing NFT from one owner to another.

The newly minted NFTs may be sent to the blockchain network 150 while the corresponding metadata may be stored in the NFT metadata database 195 in a decentralized storage 190. The decentralized storage 190 may span across multiple servers or multiple locations, such as servers that are situated in different physical places. Data stored in a decentralized storage is accessible just as if it was stored locally, from any device and from anywhere on the network. An example of a decentralized storage is the Interplanetary File System (IPFS).

It should be noted that storing metadata in a decentralized storage instead of directly posting the NFT onto the blockchain is to avoid blockchain fees. Storing large NFTs, such as, audio, image or video files on blockchain may cost a large blockchain fee. Instead, the decentralized database 190 is much cheaper. Some embodiments may use a communication protocol, such as, for example, and without limitations, BitTorrent to host and receive NFT. BitTorrent is a communication protocol for peer-to-peer file sharing, which enables users to distribute data and electronic files over the Internet in a decentralized manner. Once the NFT has been stored, the NFT's address is uniquely related to the content of the NFT body using a hash function. This feature ensures that the content of the file cannot be altered without changing the address.

The system 100 may include several databases 180, which may be tailored to meet various applications and may store various types of data. In some embodiments, the products and services database 191 may store information related to products and services for which inheritable NFTs (such as NFTs 172-176) may be defined. For example, an inheritable rental NFT may be defined for a product or service, which may be used as the parent NFT to generate child NFTs that inherit nonoverlapping time and/or space portions of the parent product or service. The owner of the product or service may use the owner market component 130 functions, such as list 131, delist 131, confirm bid 133, contract 134, and search 135 to list the product or service for rent for certain time durations and/or spaces. The renters may use the renter market component 142 functions, such as rent 143, bid 144, cancel 145, contract 146, and search 147 to search for, bid, and rent the product or service for one or more time durations and/or spaces.

The product and services may include rentable items that may be divided into units of space or time to rent. The rentable items may include tangible products. For example, the rentable items may include products such as real property (e.g., houses, offices, buildings, stadiums, theaters, event venues, etc.) that may be divided by space (e.g., by rooms, by floors, by sections, etc.) and/or by time duration (e.g., by hours, days, months, years, etc.) to rent.

The rentable items may include products such as vehicles (e.g., cars, vans, sport utility vehicles (SUVs), airplanes, drones, helicopters, boats, ships, all-terrain vehicle (ATVs), motorcycles, bicycles, etc.) that may be divided by time duration (e.g., by hours, days, months, years, etc.) to rent. The rentable items may include any other product that may be divided by time duration or space to rent. For example, the rentable items may include properties such as tools, sporting equipment, construction equipment, etc., that may be divided by time duration to rent.

The rentable items may include intangible services. The rentable items may include any intangible services that may be divided by time duration to rent. For example, the rentable items may include the services of one or more professional or skilled workers such as consultants, a contractors, inspectors, appraisals, bookkeepers, information technology (IT) professionals, maids, etc., whose services may be rented for one or more time durations. The rentable items may include the services of a group of movers, whose time may be rented for moving furniture or equipment.

The products and services may include products whose ownership shares may be divided. For example, products and services may include artwork or collectible items whose ownership rights may be broken into shares. An inheritable NFT may be defined for the ownership of the artwork or collectible items, which may be used as a parent NFT to generate child NFTs that inherit nonoverlapping portions of ownership of the product. The child NFTs may then be sold to buyers who may use the buyer market component 136 of the platform 105 to search, bid, and buy the child NFTs using the buy 137 bid 138, cancel 139, contract 140, and search components of the buyer market component 136. Another example of a product whose ownership may be divided is a series of rare books, magazines, etc., for which an inheritable NFT may be defined. The inheritable NFT may then be used to generate child NFT for each book, magazine, etc., in the series, which may then be individually sold.

The products and services database 191 may include pointers (e.g., as described below with reference to FIGS. 3A-3C) to the NFT metadata stored in the NFT metadata database 195 including their identification, type, location, status, and other relevant data. The products and services database 191 may store the current and historical listings of real properties, vehicles, etc.

In some embodiments, the contract database 192 may store records of contracts and their respective statuses. The transaction database 193 may store the details of every transaction, including new purchases, sales, as well as rentals of real properties, vehicles, etc. The tracking history database 194 may be used for vehicles and may store the record of the vehicle location history for a certain period of time that may be specified by the user. Other databases 196 may include databases for storing data related to vehicles (as described further below) and optional databases that may be utilized for customized components, providing increased flexibility for individual developers.

Figure 2:
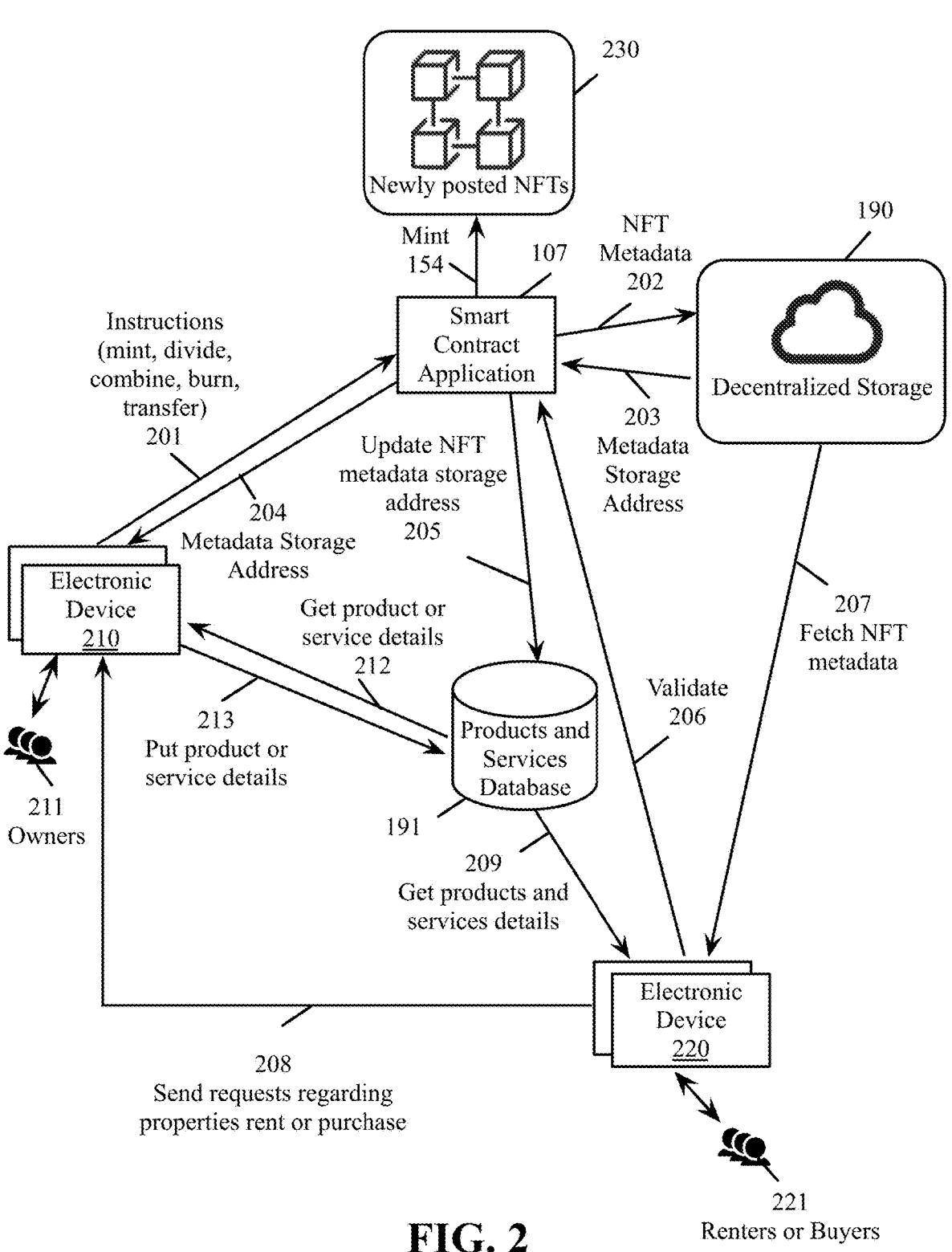
FIG. 2 is a functional block diagram providing a conceptual overview of the system structure, request flow, and interactions between components related to the NFTs, according to various aspects of the present disclosure.

FIG. 2 is a functional block diagram providing a conceptual overview of the system structure, request flow, and interactions between components related to the NFTs, according to various aspects of the present disclosure. The figure conceptually shows the actions taken by the owners of products or services and renters or buyers of the products and services. It should be noted that all actions of the owners, buyer, and renters are performed by communicating with the backend server(s) 115 through their corresponding electronic devices 120 as shown in FIG. 1A. For example, the products and service requests 208 that are conceptually shown in FIG. 2 to be from the renters/buyers' electronic devices 220 to the owners' electronic devices 210 are sent from the renters/buyers' electronic devices 220, through the network(s) 103 and the backend server(s) 115 of FIG. 1A, to the owners' electronic devices 210. As another example, the instructions 201 that are conceptually shown from the owners' electronic devices 210 to the smart contract application 107 are sent from the owners' electronic devices 210, through the network(s) 103 and the backend server(s) 115, to the smart contract application 107. These intermediate steps are not shown in FIG. 2 for clarity.

With reference to FIG. 2, the instructions 201 of NFT operations may originally come from the owners' electronic devices 210, which may be sent over to the smart contract applications 107 via a request call. The smart contract application 107 may trigger the corresponding services (e.g., the mint 154, divide 155, combine 156, burn 157, validate 158, and transfer 159 functions of FIG. 1A) to handle the incoming requests. The newly minted NFTs 230 may be sent to the blockchain (e.g., the blockchain network 150 of FIG. 1A) while the corresponding metadata may be stored (as shown by 202) in the decentralized storage 190 (e.g., in the NFT metadata database 195 of FIG. 1A).

The smart contract application 107 may return (as shown by 203 and 204) the storage address of the metadata to the owner's electronic device 210. The owner's electronic device may then update (as shown by 211) the products and services database 191 with the product or service details.

The smart contract application 107 may update (as shown by 205) the NFT metadata storage address of a product or service in the products and services database 191. The owners' 211 electronic devices 1610 may get (as shown by 212) product or service details from the products and services database 191. The owners' 211 electronic devices 1610 may put (as shown by 213) the properties details into the products and services database 191.

From the renters or buyers 221 point of view, they may find and capture existing products or services to rent or buy (as shown by 209) or may send new order requests (as shown by 208) to the owners' electronic devices 210, requesting, for example, a newly proposed time frame of a rent or closing date of a purchase contract. The owners' electronic devices 210 may request one or more new NFTs to be generated if the renter's or buyer's request has been approved and save additional records to the database. If the renters or buyers 221 find a product or service they are interested in, a validation call to the smart contract may be performed (as shown by 206) to verify if the specific product or service requested is in fact available. The renters or buyers 's electronic devices 220 may get properties' details from the products and services database 191 (as shown by 209). The renters or buyers' electronic devices 220 may fetch NFT metadata (as shown by 207) from the decentralized storage 190 by using the address retrieved from the real property database 191.

Figure 3A:
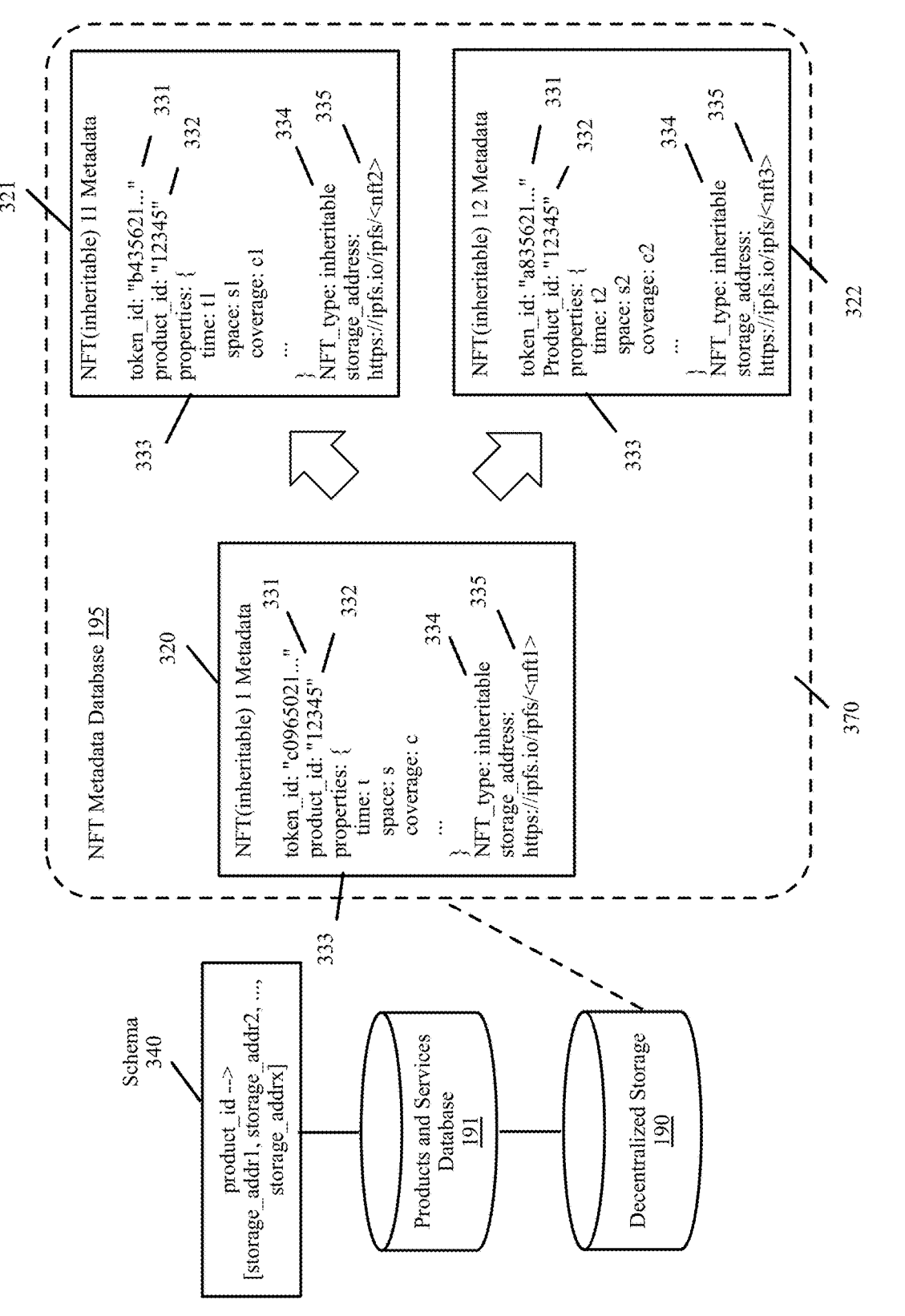
FIG. 3A is a functional diagram illustrating an example of metadata that is stored for a divide operation performed on an inheritable NFT, according to various aspects of the present disclosure.
Figure 3B:
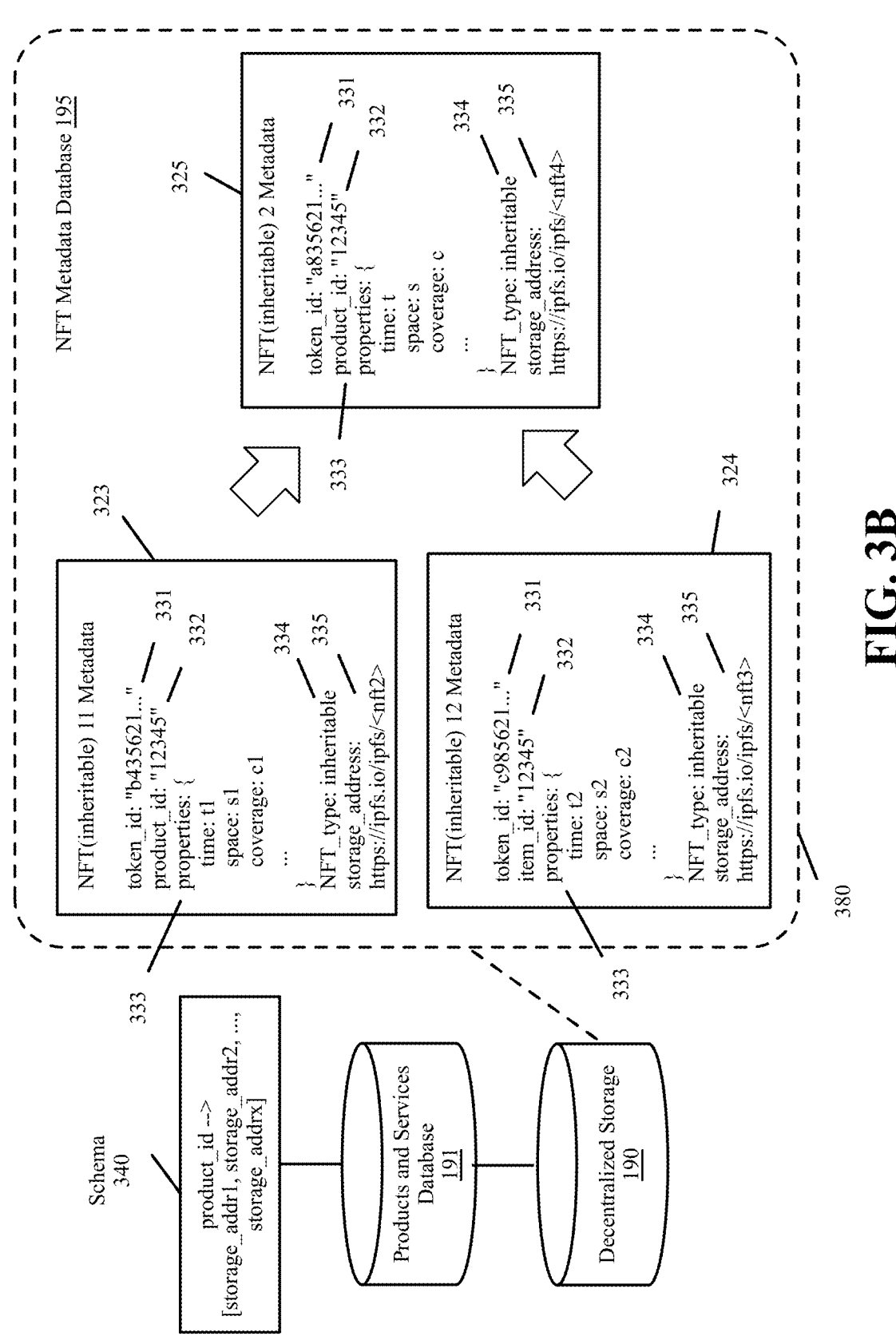
FIG. 3B is a functional diagram illustrating an example of metadata that is stored for a combine operation on two inheritable NFTs, according to various aspects of the present disclosure.
Figure 3C:
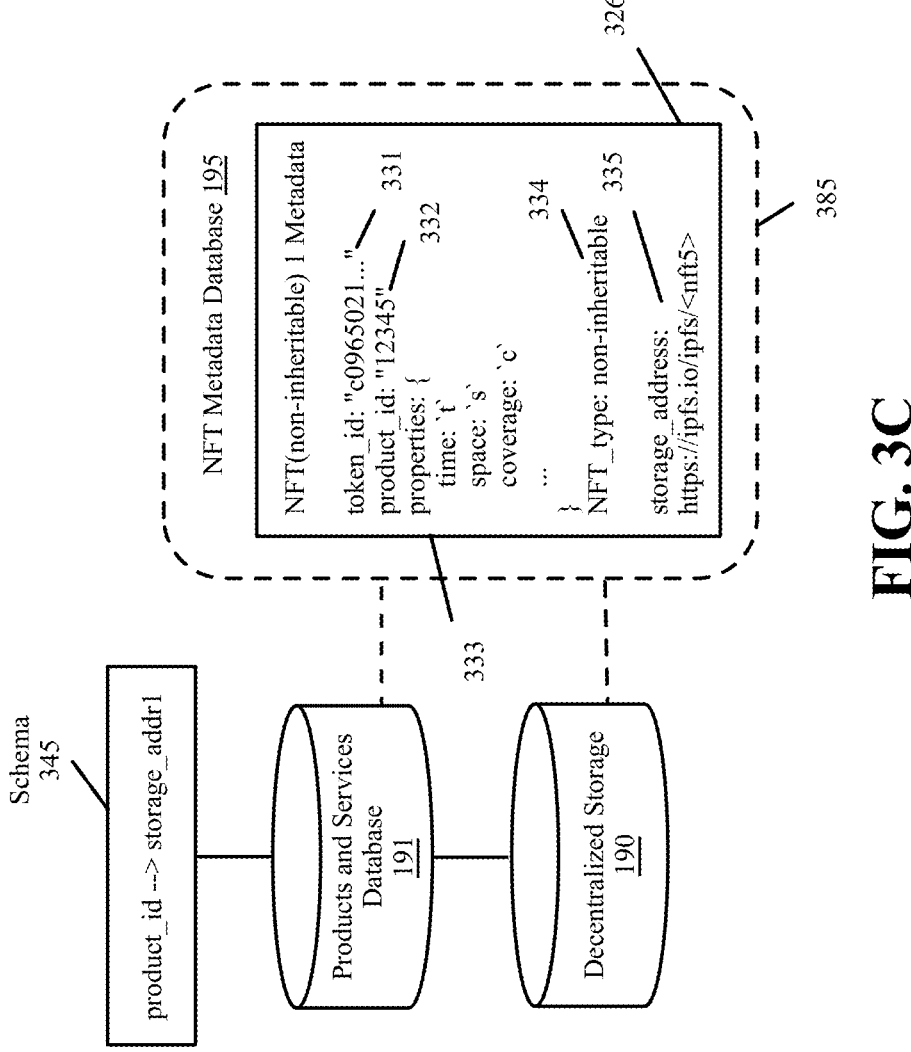
FIG. 3C is a functional diagram illustrating an example of metadata that is stored for an NFT that is non-inheritable, according to various aspects of the present disclosure.

FIG. 3A is a functional diagram illustrating an example of metadata that is stored for a divide operation performed on inheritable NFT, according to various aspects of the present disclosure. FIG. 3B is a functional diagram illustrating an example of metadata that is stored for a combine operation on two inheritable NFTs, according to various aspects of the present disclosure. FIG. 3C is a functional diagram illustrating an example of metadata that is stored for a non-inheritable NFT, according to various aspects of the present disclosure.

In the examples of FIGS. 3A and 3B, each NFT 320-325 may include the following metadata for a product. Similar discussions may apply to a service. The token identification (token_id) 331 is the unique identifier link to the NFT. The product identification (product_id) 332 is the pointer that points back to the original product. The properties 333 contain all the attributes which describe the NFT, including time (e.g., duration of usage of the product), space (e.g., the location or area of the product), coverage (e.g., the insurance or permit to use the product legally), etc.

The NFT type (NFT_type) 334 is the Boolean value indicating whether the NFT is inheritable or not. For example, an NFT generated for the purpose of renting a house or a vehicle may be inheritable and an NFT generated to represent the driver license of a vehicle renter may be non-inheritable. The storage address (storage_address) 335 may indicate the storage address of the NFT in the NFT metadata database 195. An inheritable NFT may be divided into smaller NFTs and/or combined into larger NFTs. Both the inheritable and noninheritable NFT types may be stored in the decentralized storage 190.

To fetch an NFT stored in the database, some embodiments may include the products and services database 191 that stores key-value pairs which map the product_id to a list of NFTs that is associated with the product. For example, the owner of a house may divide the house into different rooms and generate multiple NFTs. Those NFTs may have the same product_id as the house and all the NFTs' addresses may be stored in the value field of the products and services database 191. The design schema 340 shows that a key-value pair includes a product_id that corresponds to several NFT storage addresses storage_addr1 to storage_addrx.

Each NFT may contain the information about the corresponding real property (e.g., a house, a room, etc.). The inheritable NFTs may be divided or combined based on the owners' requests. In the example of FIG. 3A, the inheritable NFT 320 is divided into two inheritable NFTs 321 and 322. The expanded view 370 shows an example of how the metadata stored in the decentralized storage 190 may be divided into NFTs 321 and 322, which are generated from the metadata of the NFT 320.

In the example of FIG. 3B, two inheritable NFTs 323 and 324 are combined into a inheritable NFT 325. The expanded view 380 shows an example of how the metadata for the NFT 325 stored in the decentralized storage 190 is generated from the metadata of the combined NFTs 323 and 324.

In FIG. 3A, based on the divide criteria, the original NFT 320 has multiple divisible sub-properties 331-335. For each sub-property, the union of all the divided NFTs 321-322 should equal to the original NFT 1 320, and no two divided NFTs may have overlaps. In FIG. 3A, the union of the time sub-property t1 of the NFT 321 and the time sub-property t2 of the NFT 322 is equal to the time sub-property t of the NFT 320. The union of the space sub-property s1 of the NFT 321 and the space sub-property s2 of the NFT 322 is equal to the space sub-property s of the NFT 320. The union of the coverage sub-property c1 of the NFT 321 and the coverage sub-property c2 of the NFT 322 is equal to the coverage sub-property c of the NFT 320.

In FIG. 3B, with the combination criteria, the divided NFTs 323-324 may combine together into a single large NFT 325. Each of the sub-properties 331-335 of the large NFT 325 should be the union of the same property from all the divided NFTs 323-324 . . . . In FIG. 3B, the union of the time sub-property t1 of the NFT 323 and the time sub-property t2 of the NFT 324 is equal to the time sub-property t of the NFT 325. The union of the space sub-property s1 of the NFT 323 and the space sub-property s2 of the NFT 324 is equal to the space sub-property s of the NFT 325. The union of the coverage sub-property c1 of the NFT 323 and the coverage sub-property c2 of the NFT 324 is equal to the coverage sub-property c of the NFT 325.

In FIG. 3C, the NFT type 334 indicates that the NFT is non-inheritable. The design schema 345 in the products and services database 191 shows that a key-value pair includes a product_id that corresponds to one NFT address storage_addr1. The corresponding product may be, for example, a driver license issued by a particular state. In this example, the time may be the validity duration of the driver license, the space may be null, and the coverage may be where the driver license is accepted for driving. The expanded view 385 shows an example of the metadata for the NFT 333 stored in the decentralized storage 190.

Figure 4:
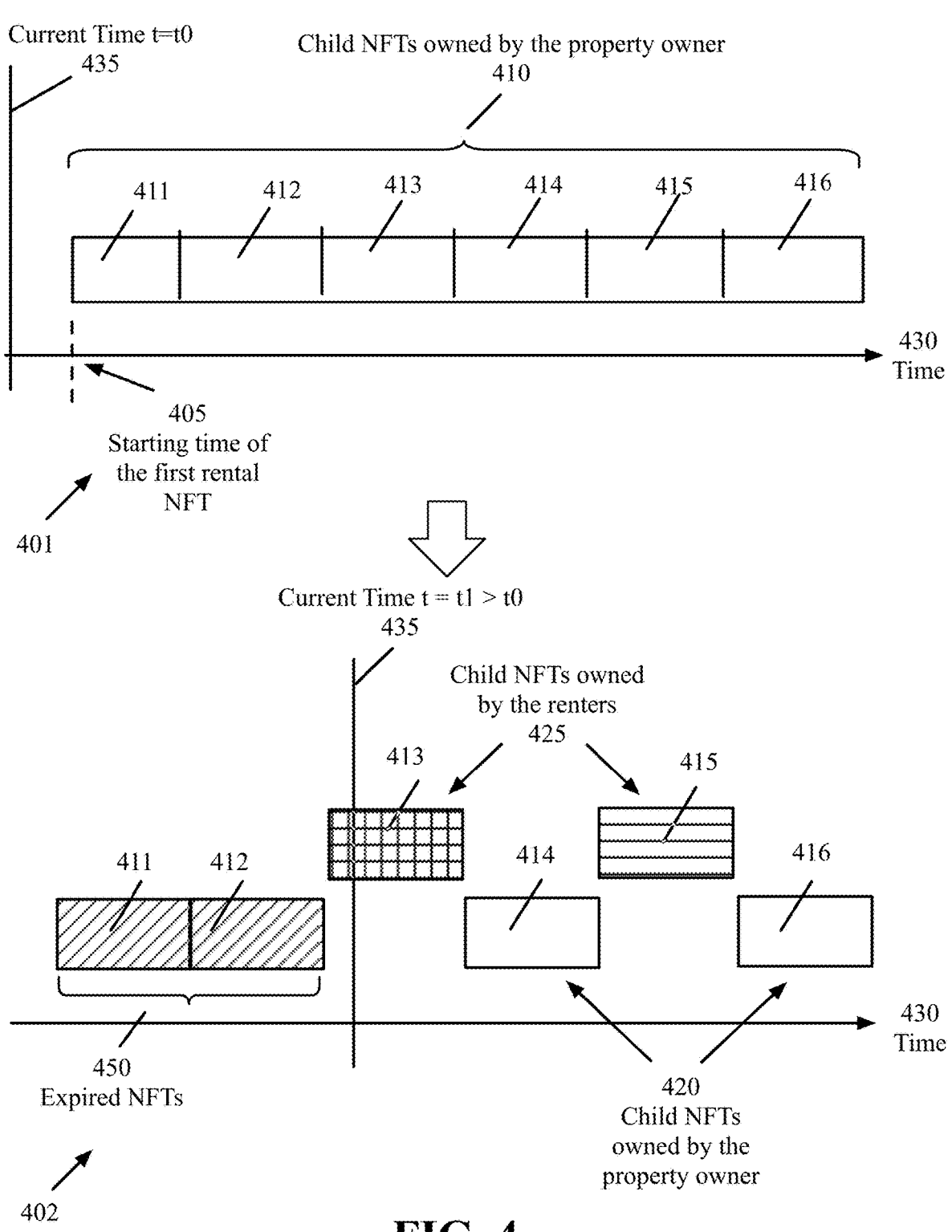
FIG. 4 is a functional diagram illustrating an example of the automatic division of an NFT with equal division shares, according to various aspects of the present disclosure.

Some embodiments provide two NFT division mechanisms: automatic division and divide on demand. The owner of the real property may select the division mechanism that works the best for their scenario. FIG. 4 is a functional diagram illustrating an example of the automatic division of an NFT with equal division shares, according to various aspects of the present disclosure.

In the example of FIG. 4, the automatic division mechanism is selected for the product or service (e.g., a real property) represented by an NFT. The horizontal line 430 shows time. The vertical line 435 shows the current time. FIG. 4 as shown, includes two operational stages 401 and 402. In stage 401, the platform 105 (FIGS. 1A-1B) may automatically divide the NFT equally into several inheritable NFTs 411-416 according to the interval or the space specified by the owner.

For example, if the owner of a property has selected to rent the property for six equal periods of one week, six NFTs 411-416 may be generated. Each NFT 411-416 may be used for renting the property for one week. In addition to dividing a property into multiple rental periods, the owner may divide the property into multiple rentable spaces (e.g., a house may be divided into multiple rooms) and rent each of the spaces for equal time periods. In this scenario, an NFT may be generated for each separate space for each given time period. In the automatic division mechanism, the owner has to also specify a maximum duration for which the property is offered for rent. In the example of FIG. 4, the property is rented for a maximum duration of six weeks (i.e., six equal periods of one week each).

The original NFT (the parent NFT) may be divided if the parent NFT is larger than the specified interval or share size. As shown in stage 401, all child NFTs are originally owned by the owner (as shown by 410) and the first rental NFT starts at a time 405 that is specified by the property owner.

Stage 402 shows the NFTs at a time t1 that is after time t0. In stage 402, two of the rental NFTs 413 and 415 have been sold to one or more tenants (as shown by 425), two of the NFTs 414 and 416 are still owned by the property owner (as shown by 420), and two NFTs 411-412 have expired (as shown by 450). The NFT metadata addresses may be stored, for example, in the products and services database 191 of FIG. 1A.

The two NFTs 411-412 may have been transferred to renters and the rent period is over or may not have been rented to anyone. Some embodiments may set up an automatic task to clean up the expired NFTs once every time interval to trim down the expired portions and other NFTs that do not satisfy the share size.

In the example of FIG. 4, the product or service represented by the NFTs may be a house or a vehicle and the renter who owns the unused NFT 415 may send a request to return the NFT 415 to the owner of the house or vehicle. The request may be validated and if approved by the owner of the house or vehicle, the NFT 415 may be transferred back to the owner and the renter may get a full or a partial credit for the return depending on the rental contract.

It should be noted that the two NFTs 413 and 415 are owned by the renters for the duration of the rental period and expire at the end of the corresponding periods. Depending on the terms of the smart contract between the property owner and the renters, the renters may be allowed to sell the NFTs 413 and 415 prior to being expired, for example, to sublease the property.

Figure 5A:
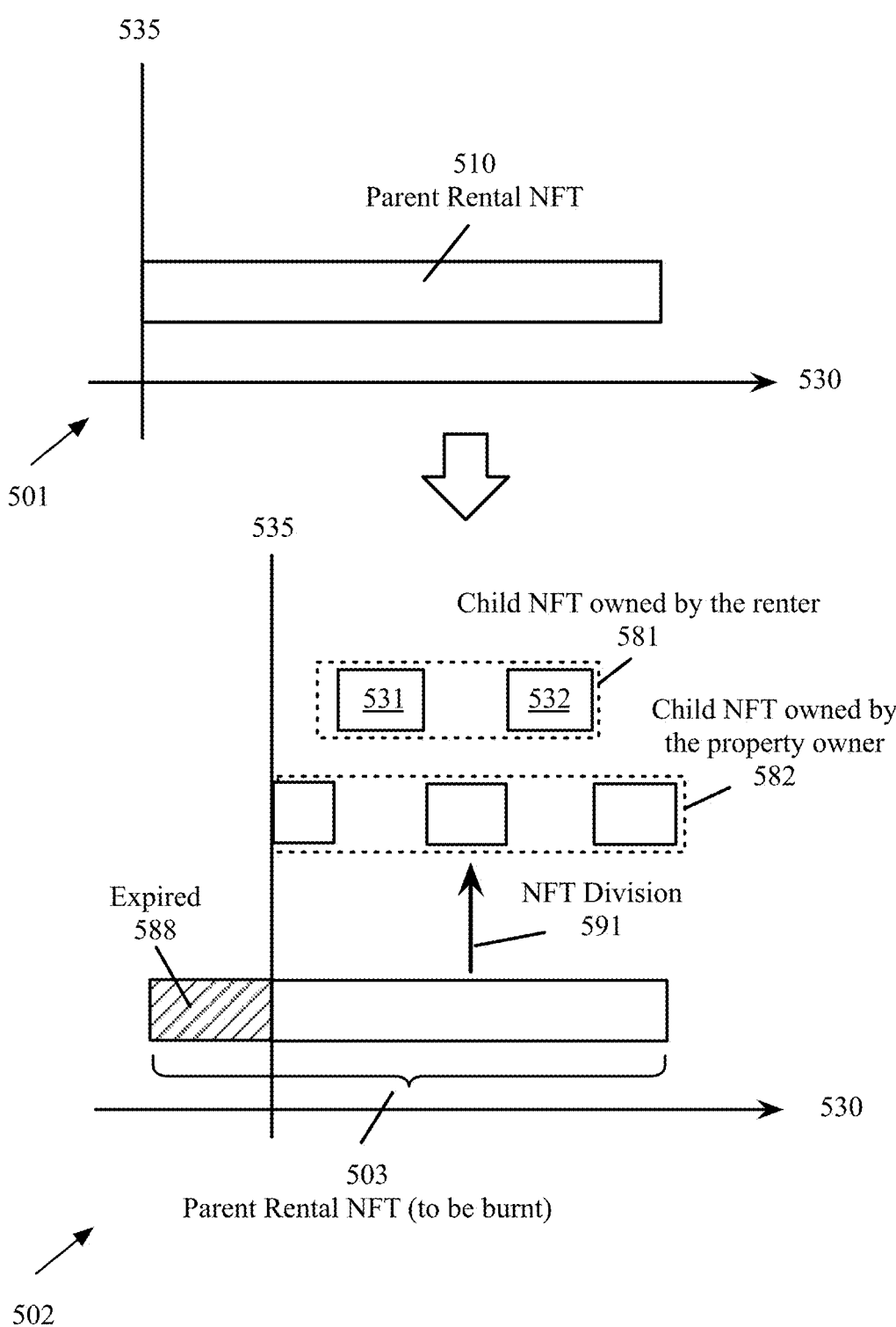
FIGS. 5A and 5B are functional diagrams illustrating examples of dividing and combining inheritable NFTs on demand, according to various aspects of the present disclosure.
Figure 5B:
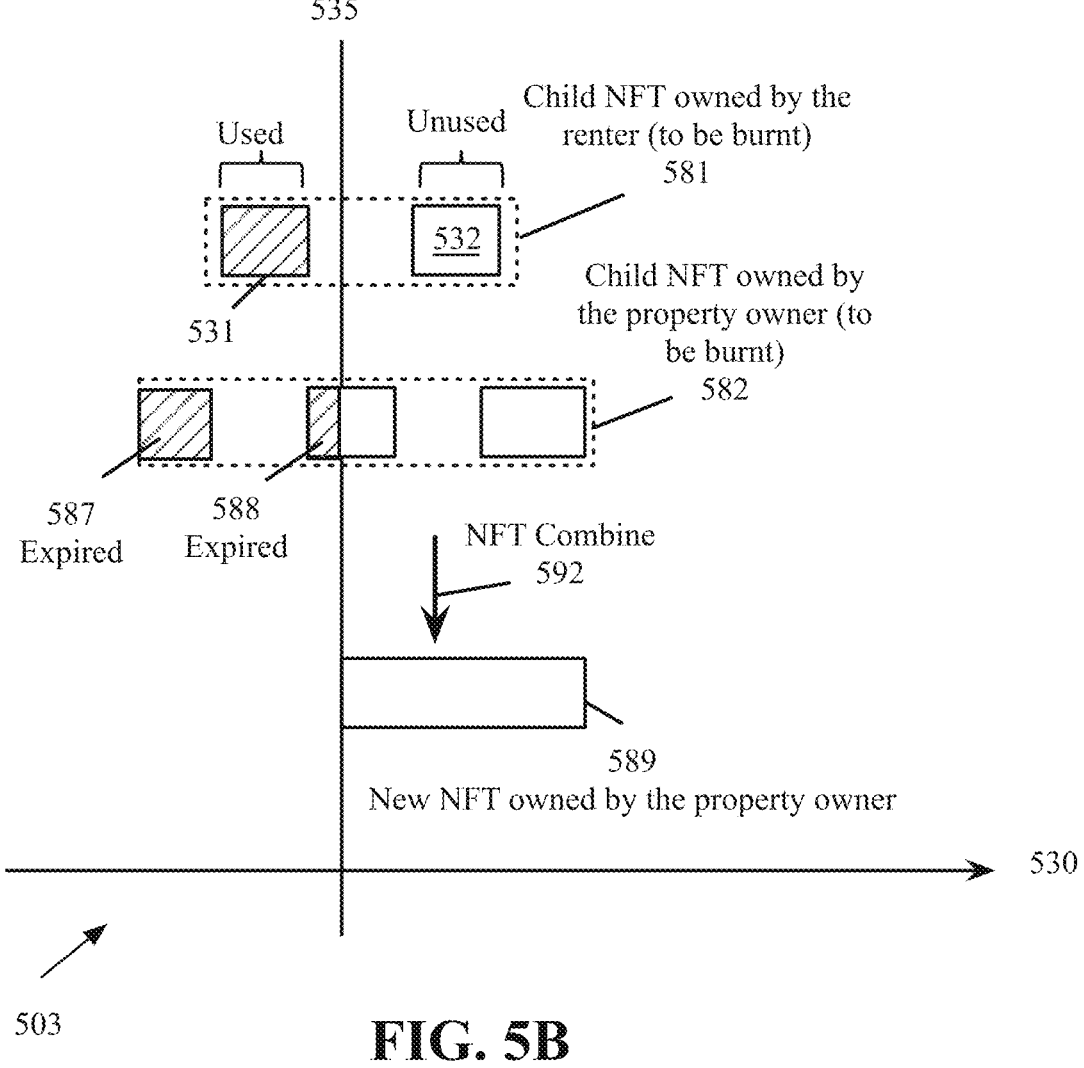

FIGS. 5A and 5B are functional diagrams illustrating examples of dividing and combining inheritable NFTs on demand, according to various aspects of the present disclosure. The horizontal line 530 shows time. The vertical line 535 shows the current time. In the example of FIGS. 5A-5B, the owner of product or service (e.g., a real property) may have selected the real property to be listed for rent on demand. The owner, in some embodiments, may also specify a minimum duration for the rent. For example, if the owner does not want the property to be rented on a daily basis, the owner may specify a minimum period (e.g., five days, one week, one year, etc.) for the rent.

FIGS. 5A-5B, as shown, includes three operational stages 501-503. In stage 501, a parent NFT 510 may be generated after the owner of a real property lists the property for rent based on division on demand mechanism. For example, the owner may provide instructions with essential information such as a renter's requested time slots (if divided by time) or requested space (if divided by space).

In stage 502, a request for two portions of the parent NFT 510 may be received from a renter. The request may be validated and approved by the owner of the parent NFT 510. The smart contract application 107 (FIG. 1A) may be activated by the backend server(s) 115 to perform the NFT division 591 task.

The two portions 531 and 532 may be two separate time slots, two different spaces of a house, etc. After the divide task is completed, a new NFT 581 may be generated with the requested portions 531 and 532 of the original NFT 510, while a new NFT 582 may be generated for the remaining part of the original NFT 510. In stage 502, the portion 588 of the parent NFT 510 which is to the left of the current timeline 535 has already expired. As a result, the new NFT 582 that is generated for the owner may not include the expired portion of the parent NFT 510.

It should be noted that, the NFT 582 is not the original NFT 510 but a new copy of the remaining portions of the original NFT 510 since NFTs do not natively support the dividing operation. As a result, the new copy 582 of the original NFT 510 is created. At the end of stage 502, the new NFT 581 is owned by the renter and the new NFT 582 is owned by the owner of the parent rental NFT 510. The original parent NFT 510 is burned on the background, as there may not be an overlap between the NFTs.

In stage 503, only the first portion 531 of the NFT 581 is used by the renter while the second portion 532 remains unused. In addition, two portions 587 and 588 of the NFT 582 are expired. In the example of FIGS. 5A-5B, the renter in stage 503 sends a request to return the second portion 532 of the NFT 581 to the owner of NFT 582, and the request is validated and approved by the owner NFT 582.

In this scenario, the backend server 115 (FIGS. 1A-1B) may activate the combine function of the smart contract 107 to combine (as shown by 592) the remaining portion 432 of NFT 581 with the remaining portions of the NFT 582. After a validation process to determine whether any of these NFTs are not valid, expired, or have any conflicts, a new NFT 489 may be generated as a combination of the unused portions of the NFT 482 and the unused portion 432 of the NFT 481 with all details merged while the two NFTs 482 and 481 are destroyed (e.g., by activating the burn function 157 of the smart contract 107 of FIG. 1A).

It should be noted that during either an automatic division (e.g., as described above with reference to FIG. 4, or during a division on demand (e.g., as described above with reference to FIGS. 5A-5B), all of the NFTs including the parent NFT and the child NFTs should not have any overlaps in terms of time or space. This ensures the uniqueness of each NFT such that the renter is the only valid user of the product and services within the time and space specified for an NFT.

Figure 6:
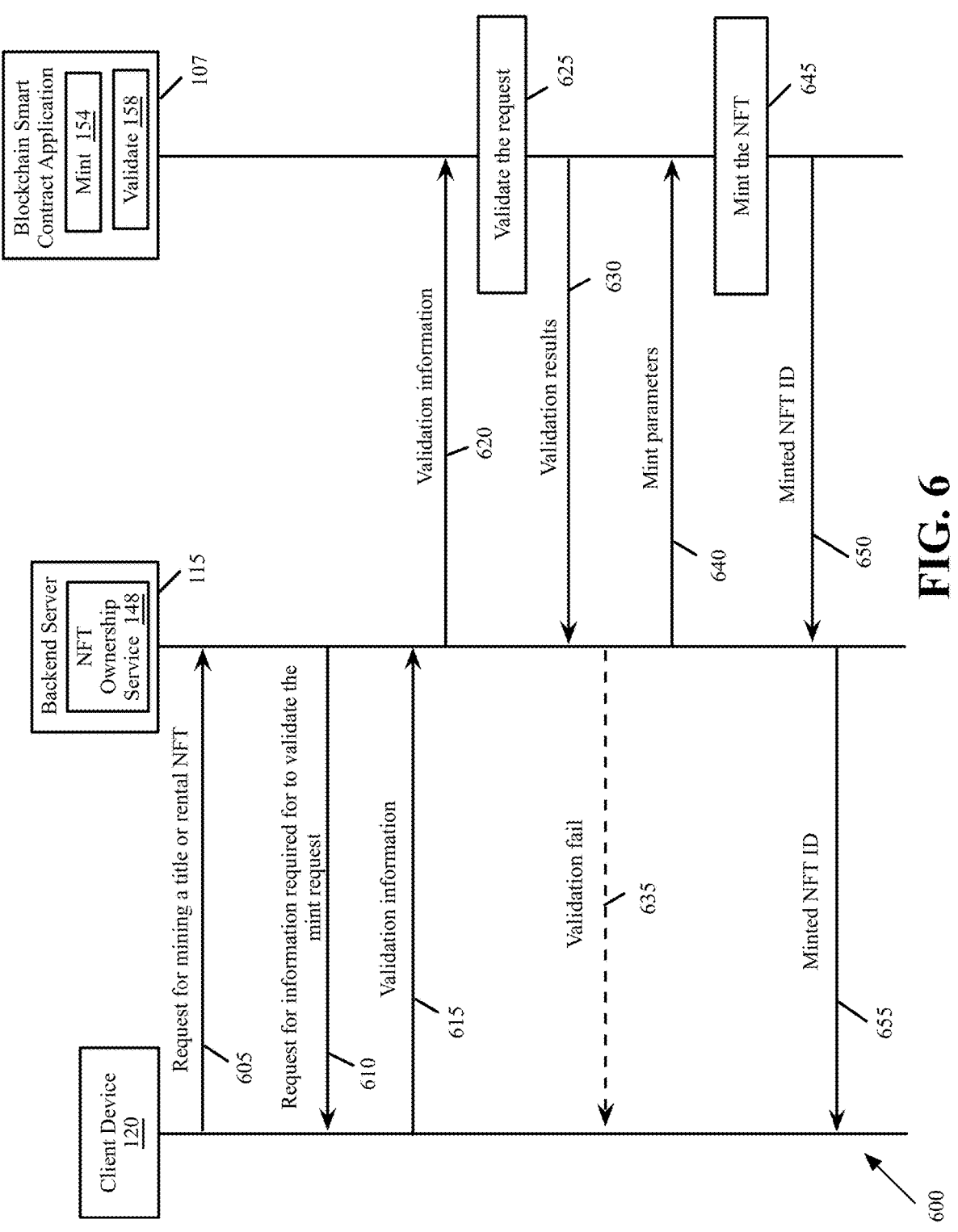
FIG. 6 is an example sequence diagram illustrating data items exchanged for minting a new NFT, according to various aspects of the present disclosure.

FIG. 6 is an example sequence diagram 600 illustrating data items exchanged for minting a new NFT, according to various aspects of the present disclosure. With reference to FIG. 6, the client device 120 may be any of the electronic devices 120 of FIG. 1A that is used by the original owner of a product or service (e.g., a real property, a vehicle, etc.). The backend server 115 may be the backend server 115 of FIG. 1A. The smart contract mint function 154 and validate function 158 may be similar to the corresponding functions shown FIG. 1A. The NFT ownership service 148 may be similar to the NFT ownership service 148 of FIG. 1B.

The client device 120 may send (at step 605) a request to the backend server 115 (e.g., to NFT ownership service 148) to mint an NFT. For example, the person using the client device 120 may have a real property or a vehicle to rent and may need to mint a title NFT for onboarding. As another example, the person using the client device 120 may have a real property or a vehicle to rent with a valid title NFT and may need to mint an inheritable NFT to rent the item.

The backend server 115 may send (at step 610) a request for information required to validate the mint request. For example, to mint a title NFT, a builder certificate, a certificate of title, or proof of ownership may be requested. To mint a rental NFT, the title NFT of the property or vehicle may be requested. The client device 120 may provide (at step 615) the information required for validation.

The backend server 115 may send (at step 620) the validation information to the validate function 158 of the blockchain smart contract 107 to validate. For example, the backend server 115 may activate the validate function 158 of the smart contract 107 by calling the validate ABI interface 125 of the platform 105 of FIG. 1B.

The validate function 158 may then validate (at block 625) the request. The smart contract validate function 158 may send (at step 630) the validation results to the NFT ownership service 148. If validation fails, the NFT ownership service 148 may send (at step 635) the client device 120 that the validation has failed. If the validation passes, the NFT ownership service 148 may send (at step 640) the mint parameters to the smart contract mint function 154. For example, the NFT ownership service 148 may activate the mint function 154 of the smart contract 107 by calling the mint ABI interface 121 of the platform 105 of FIG. 1B. The mint parameters may include the type of NFT (e.g., title NFT or rental NFT), the corresponding product or service information (e.g., real property information, vehicle information, etc.), and the owner information (e.g., the identification (ID) of the person or entity who will own the minted NFT).

The ID may be, for example, and without limitation, a unique address that is assigned to each person, entity, token, or NFT by the blockchain network 150 of FIG. 1A. A non-limiting example of such a unique address is an Ethereum (ETH) address, such as, 0x4866328DA1FE4FEAC2081942BBC0C6A053726483, where 0x denotes a hexadecimal number.

The mint function 154 may mint (at block 645) the new NFT (e.g., a new title or rental NFT based on the situation). The smart contract mint function 154 may send (at step 650) the minted NFT ID to the backend server 115. The minted NFT ID may be a unique ID generated by the blockchain network 150, as described above with reference to step 640. It should be noted that if the mint function 154 fails to mint the NFT, instead of the minted NFT ID may send (not shown) an error to the backend server.

The backend server 115 may send (at step 655) the minted NFT ID to the client device 120. Alternatively, if the mint function had failed, the backend server 115 may send (not shown) an error to the client device 120.

Figure 7:
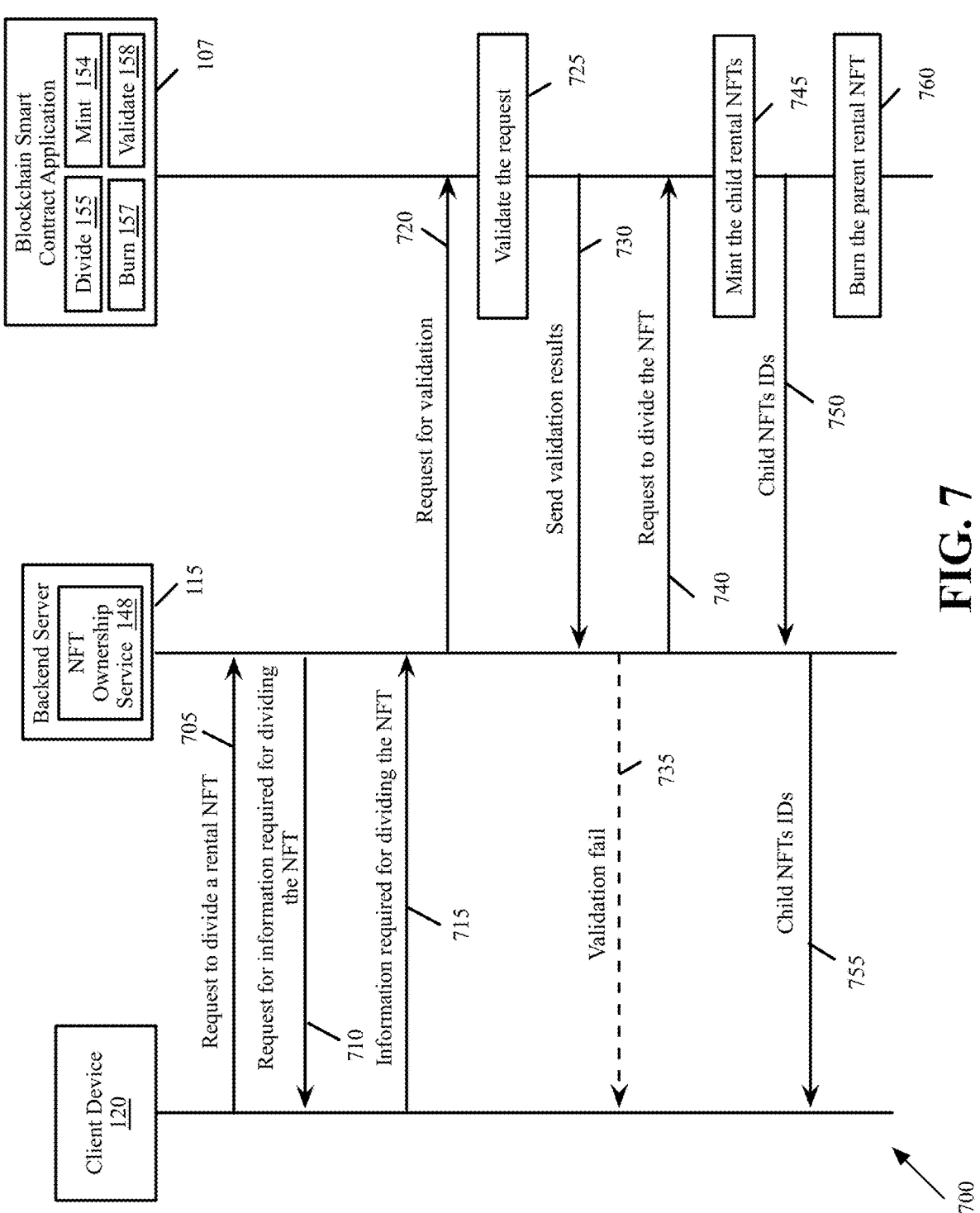
FIG. 7 is an example sequence diagram illustrating data items exchanged for dividing an inheritable parent NFT and generating child NFTs, according to various aspects of the present disclosure.

FIG. 7 is an example sequence diagram 700 illustrating data items exchanged for dividing an inheritable parent NFT and generating child NFTs, according to various aspects of the present disclosure. With reference to FIG. 7, the client device 120 may be any of the electronic devices 120 of FIG. 1A that is used by the owner of an inheritable NFT such as a house or a vehicle. The backend server 115 may be the backend server 115 of FIGS. 1A-1B. The divide function 155, the mint function 154, the burn function 157, and the validate function 158 may be similar to the corresponding functions of FIG. 1A.

The client device 120 may send (at step 705) a request to the backend server 115 (e.g., to the NFT ownership function 148 of the backend server 115 to divide a parent NFT. For example, a minted inheritable NFT may have been minted for a real property or a vehicle (e.g., as described above with reference to FIG. 6) and the client device 120 may request to divide the NFT into smaller child NFTs based on time, space, etc., to rent the child NFTs. The request to divide a rental NFT, in some embodiments, may be sent by the client device 120 when the client device 120 wants to create a rental listing to rent one or more portions of a real property or to rent a real property or a vehicle for one or more time periods.

The backend server 115 may send (at step 710) a request for information required for dividing the NFT. For example, the backend server 115 may require information such as how a rental property may be divided based on time or space or how a vehicle may be divided based on time. The information may include the title and/or the rental NFT, the specific assigned spaces or time slots and coverage for a product or service. The client device 120 may provide (at step 715) the requested information.

The NFT ownership service 148 may send (at step 720) a request for validation to be performed for dividing the rental NFT. The validation may include validating that the title NFT has not been modified after the rental NFT being minted. The validation may include validating the authorization detail with the current rental NFT. The validation may include determining whether there is a spatial or temporal conflict.

The smart contract validation function 158 may validate (at step 725) dividing the rental NFT. The smart contract validation function 158 may send (at step 730) the validation results to the NFT ownership service 148. If validation fails, the NFT ownership service 148 may inform (at step 735) the client device 102 that the validation has failed. If the validation passes, the NFT ownership service 148 may send (at step 740) a request to divide the NFT to the smart contract divide function 155. For example, the NFT ownership service 148 may activate the smart contract divide function 155 by calling the divide ABI interface 122 of the platform 105 of FIG. 1B. The divide request may include parameters such as the rental NFT ID, the number of child NFTs, and the time and/or space based on which the rental NFT is divided into the child NFTs.

The smart contract divide function 155 may request the smart contract mint function 154 to mint the child NFTs after validating the information provided by the client device 120 to ensure the request is valid and there are no conflicts. The mint function 154 may generate (at block 745) the new child rental NFTs, with each child NFT being an exclusive subset of the parent NFT in terms of the division properties such as time and space. Alternatively, the smart contract mint function 154 may generate an error (not shown) when the parent NFT cannot be divided.

The smart contract mint function 154 may send (at step 750) the child NFTs IDs to the NFT ownership service 148 of the backend server 115. The child NFTs IDs may be unique IDs generated by the blockchain network 150, as described above with reference to step 640.

The NFT ownership service 148 of the backend server 115 may send (at step 755) the child NFTs IDs to the client device 120. The smart contract divide function 155 may request the burn function 157 of the smart contract to burn the parent rental NFT (e.g., the undivided rental NFT). The burn function 157 of the smart contract may burn (at block 760) the parent NFT. Further details of the burn function are described below with reference to FIG. 9. It should be noted that block 760 may be performed before or at the same time as the steps 750 or 755.

Figure 8:
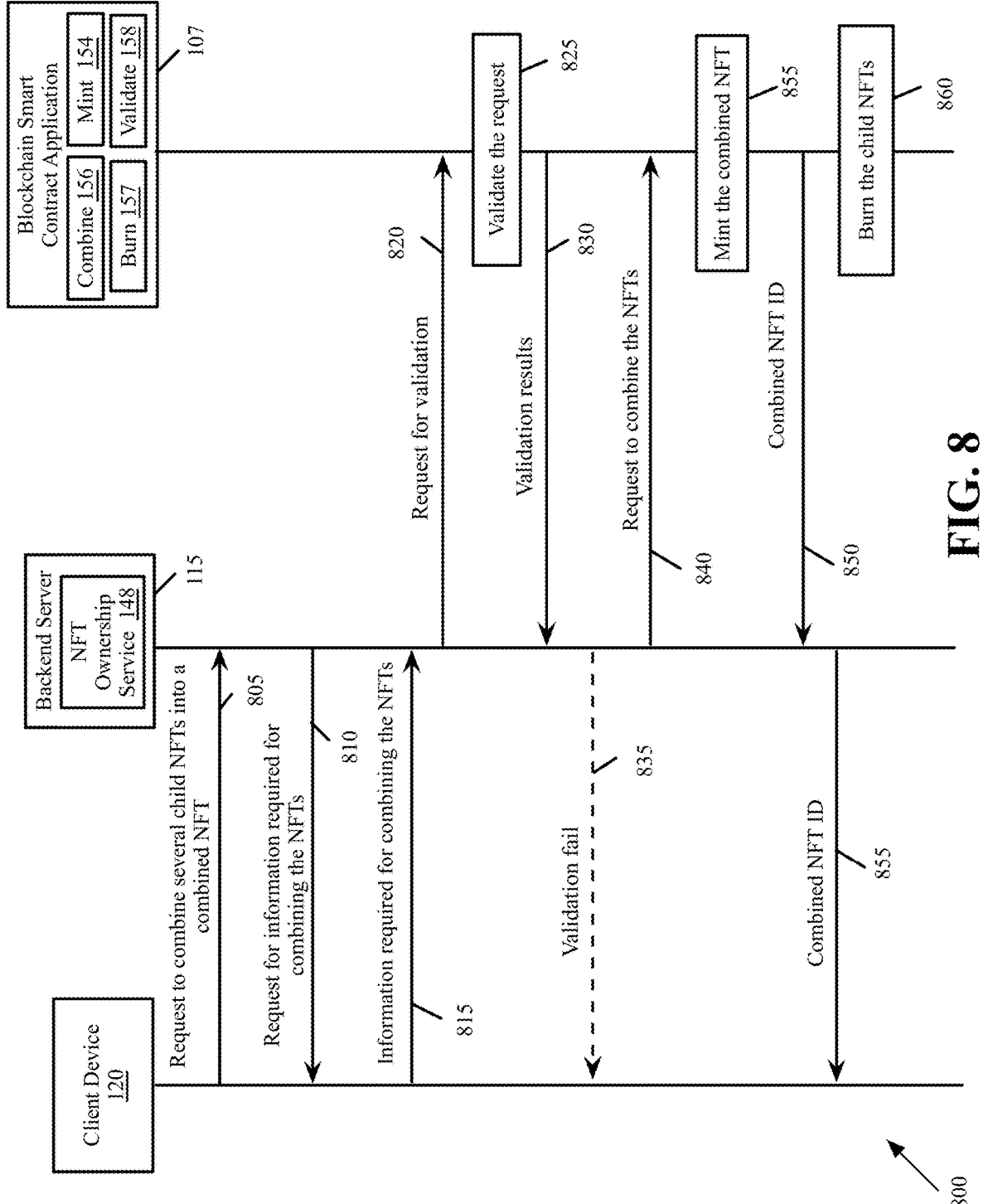
FIG. 8 is an example sequence diagram illustrating data items exchanged for combining several NFTs into a combined NFT, according to various aspects of the present disclosure.

FIG. 8 is an example sequence diagram 800 illustrating data items exchanged for combining several NFTs into a combined NFT, according to various aspects of the present disclosure. With reference to FIG. 8, the client device 120 may be any of the electronic devices 120 of FIG. 1 that is used by the owner of several inheritable NFTs that may be combined into a larger NFT. The backend server 115 may be the backend server 115 of FIGS. 1A-1B. The combine function 156, the mint function 154, and the burn function 157, and the validate function 158 may be the same as the corresponding functions of FIG. 1A.

The client device 120 may send (at step 805) a request to the backend server 115 (e.g., to the NFT ownership service 148) to combine several child NFTs into a combined NFT. For example, there may be several inheritable NFTs (e.g., rooms of a house, a house for several time periods, a vehicle for several time periods, etc.) and the client device 120 may want to combine the NFT into a larger NFT based on time, space, etc. The backend server 115 may send (at step 810) a request for information required for combining the NFTs. For example, the backend server 115 may require information such as the property or aspect of the product or service to be combined. The information may include specific assigned spaces or time slots and coverage for the product or service. The client device 120 may provide (at step 815) the information required for combining the NFTs.

The backend server 115 may send (at step 820) a request for validation of the combine request. validate the request. For example, the backend server 115 may activate the validate function 158 of the smart contract 107 of FIG. 1A by calling the validate ABI interface 125 of the platform 105 of FIG. 1B.

The valid function 158 of the blockchain smart contract application 107 may validate (at step 825) the combine request. The validation may include determining that there is no overlap on the NFTs that are to be combined. The smart contract validation function 158 may send (at step 830) the validation results to the NFT ownership service 148. If validation fails, the NFT ownership service 148 may inform (at step 835) the client device 102 that the validation has failed. If the validation passes, the NFT ownership function 148 of the backend server 115 may submit (at step 840) a request to the smart contract combine function 156 to combine the NFTs. For example, the backend server 115 may submit the information required for combining the NFTs to the combine function 156 of the smart contract by calling the combine ABI 123 of the platform 105 of FIGS. 1A-1B. The information required for combining the NFTs may include the child NFTs IDSs and the specific assigned spaces or time slots and coverage for the product or service.

The smart contract combine function 156 request the smart contract mint cofunction 154 to combine the NFTs into a combined NFT based on the received information. The mint function 154 may generate (at block 855) the new combined NFT, with each combined NFT including combined properties such as time and space of the child NFTs. Alternatively, the smart contract mint function 154 may generate an error (not shown) when the child NFTs cannot be combined. The smart contract mint function 154 may send (at step 850) the combined NFT ID to the NFT ownership service 148 of the backend server 115. The combined NFT ID may be a unique ID generated by the blockchain network 150, as described above with reference to step 640. The NFT ownership service 148 may send (at step 855) the combined NFT ID to the client device.

The smart contract combine function 156 may request the burn function 157 of the smart contract to burn the child NFTs. The burn function 157 of the smart contract may burn (at block 860) the child NFTs. Further details of the burn function are described below with reference to FIG. 9. It should be noted that block 860 may be performed before or at the same time as the steps 850 or 855.

Figure 9:
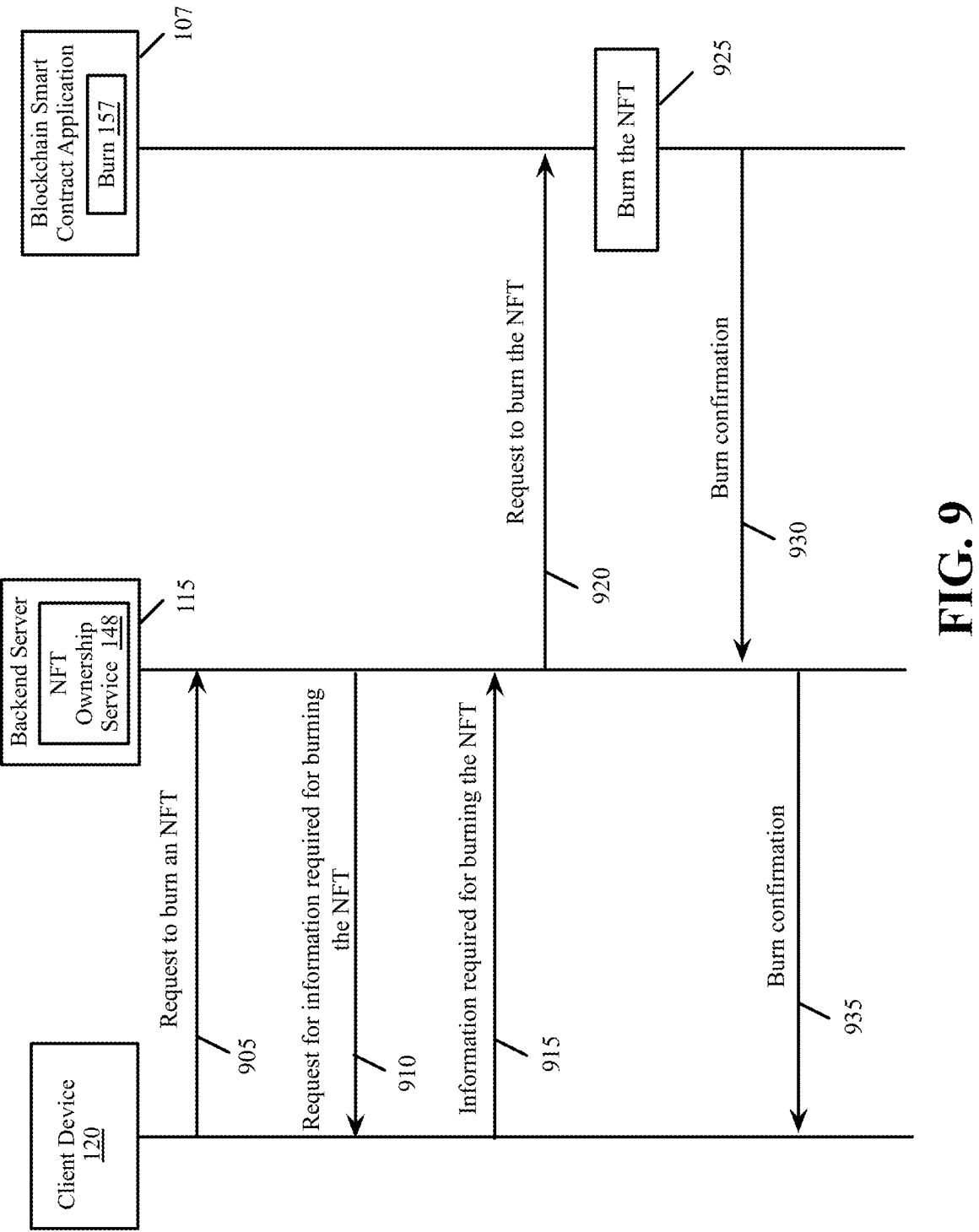
FIG. 9 is an example sequence diagram illustrating data items exchanged for burning an NFT, according to various aspects of the present disclosure.

FIG. 9 is an example sequence diagram 900 illustrating data items exchanged for burning an NFT, according to various aspects of the present disclosure. A burn request may arrive from either a client device (e.g., as shown in FIG. 9) or from other services from the smart contract internally (e.g., as shown in FIGS. 7-8). The burn function of the smart contract may perform specific operations to remove a discarded NFT from the blockchain. Technically speaking, an NFT which has been onboarded to the blockchain may not be altered or deleted by any chance. One of the existing workarounds which has been widely used by the decentralized community may be applied to the underlying logic of the smart contract of the present embodiments. For example, the burn function of the smart contract may send the discarded NFT to a vacant address which may not be used by any other user on the blockchain. In this case, this technique is equivalent to deleting the NFT from the chain.

With reference to FIG. 9, the client device 120 may be any of the electronic devices 120 of FIG. 1A that is used by the owner of an NFT that is to be discarded. The backend server 115 may be the backend server 115 of FIGS. 1A-1B. The burn function 157 may be the smart contract burn function 157 of FIG. 1A.

The client device 120 may send (at step 905) a request to the backend server 115 (e.g., to the NFT ownership service 148) to burn an NFT. The backend server 115 may send (at step 910) a request for information required for burning the NFT. For example, the backend server 115 may request for authorization to burn the NFT. The client device 120 may provide the requested information (at step 915) to the backend server 115. For example, the client device 120 may provide the authorization to burn the NFT.

The backend server 115 may submit (at step 920) a request to the smart contract burn function 157 to burn the NFT. For example, the backend server 115 may submit the information required for burning the NFTs to the burn function 157 of the smart contract by calling the burn ABI 124 of the platform 105 of FIG. 1B.

The smart contract burn function 157 may burn (at block 925) the NFT based on the received information. The burn function 157 may send (at block 930) the burn confirmation to the backend server 115. The backend server 115 may send (at block 935) the client device 120.

Figure 10:
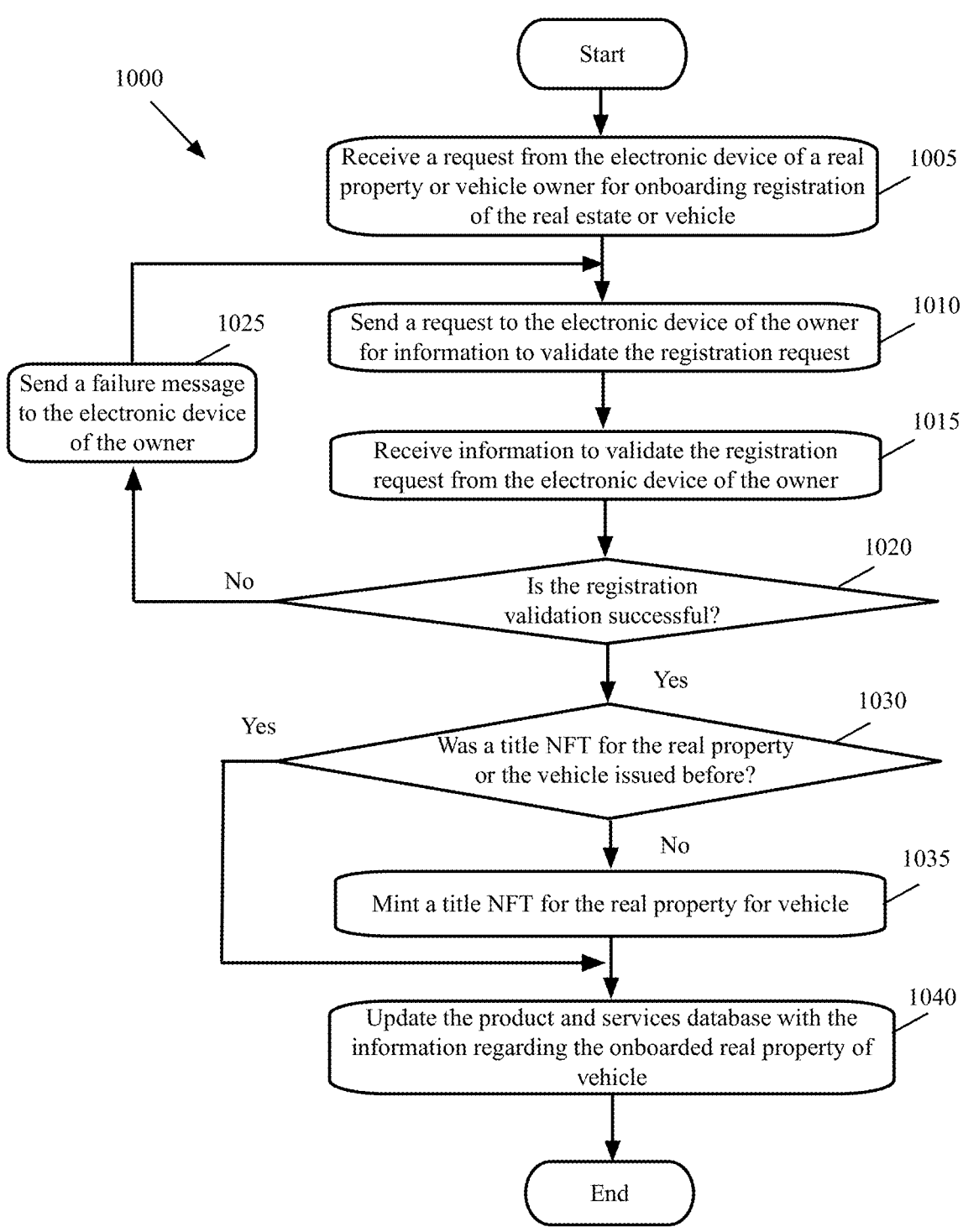
FIG. 10 is a flowchart illustrating an example process for onboarding registration of a real property or vehicle, according to various aspects of the present disclosure.

FIG. 10 is a flowchart illustrating an example process 1000 for onboarding registration of a real property or vehicle, according to various aspects of the present disclosure. The process 1000, in some of the present embodiments, may be performed by the processor of the backend server 115 of FIGS. 1A-1B.

With reference to FIG. 10, a request may be received (at block 1005) from the electronic device of an owner of a rental real property or a rental vehicle for onboarding registration of the rental real property or rental vehicle. A request may be sent (at block 1010) to the electronic device of the owner for information to validate the registration request. The information to validate the registration request may be received (at block 1015) from the electronic device of the owner. The information may include, for example, and without limitations, ownership information of the real property or vehicle.

A determination may be made (at block 1020) whether the registration verification is successful. If the registration verification is not successful, a failure message may be sent (at block 1025) to the electronic device of the owner. The process 1000 may return to block 1010, which was described above.

If the registration verification is successful, a determination may be made (at block 1030) whether a title NFT exists for the real property of the vehicle that is onboarded. If yes, the process 1000 may proceed to block 1040, which is described below. Otherwise, a title NFT may be minted (at block 1035) for the onboarding of the real property or the vehicle. For example, a title NFT may be minted for the real property or the vehicle, as described above with reference to FIG. 6). At block 1040, the product and services database may be updated with information regarding the onboarded real property of vehicle. The process 1000 may then end.

FIG. 11 is a flowchart illustrating an example process 1100 for performing the automatic division of rental NFTs, according to various aspects of the present disclosure. The process 1100, in some of the present embodiments, may be performed by the processor of the backend server 115 of FIGS. 1A-1B.

With reference to FIG. 11, a request may be received (at block 1105) from the client device of an owner of a rental NFT that specifies the automatic division criteria for the rental NFT. For example, the client device may request to list the rentable item for rent and may define the division criteria such as the usage (e.g., rental) intervals of a real property or a vehicle and the non-divisible portions (if applicable). A request may be sent (at block 1110) to the divide function of a blockchain smart contract to divide the rental NFT (e.g., as described above with reference to FIG. 7) based on the received criteria. For example, the backend server 115 of FIGS. 1A-1B may use the divide ABI interface 122 to activate the divide function 155 of the smart contract application 107 and send the division criteria to the divide function 155.

The identification of the minted child NFTS may be received (at block 1115). The identification of the child NFTs may be the unique ID as described above with reference to FIG. 7. The unique ID may be used to find where the metadata of the divided NFTs are stored, for example, as described above with reference to FIGS. 3A-3B.

The child NFTs IDs may be sent (at block 1120) to the client device of the owner. For example, after the task has been completed, the list of newly minted NFTs may be returned to the owner of the parent NFT together with confirmation of burning of the parent NFT.

The product and services postings and the corresponding automatically divided NFTs may be received (at block 1125) from the client device of the owner of the NFTs. For example, the client device of the owner may post the owner's products and services with the NFT metadata address in the products and services database 191 of FIG. 1A, making them searchable by client devices of the renters and purchasers.

The rentable item may be listed for rent and search criteria for products and services may be received (at block 1130) from the client devices of the renters. The search results may be sent (at block 1135) to the client devices of the renters. An order may be received (at block 1140) for one or more child NFTs from the client device of a renter. For example, the client devices of a renter may be able to search the newly posted services and products and may send an order request to the backend server.

The authorization may be received (at block 1145) from the owner of the child NFTs. For example, the backend server may send the order request to the client device of the owner of the child NFT for approval and may receive an authorization from the client device of the owner to fulfill the order.

The order request may be sent (at block 1150) to one or more functions of the smart contract to fulfill. For example, depending on the type of the order, the backend server 115 may activate the appropriate functions of the smart contract through the corresponding ABI. The smart contract may verify the request and may notify the backend server 115. The backend server may then activate the smart contract transfer function 159 to complete the transfer of the child NFTs to the renter and to credit the account of the owner with any upfront rental fees received. For example, the backend server may call the transfer ABI 126 of FIG. 1B to activate the smart contract function 159.

The order completion confirmation may be received (at block 1155) from the smart contract. For example, the backend server 115 may receive the order completion confirmation from the smart contract application 107 of FIG. 1. The products and services database may be updated (at block 1160) with the new owner information for the child NFTs. The process 1100 may then end.

FIG. 12 is a flowchart illustrating an example process 1200 for performing the on-demand division of rental NFTs, according to various aspects of the present disclosure. The process 1200, in some of the present embodiments, may be performed by the processor of the backend server 115 of FIGS. 1A-1B.

With reference to FIG. 12, a product or service posting, and the corresponding detailed properties may be received (at block 1205) from a client of the owner of the product or service. For example, the client device may send detailed description of a property or a vehicle as well as the desired usage (e.g., rental) intervals to the backend server 115. A request may be sent (at block 1210) to the mint function of a blockchain smart contract to mint a new inheritable rental NFT for the product or service based on the detailed description. For example, the backend server 115 of FIGS. 1A-1B may call the mint ABI 121 to activate the mint function 154 of the smart contract to mint the parent rental NFT, as described above with reference to FIG. 6.

The parent rental NFT ID may be received (at block 1215) and the products and services database may be updated. The parent rental NFT ID may be sent (at block 1220) to the client device of the owner and the rentable item may be listed for rent.

Search criteria may be received (at block 1225) from client devices of renters that may match the product or service associated with the NFT. The search results may be sent (at block 1230) to the client devices of the renters. An order may be received (at block 1235) for a child rental NFT from the client device of a renter.

An order request may be sent (at block 1240) to the divide function of the smart contract to mint child NFTs and burn the parent NFT. For example, the backend server 115 may receive the approval from the client device of the owner and may call the divide ABI interface 123 to activate the divide function 155 of the smart contract application 107 to mint the child NFTs and burn the parent NFT as described above with reference to FIG. 7.

The order completion confirmation may be received (at block 1245) from the smart contract. The products and services database may be updated (at block 1250) with the owner information for the child rental NFTs and the client devices of the owners may be notified. For example, a new owner of a child NFT may be a renter who is renting a portion of a real property for a given time or a renter who is renting a vehicle for a period of time. The owner of another child NFT may be the owner of the real property or the owner of the vehicle who retains a child NFT for the unrented portion of the space or time of the real property of vehicle.

After this time, both the owner and renter may continue with the transaction while the client may have access to the storage address for the NFT metadata they are requesting for. The process 1200 may then end.

Figure 13A:
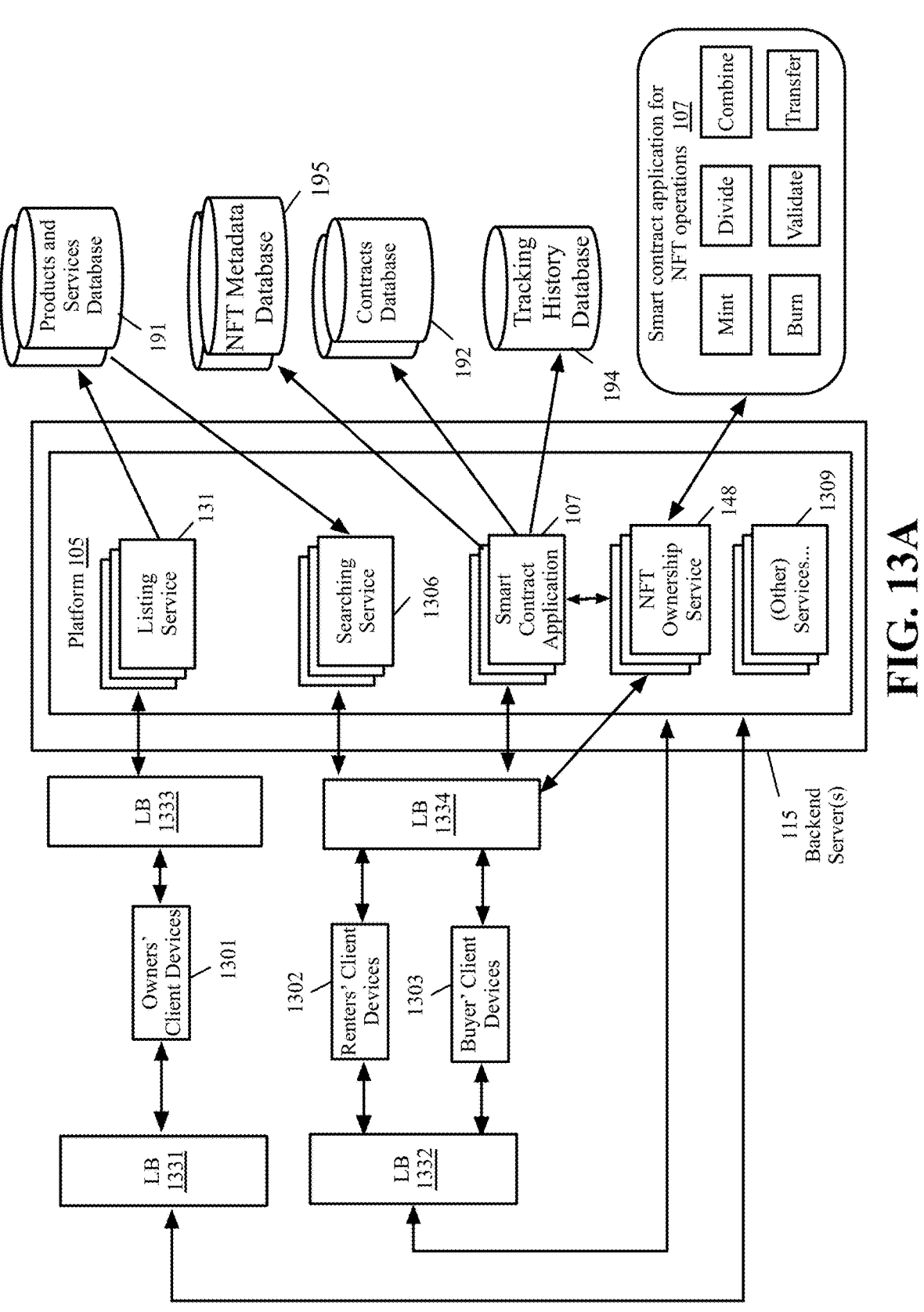
FIG. 13A is a functional block diagram illustrating the system design diagram of a decentralized real property and vehicle rental system, according to various aspects of the present disclosure.

FIG. 13A is a functional block diagram illustrating the system design diagram of a decentralized real property and vehicle rental system, according to various aspects of the present disclosure. The client devices 1301-1303 may be any of the client devices 120 of FIG. 1A. The platform 105, the smart contract application 107, the products and services database 191, the contracts database 192, and the backend server(s) 115 may be similar to the corresponding components of FIG. 1A.

Some embodiments that include more than one backend server 115 may use the load balancers 1331-1334 to direct network traffic to or from the backend servers 115. Other embodiments may not use the load balancers 1331-13324.

FIG. 13A shows two workflows tailored to different clients. In the first workflow, owners' client devices 1301 (e.g., the client devices of the owners of real property or vehicles) may post new product and services, such as real property, vehicle, etc. listings for rent. The client devices' 1301. The client devices' 1301 may also list inheritable NFTs for sale.

The client devices' 1301 requests may be sent to the listing service 131 through available APIs, and the corresponding metadata may be stored in the NFT metadata database 195 in the decentralized storage 190 (FIG. 1A) with a specified schema 1350 or 1370 (FIGS. 13B-13C). During this process, the NFT provided by the client devices 1301 may be validated for format and legality by the smart contract application 107 before saving the token ID in the products and services database 191 through the listing service 131.

In the second workflow, the renters' client devices 1302 (e.g., the client devices of real property renters or vehicle renters) and the buyer's client devices 1303 (e.g., the client devices of buyer of inheritable NFTs) may search for real properties or vehicles to rent by sending API requests to the searching service 1306. The searching service may be any of the search components 141 or 147 of FIG. 1B. The searching service 1306 may query the products and services database 191 for matched results that meet the specified search filters and keyword parameters. These results may then be returned to the client devices 1302-1303 for review.

Upon finding their desired property, the renters' client devices 1302-1303 may submit their application requests through the contract service 1307, which is configured to manage rent applications, offers, and contracts. The contract service 1307 may be any of the contract components 134, 140, or 146 of FIG. 1B.

Once the owner accepts the offer or approves the application, a contract may be initiated and shared with both parties. After the contract is signed, the transaction service may hand over the request to the NFT ownership service 148, which calls upon the NFT smart contract application 107 to execute NFT-related actions such as generating a new child NFT for the renter or transferring tan existing child NFT to the renter. The tracking history database 194 may track the moving history of rental vehicles.

When a rent period ends, or if a renter needs to terminate the lease early, the renter has to return the child NFT, which triggers a call to the smart contract application 107. This action subsequently triggers the NFT ownership service 148 along with the smart contract component 107 to perform child NFT burning (e.g., through the combine function). The metadata for real properties may be stored in the NFT metadata database 195.

FIG. 13B is a functional block diagram illustrating database schemas for real property data of a decentralized real property and vehicle rental system, according to various aspects of the present disclosure. As shown in the products and services database schema 1350 in FIG. 13B, the property ID 1351 may be assigned using the first two digits of the property type identifier followed by a random unique identifier to ensure unique identification. The property ID 1351, in some embodiments, may be used as the primary key for the property database 1310. The property type 1352 may indicate the type of property, such as residential or business. The location 1353 may serve as a sort key (or partition key) for database queries. The address filed 1354 may store the property's address.

The property token ID (entity_token_id) 1355 may be mandatory only when the property has been fully onboarded on the platform. The status field 1356 may indicate whether the property is on or off market. The multiple listing ID 1357 may indicate the property ID in a third party multiple listing database.

Contract details from the seller and buyer or between the landlord and tenant may be stored in the contract database 192. As shown in the contract database schema 1360 in FIG. 13B, the contract database 192 may have a contract ID 1361 as the primary key which serves as the identifier, and the property ID (entity_id) 1362 to which it is connected. The contract database 192 may also include the owner ID 1363 as a partition key to store all properties owned by the same person on the same network partition and avoid network overhead. The contract database 192 may also include the renter ID 1364. Additionally, an enumeration (or enum) parameter 1365 may indicate the status of the contract, such as signed, unsigned, or completed after the transaction. An enum type is a special data type that enables for a variable to be a set of predefined constants.

FIG. 13C is a functional block diagram illustrating database schemas for vehicle data of a decentralized real property and vehicle rental system, according to various aspects of the present disclosure. The metadata for vehicles may be stored in the products and services database 191. As shown in the products and services database schema 1370 for the vehicle table in FIG. 13B, vehicle ID 1371, vehicle identification number (VIN) 1372, vehicle type 1373, title token ID 1374, rental token ID 1375, insurance token ID 1376, and status 1377 may be stored for a vehicle in the products and services database.

As shown in the products and services database schema 1380 for the listing table, the listing ID 1381, the vehicle ID 1371, the owner ID 1382, the listing type 1383, the status 1384, and the price 1385 may be stored for a vehicle in the products and services database.

As shown in the contracts database schema 1390 for the transaction table, the transaction ID 1391, the listing ID 1381, the owner ID 1382, the customer ID 1392, and the status 1393, and the price 1385 may be stored for a vehicle in the contracts database.

Figure 14:
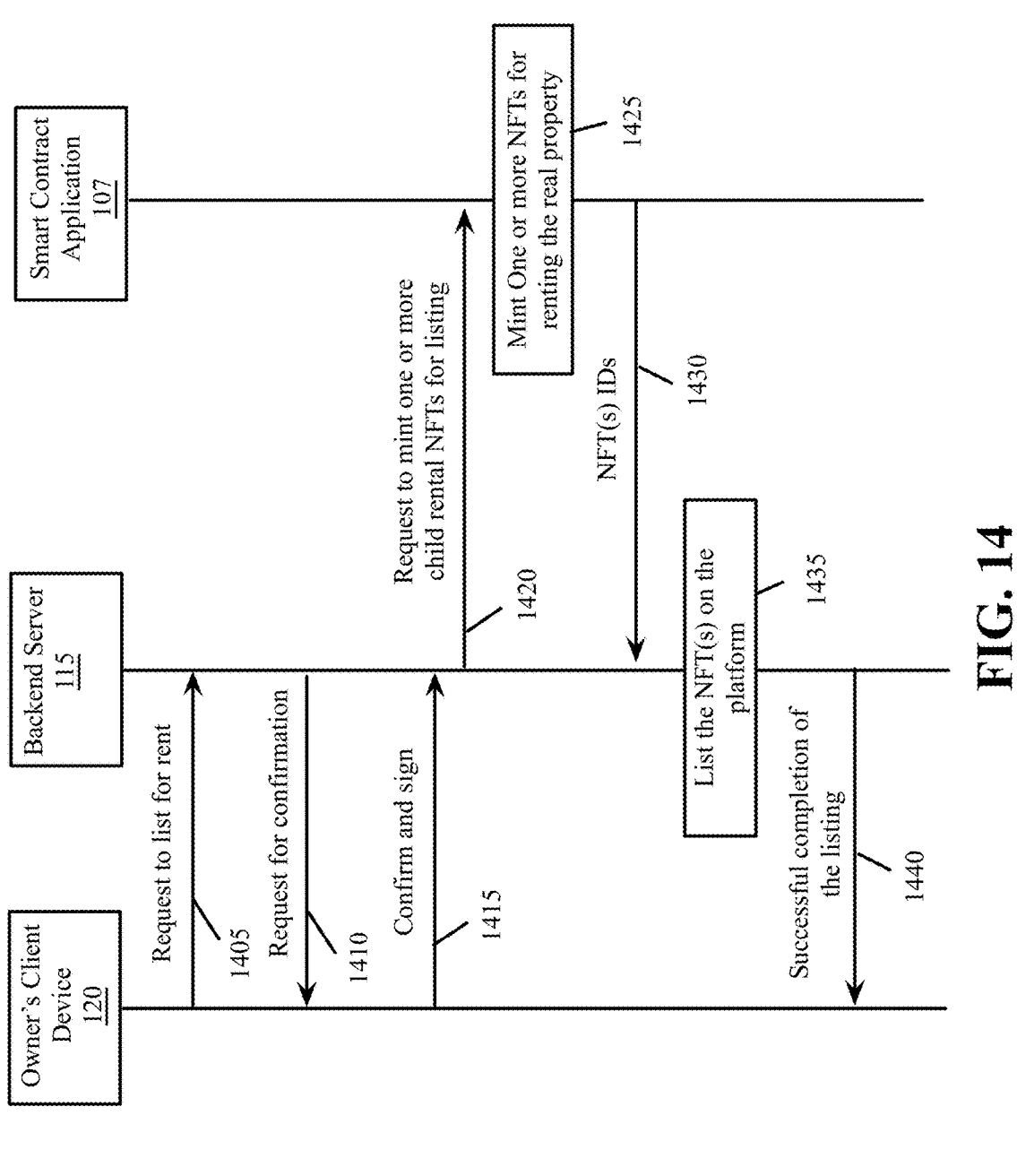
FIG. 14 is an example sequence diagram illustrating data items exchanged when an owner lists a real property or a vehicle for rent, according to various aspects of the present disclosure.

FIG. 14 is an example sequence diagram 1400 illustrating data items exchanged when an owner lists a real property or a vehicle for rent, according to various aspects of the present disclosure. With reference to FIG. 14, the owner client device 120, the backend server 115, and the smart contract application 107 may be the same the corresponding components of FIGS. 1A-1B.

As shown, the owner's client device 120 may send (at step 1405) a request to list a real property or a vehicle for rent to the backend server 115. The backend server 115 may send (at step 1410) a request for confirmation to the owner's client device 120. The owner's client device 102 may send (at step 1415) confirmation and sign. For example, the request to confirm may trigger a Web3 wallet, such as metamask, to ask for the owner's digital signature.

If the owner confirms and signs, the backend server 115 may activate (at step 1420) one or more functions of the smart contract application 107 (e.g., the mint function 155 of FIG. 1A) through the smart contract mint ABI interface 121 of FIG. 1B, to mint one or more child NFTs to rent the real property or the vehicle.

The smart contract application 107 may mint (at block 1425) one or more child rental NFTs. The smart contract application 107 may send (at step 1430) the child NFT(s) ID(s) to the backend server 115. The backend server 115 may list (at block 1435) the NFT(s) on the platform. The backend server 115 may send (at step 1440) the successful completion of the listing to the owner's client device 102. For example, the backend server 115 may inform the owner that the child NFT(s) is/are successfully generated and listed on the platform.

Figure 15:
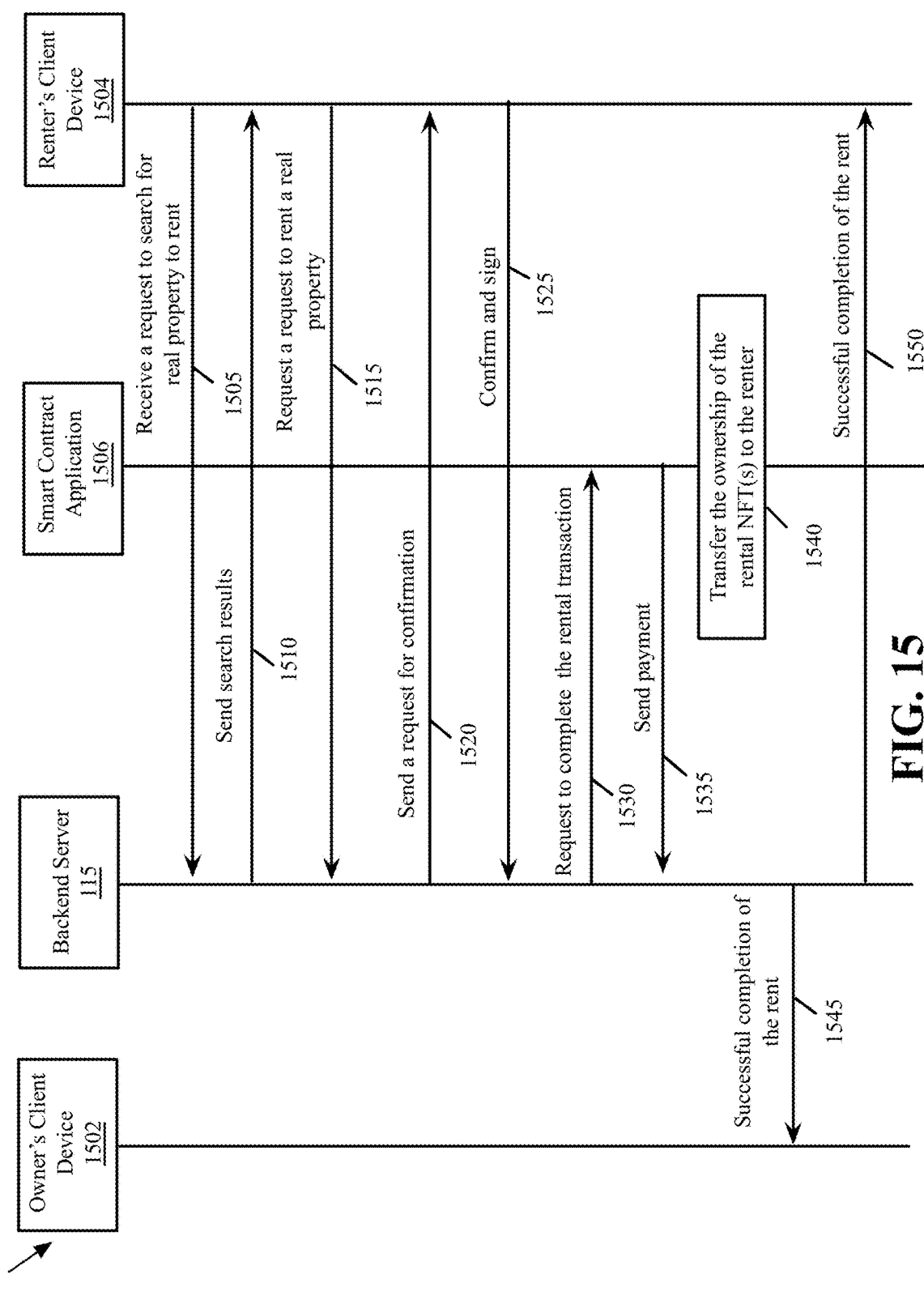
FIG. 15 is an example sequence diagram illustrating data items exchanged when renter successfully rents a listed real property or vehicle, according to various aspects of the present disclosure.

FIG. 15 is an example sequence diagram 1500 illustrating data items exchanged when renter successfully rents a listed real property or vehicle, according to various aspects of the present disclosure. With reference to FIG. 15, the owner client device 1502 may be one of the electronic devices 120 of FIG. 1A, the renter client device 1504, the backend server 115 may be another one of the electronic devices 120 of FIG. 1A. The smart contract application 107 and the backend servicer 115 may be the same the corresponding components of FIGS. 1A-1B.

As shown, a request may be received (at step 1505) at the backend server 115 from the client device 1504 of a renter to search for real property or vehicle to rent. The request may include search criteria for location, price, type of the house or vehicle, rental duration, etc. The search result may be sent (at step 1510) from the backend server 115 to the client device 1504 of the renter.

A request may be received (at step 1515) from the client device 1504 of the renter to rent a real property or the vehicle. The backend server 115 may send (at step 1520) a request for confirmation. The renter's client device 1504 may send (at step 1525) confirmation and sign. For example, the request to confirm may trigger a Web3 wallet, such as metamask, to ask for the renter's digital signature.

The backend server 115 may activate (at step 1530) one or more functions of the smart contract application 107, for example through the smart contract ABI 108 of FIG. 1A to complete the rental transaction. The smart contract application 107 may send (at step 1535) payment to the backend server 115. For example, the smart contract application 107 may send payment in the form of cryptocurrency, fiat currency, credit memo, etc. The smart contract application 107 may transfer (at step 1540) the ownership of one or more child NFTs to the renter. The smart contract application 107 may send (at step 1545) a message to the owner's client device 1502 indicating the successful completion of the rent. The smart contract application 107 may send (at step 1550) a message to the renter's client device 1504 indicating the successful completion of the rent. Depending on the terms of the smart contract, the renter may be able to use the child NFT to rent (e.g., to sublease) the corresponding real property or the vehicle.

FIG. 16 is a flowchart illustrating an example process 1600 for performing an automatic division of inheritable NFTs by an electronic, according to various aspects of the present disclosure. The process 1600, in some of the present embodiments, may be performed by the processor of the backend server 115 or an electronic device 120 of FIGS. 1A-1B that may be in communication with a distributed ledger system such as a blockchain network 150.

With reference to FIG. 16, a request from an owner of a rentable item may be received (at block 1605) to list a rentable item for rent. For example, the rentable item may be any of the tangible products or any intangible services described above that may be broken into nonoverlapping time intervals and/or into spaces. The distributed ledger system may be caused (at block 1610) to mint a rental NFT for the rentable item and assign the rental NFT to the owner of the rentable item. For example, the mint function 154 of the blockchain smart contract 107 of FIG. 1A may be caused to mint the rental NFT and assign it to the owner, as described above with reference to FIGS. 4, 6, and 11.

A request may be received (at block 1615) from the owner of the rentable item to list the rentable item for rent for a first time duration where the request includes instructions to divide the first time duration into several time durations for rent. For example, the request may be received from the electronic device of the owner, as described above with reference to block 1105 of FIG. 11.

In response to the request to rent the rentable item, the distributed ledger system may be caused (at block 1620) to mint several child rental NFTs where each child rental NFT associated with a time duration in the plurality of time durations. For example, the divide function 155 of the smart contrast application 107 may be activated to mint the child rental NFTs as described above with reference to FIGS. 3A, 7, and block 1110 of FIG. 11. The distributed ledger system to assign (at block 1625) the child rental NFTs to the owner and burn the rental NFT. For example, the divide function 155 of the smart contrast application 107 may be caused to assign the child rental NFT to the owner, as described above with reference to FIG. 9 and blocks 1115-1120 of FIG. 11.

The rentable item may be listed (at bock 1715) for rent. For example, the rentable item may be listed for rent as described above with reference to FIGS. 1A-1B and block 1130 of FIG. 12. A request from a rent applicant may be received (at bock 1720) a to rent the rentable item for a second time duration of the several time durations. For example, a request from a rent applicant may be received as described above with reference to blocks 1235-1240 of FIG. 11.

In response to the request to rent the rentable item, the distributed ledger system may be caused (at block 1640) to transfer the child rental NFT associated with the second time duration to the rent applicant. For example, the transfer function 159 of the smart contrast application 107 may be activated to transfer the child rental NFT associated with the second time duration to the rent applicant. A confirmation of the renting of the rentable item for the first set of time durations may be provided to the rent applicant and to the owner of the rentable item. For example, the electronic devices of the owner and the renter may be notified when the rental child NFT is successfully transferred to the rent applicant. The process 1600 may then end.

FIG. 17 is a flowchart illustrating an example process 1700 for performing an on-demand division of inheritable NFTs by an electronic, according to various aspects of the present disclosure. The process 1700, in some of the present embodiments, may be performed by the processor of the backend server 115 or an electronic device 120 of FIGS. 1A-1B that may be in communication with a distributed ledger system such as a blockchain network 150.

With reference to FIG. 17, a request from an owner of a rentable item may be received (at block 1705) to list a rentable item for rent. For example, the rentable item may be any of the tangible products or any intangible services described above that may be broken into nonoverlapping time intervals and/or into spaces. The distributed ledger system may be caused (at block 1710) to mint a rental NFT for the rentable item and assign the rental NFT to the owner of the rentable item. For example, the mint function 154 of the blockchain smart contract 107 of FIG. 1A may be caused to mint the rental NFT and assign it to the owner, as described above with reference to FIGS. 5A, 6, and 12.

The rentable item may be listed (at bock 1715) for rent. For example, the rentable item may be listed for rent as described above with reference to FIGS. 1A-1B and block 1220 of FIG. 12. A request from a rent applicant may be received (at bock 1720) a to rent the rentable item for a first set of one or more time durations. For example, a request from a rent applicant may be received as described above with reference to blocks 1225-1235 of FIG. 12.

In response to the request to rent the rentable item, the distributed ledger system may be caused (at block 1725) to mint a first set of one or more child rental NFTs where each child rental NFT in the first set of child rental NFTs is associated with a time duration in the first set of time durations. For example, the divide function 155 of the smart contrast application 107 may be activated to mint the child rental NFTs as described above with reference to FIGS. 3A, 7, and block 1240 of FIG. 12.

The distributed ledger system may be caused (at block 1730) to assign the first set of child rental NFTs to the rent applicant, mint a second set of one or more child rental NFTs for the rentable item for time durations other than the first set of time durations, assign the second set of child rental NFTs to the owner of the rentable item, and burn the rental NFT. For example, the divide function 155 of the smart contrast application 107 may be activated to perform these operations as described above with reference to FIGS. 3A, 7, and block 1240 of FIG. 12. A confirmation of the renting of the rentable item for the first set of time durations may be provided to the rent applicant and to the owner of the rentable item. For example, the electronic devices of the owner and the renter may be notified when the rental child NFTs are successfully minted and assigned. The process 1700 may then end.

Although several examples were discussed above for renting products and services using inheritable NFTs, the methods, processes, and user interfaces described herein, for example the process and methods described with reference to FIGS. 1A-1B, 2, 3A-3C, 4-17 may be used for selling products and services whose ownership shares may be divided, such as the artwork or collectible items described above. For selling the products and services whose ownership shares may be divided, instead of inheritable rental NFTs and inheritable child rental NFTs, inheritable ownership NFTs and inheritable child ownership NFTs may be minted and used to perform the disclosed processes and methods of the present disclosure.

The embodiments of the present disclosure provide the technical advantage of leveraging the concept of inheritable "parent" and "child" NFTs which significantly surpass the previous state of the art. The inheritable structure of the NFTs of the present embodiments ensures granular control over asset rights, distinguishing between ownership and temporary rights. The technical advantage is bolstered by blockchain's immutable record-keeping, providing a transparent and tamper-proof transaction history. The decentralized nature of the present embodiments reduces intermediary costs and offers a standardized, secure, and globally accessible platform.

II. Decentralized Real Estate Platform

Renting a house typically means an agreement where a payment is made from the renter to the house owner for the temporary use of the house. With the development of the Internet, more and more online house renting services have gradually replaced the traditional offline house renting services due to their easy and speedy processing.

However, most of the online house renting services are still in an intermediary model, where there is a middleperson (the middleperson may be a platform, an entity, or a real person) who charges service fees to help renters and owners find appropriate tenants and customers. The intermediary model has many problems. One problem is that both renters and owners may be charged a high service fee, which makes renters pay much more to rent houses and owners profit much less from lending houses. Another more significant problem is that the middleperson may not be trustworthy and may be scammers with intent to defraud, which may bring loss and misunderstanding to both the renters and the owners.

The use of blockchain may solve these problems and drawbacks. Blockchain, working as a peer-to-peer decentralized distributed ledger technology makes the records of any digital asset transparent and unchangeable and works without involving any third-party intermediary. Blockchain is the emerging and revolutionary technology that is attracting a lot of public attention due to its capability to reduce risks and frauds in a scalable manner.

As described above, the NFTs are cryptographic assets on blockchain, which not only inherit all benefits from blockchain like decentralization and safety, but also have other advantages like uniqueness and indivisible. Each NFT is a cryptographic asset with unique characteristics that distinguish it from other NFTs on the blockchain. NFTs may represent objects such as art, music, videos, and video game items. The foremost advantage of NFTs is evident in the proof of ownership. Since NFTs are on a blockchain network, the NFTs may help in associating ownership to a single account. Most importantly, NFTs are indivisible and could not be distributed among multiple owners. At the same time, the ownership advantages of NFTs ensure that buyers (e.g., the buyers of the rental NFTs) are safe from the concerns of fake NFTs. NFTs are transferable. NFTs may be sold or traded from different platforms. Examples of some of the most popular NFT trading platforms are OpenSea, Radible, and others.

However, even though the blockchain and NFTs solve many problems in house renting, applying the blockchain/NFTs technology to house renting is not easy because NFT rental mechanisms and standards are not well developed or established. In blockchain, it is easy for a user to transfer an NFT to another user, which changes the ownership of that NFT. But there is currently no prior art technique or mechanism to force the NFT to transfer back to the original owner after rental.

To solve this problem, some embodiments provide a trustworthy and applicable mechanism referred herein as parent-and-child NFT for NFT rental and apply the mechanism to house and vehicle rental. This parent-and-child NFT mechanism of the present embodiments provides the technical advantage of allowing the generation of small time-based NFTs (child NFTs) from the original NFT (parent NFT). This mechanism grants the child NFT owners some of the benefits related to the parent NFT (such as the right to use the reference real object of the parent NFT) during the time period of the child NFTs' effective time.

Figures 18A, 18B:
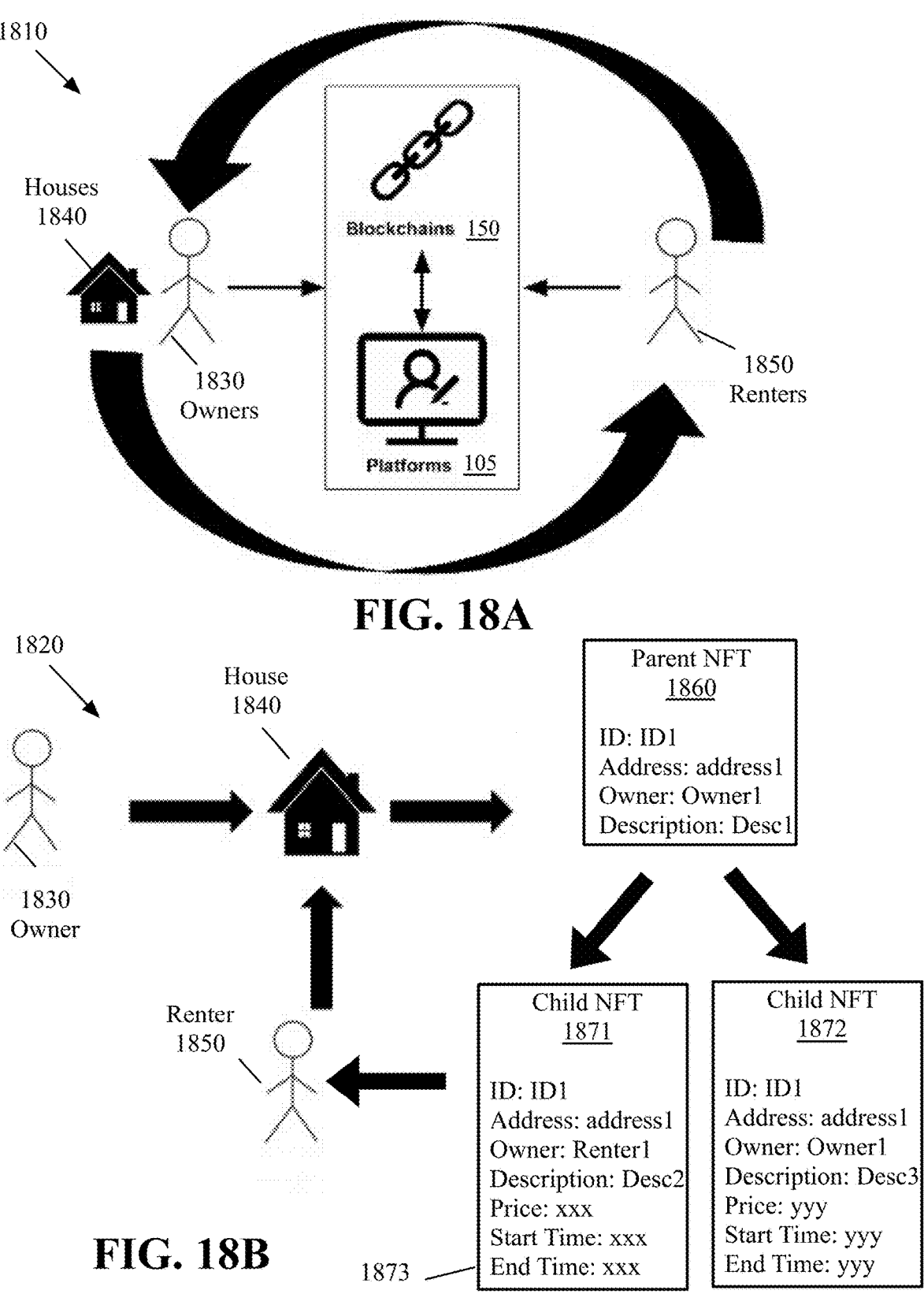
FIG. 18A is a functional diagram illustrating the high-level structure of the peer-to-peer house renting management system, according to various aspects of the present disclosure.
FIG. 18B is a functional diagram illustrating how a parent and child NFT builds a trustworthy and applicable peer-to-peer house renting system, according to various aspects of the present disclosure.

FIG. 18A is a functional diagram illustrating the high-level structure of the peer-to-peer house renting management system 1810, according to various aspects of the present disclosure. With reference to FIG. 18A, the owners 1830 may be real property owners who have the rights, and want, to rent the houses 1840. The renters 1850 may be tenants who want to pay to get the tenancy of the houses 1840. The platforms 105 and blockchain networks 150 may serve as the bridge between owners 1830 and the renters 1850. The blockchain smart contract ABI interfaces (e.g., the ABI interfaces 122-124 of FIG. 1) may be called by platforms to write and store information and records into blockchains. The owners 1830 and the renters 1850 may interact with the platforms 105 and the blockchain networks 150 through their electronic devices 120 and one or more networks 103 (e.g., as shown in FIG. 1A).

FIG. 18B is a functional diagram illustrating how a parent and child NFT builds a trustworthy and applicable peer-to-peer house renting system 1820, according to various aspects of the present disclosure. With reference to FIG. 18B, an owner 1830 may generate a parent NFT 1860 for their house 1840 after their ownership is verified. The parent NFT 1860 may represent the ownership and verification of the corresponding house 1840. Thus, the parent NFT 1860 may have the basic information of the house 1840, for example, the address, the owner, and the description of the house (e.g., number of rooms, number of bathrooms, and other amenities).

Whenever the owner 1830 wants to rent the house 1840, the owner 1830 may use the parent NFT 1860 to generate one or more child NFTs 1871-1872. The child NFTs 1871-1872 may represent some temporary rights of the corresponding house 1840. Thus, the child NFT 1871-1872 may have rental information, for example, start time, end time, and price. Once a renter 1850 becomes available, the renter 1850 may get the child NFT 1871 through buying or bidding. The owner 1850 may then use the child NFT 1871 to rent the physical house 1840 to the renter 1850. The owner 1830 may retain the ownership of the NFT 1872 until another renter is found. the original NFT 1860 may be burnt after the child NFTs 1871-1872 are generated.

Since only the child NFT 1871 is transferred during the rental, there is no need for the renter 1850 to return back NFT 1871 to the owner 1830. Since there is an attribute "end time" 1873 in the child NFT 1871, when rental time is up, the child NFT 1871 expires and may be deactivated (e.g., burnt). Thus, the renter 1850 has to leave the house 1840.

a. Real Estate Transaction Workflow

Figure 19:
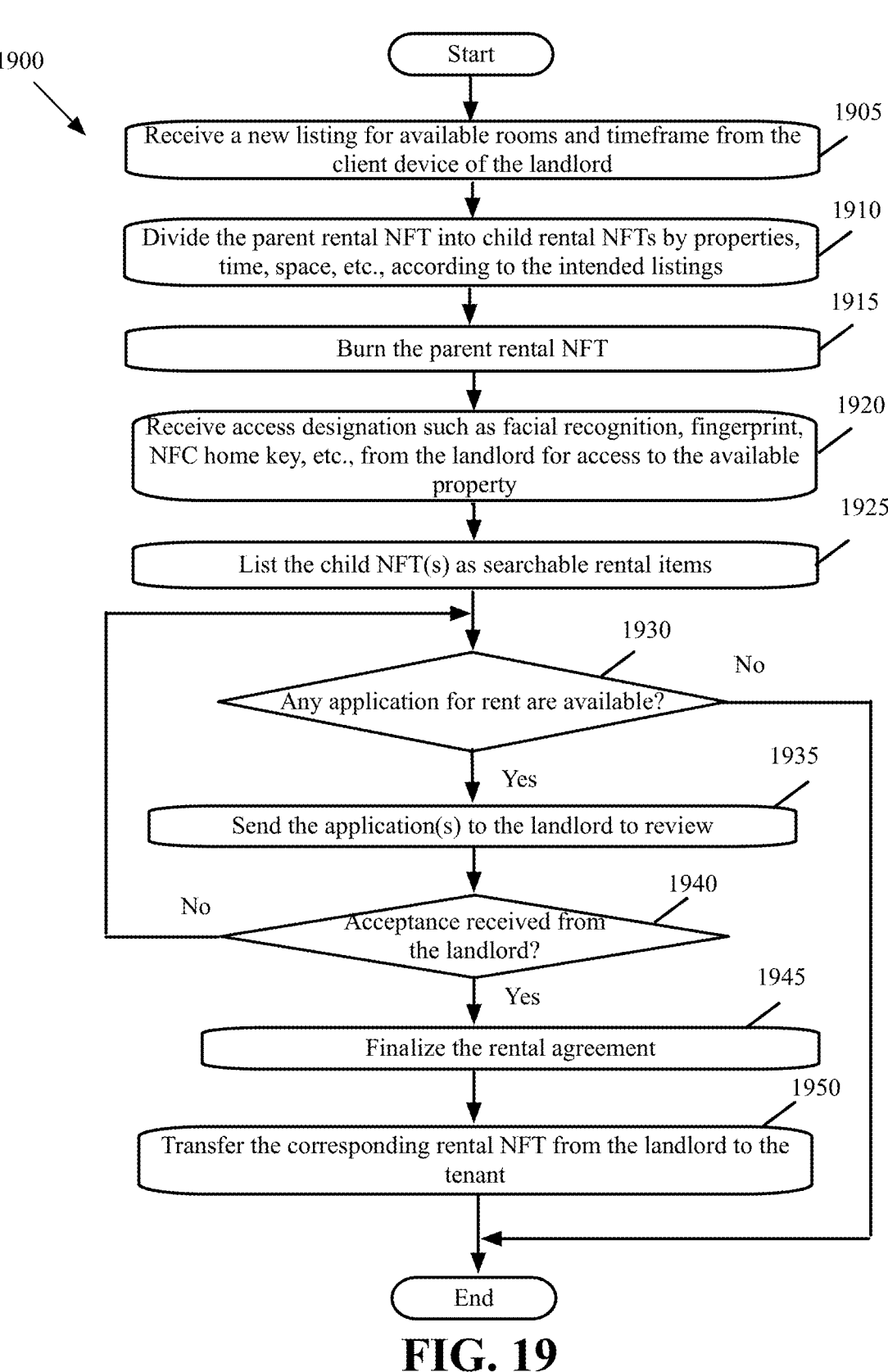
FIG. 19 illustrates a flowchart of an example process for a landlord to rent the entire or a part of a real property using child NFTs, according to various aspects of the present disclosure.

FIG. 19 illustrate a flowchart of an example process 1900 for a landlord to rent the entire or a part of a real property using child NFTs, according to various aspects of the present disclosure. The process 1900, in some embodiments, may be performed by a processor of a server, such as the backend server 115 of FIGS. 1A-1B. The process 1900 is described with reference to FIGS. 20A-20D.

FIGS. 20A-20D illustrate a schematic front view of a client device 120 with a UI displayed on the display of the client device for landlords to rent their properties, according to various aspects of the present disclosure. The client device 120 may be any of the electronic devices 120 of FIG. 1A and the UIs 2001-2005 may be parts of the UI 102 of FIG. 1A.

With reference to FIG. 19, a new listing for available rooms and timeframe may be received (at block 1905 from the client device of a landlord. The landlord may decide whether to list the property as a whole or rent out one or more rooms or spaces at a certain time. For example, the option 2060 of FIG. 20A may be selected to display the UI 2003 of FIG. 20CB to create a new listing for the whole property or a portion of the property.

Figure 20A:
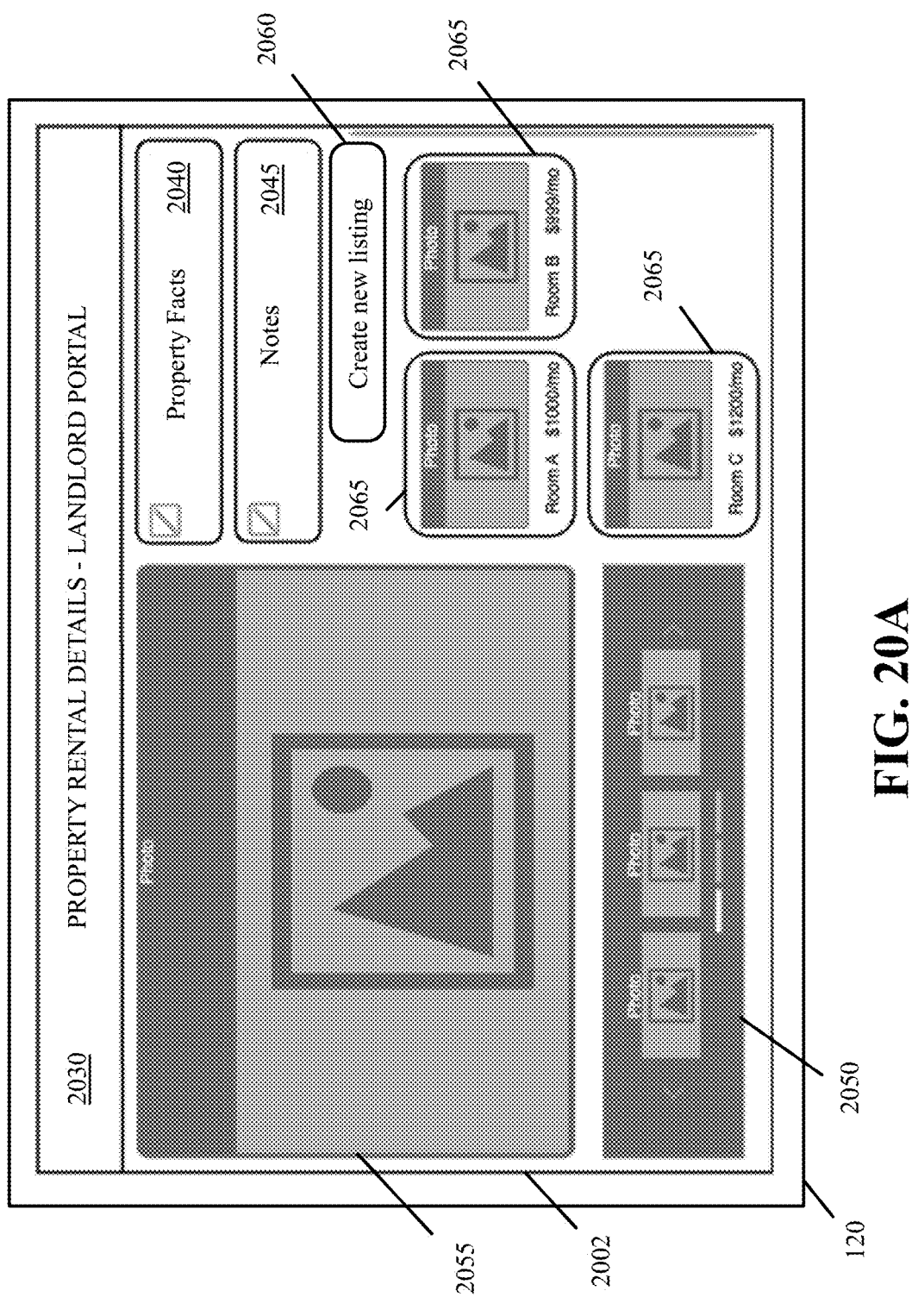
FIGS. 20A-20D illustrate a schematic front view of a client device with a UI displayed on the display of the client device for landlords to rent their properties, according to various aspects of the present disclosure.

The UI 2002 of FIG. 20A may include a banner 2030 and a display area 2050 for displaying one or more thumbnail photos of the property. Selecting any of the thumbnails may result in displaying a larger image of the selected thumbnail in the display area 2055. The UI 2002 may include a display area 2040 to enter property facts 2040 and a display area 2045 to enter notes. The UI 2002 may include a list of rooms 2065 or spaces for rent.

The UI 2003 may include a banner 2070 and a display area 2075 for uploading high resolution images of the property. The UI 2003 may include a display area 2080 to specify the details of the listing such as the detailed description of a room 2082 for rent. The UI 2003 may include a display area 2085 to set asking price, a display area 2087 to set a timeframe, and a display area 2090 to select authentication methods. The UI 2003 may include an option (e.g., a button) 2095 to submit the listing once every detail is entered.

Figure 20B:
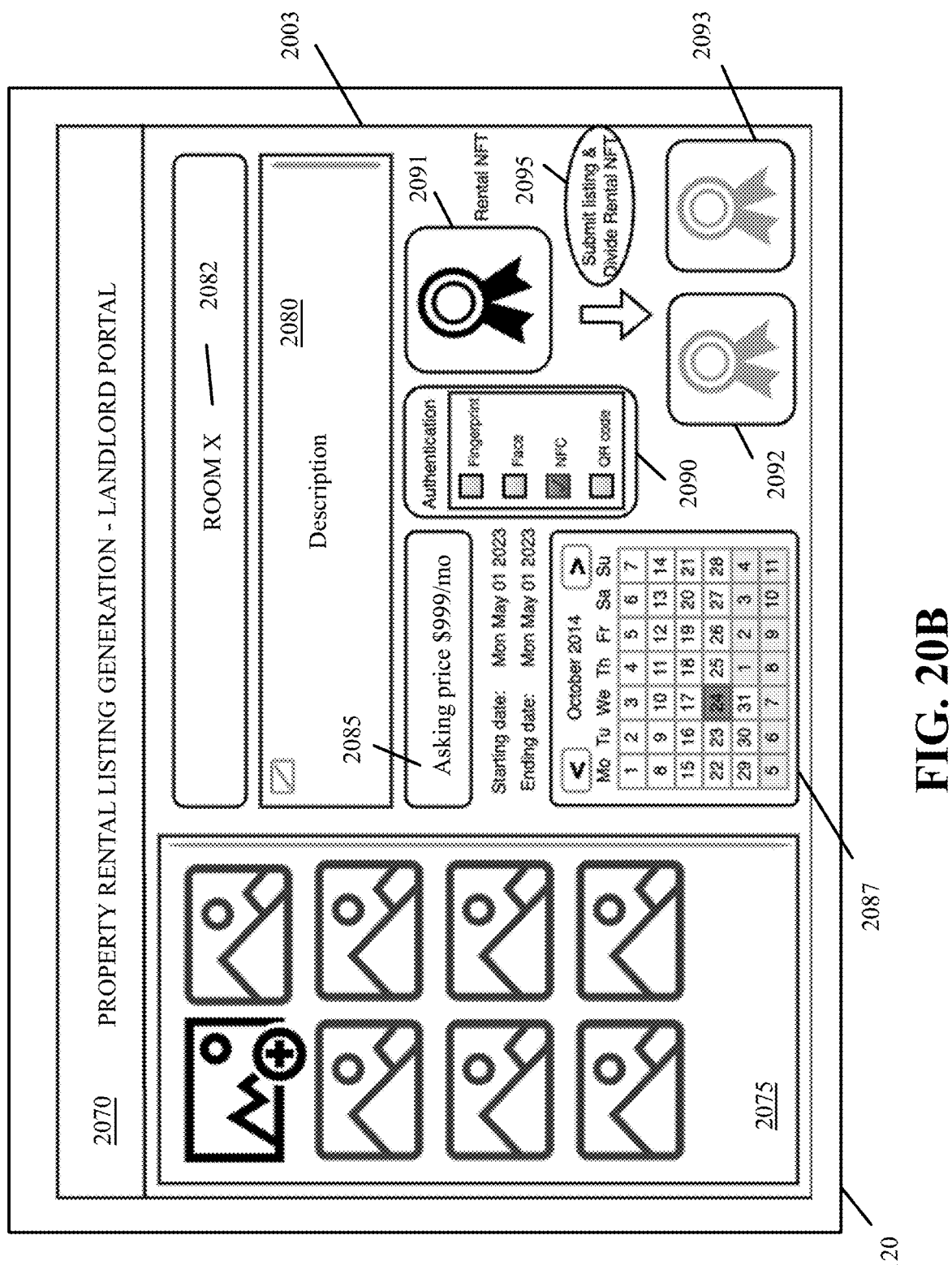

Referring back to FIG. 19, the parent rental NFT may be divided (at block 1910) into child rental NFTs by properties, time, space, etc., according to the intended listings. For example, as shown in FIG. 20B, the parent NFT 2091 of a property may be divided into child NFTs 2091-2093 to cover different portions of the property (e.g., different rooms or suits) or different time slots for rent.

The parent rental NFT may be burnt (at block 1915 of FIG. 19). Access designation such as facial recognition, fingerprint, NFC home key, etc., may be received (at block 1920) from the landlord for access to the available property. For example, the landlords may assign access methods (as shown in display area 2090 of FIG. 20B) such as fingerprint or NFC key if they have the required equipment installed on the available rooms and/or houses. The child rental NFTs may be listed (at block 1925) as searchable rental items.

Figures 20C, 20D:
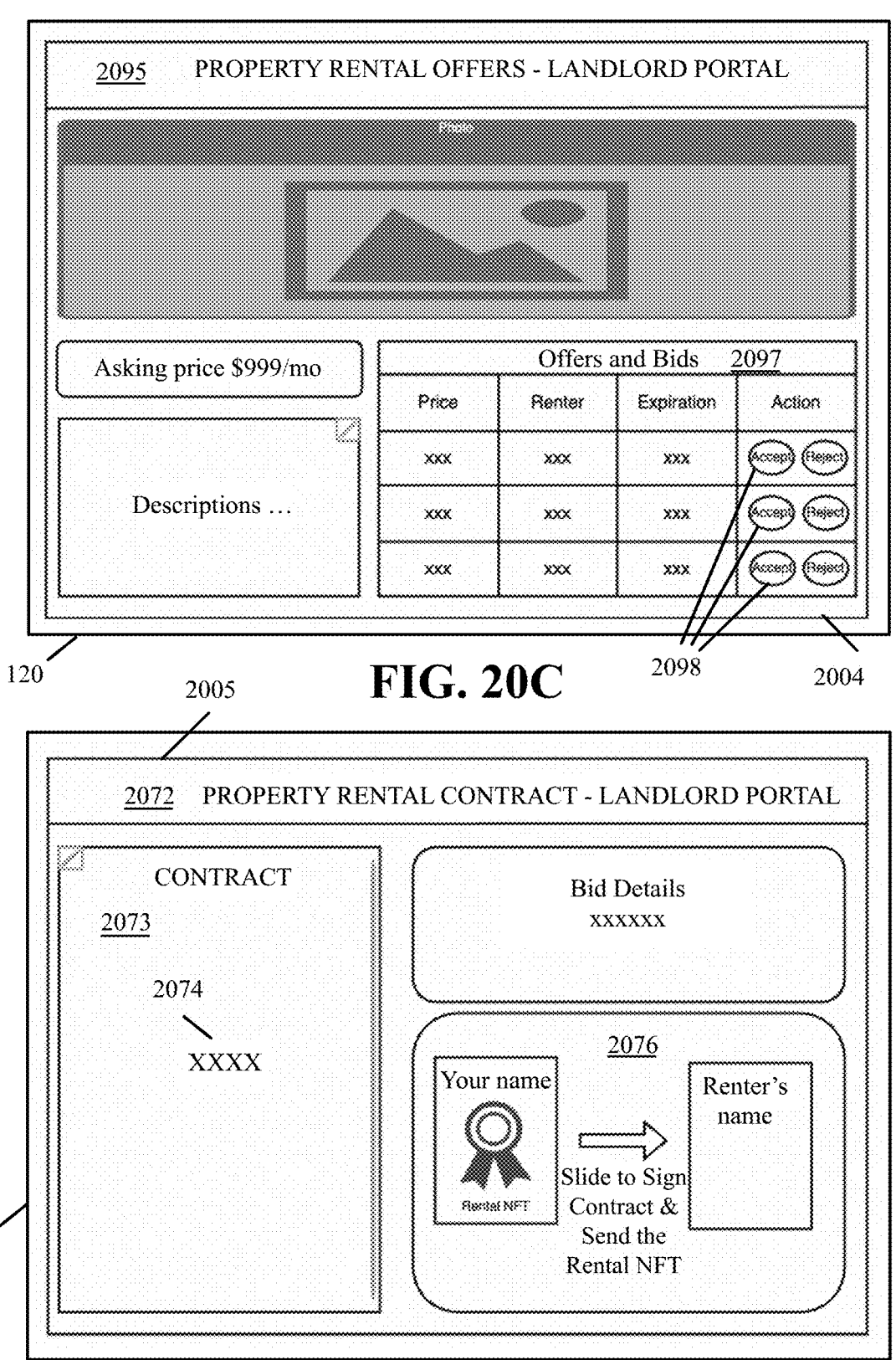

A determination may be made (at block 1930) whether any applications for rent are available. If not, the process 1900 may end. Otherwise. the application(s) may be sent (at block 1935) to the landlord to review. The UI 2004 of FIG. 20C illustrates the applications or bids that are received for a property. The UI 2004 include a banner 2095 and a display area 2097 that may display a list of applications and bids that are received for the property. The landlord may accept any of the offers or bids by selecting the corresponding accept option 2098.

A determination may be made (at block 1940 of FIG. 19) whether acceptance is received from the landlord. For example, whether the landlord has selected any of the options 2098 of FIG. 20D. If not, the process 1900 may process to block 1930, which was described above.

Otherwise, when an acceptance is received from the seller, the rental agreement may be finalized (at block 1945). For example, a rental contract may automatically be generated, ready for signature. The UI 2005 of FIG. 20D may be displayed on a landlord portal to handle the contract for renting a property. The UI 2005 may include a banner 2072 and a display area 2073 for displaying a contract for purchase of a property. To ensure the exchange is seamless, the system may generate an editable contract draft 2074 for the landlord, accompanied by a slider in the display area 2076. The slider is configured to allow for the child rental NFT token transfer from the landlord to the renter.

The renter and the landlord may use the connect wallet component of the smart contract application to connect a web3 wallet, such as metamask or Coinbase wallet, to provide their identity and/or signature to approve the contract. Any payment from the renter to the landlord may be transferred to the landlord. The rental NFT may be transferred (at block 1950) from the landlord to the renter. The process 1900 may then end.

Figure 21:
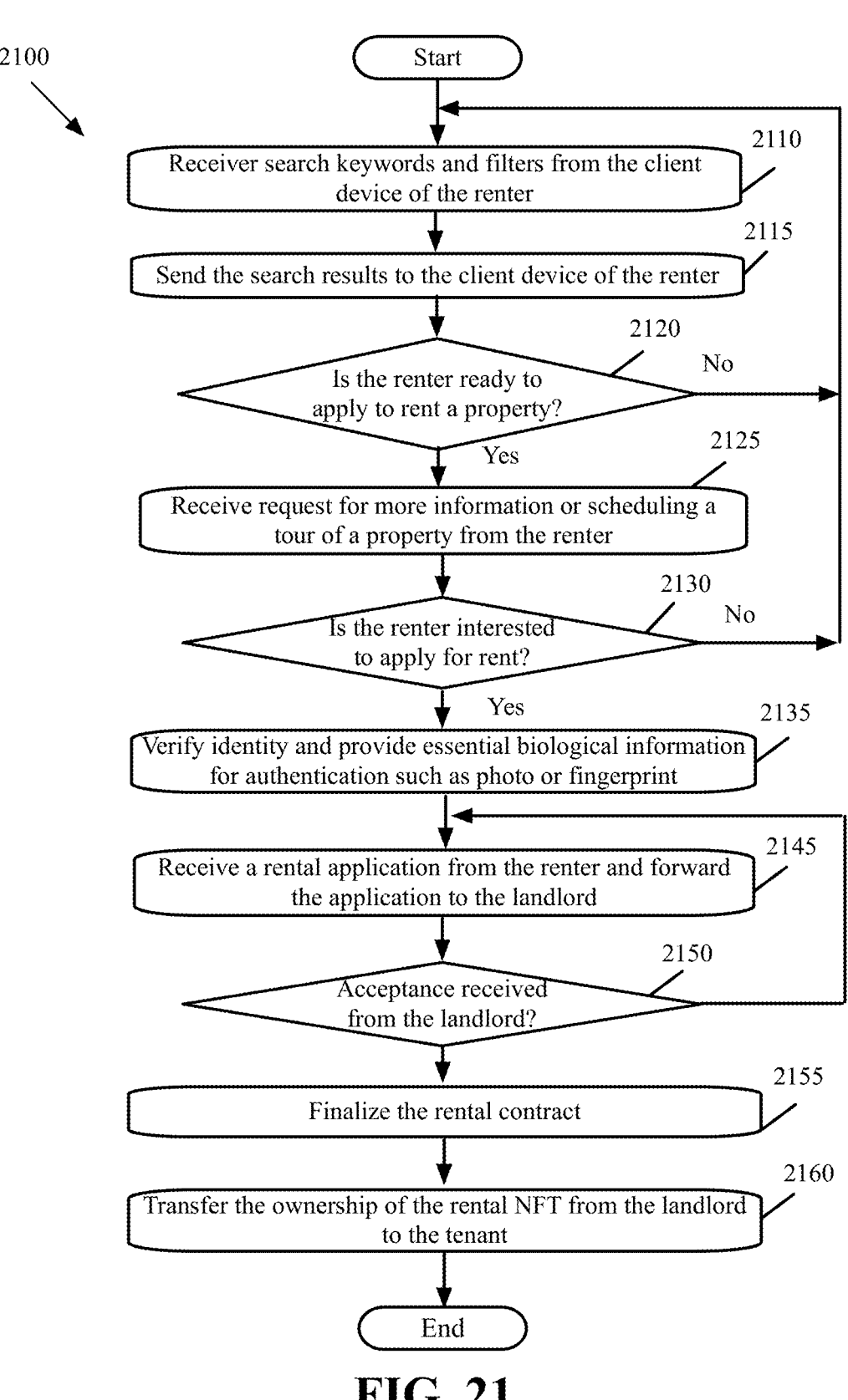
FIG. 21 is a flowchart illustrating an example process for the renting real property by new tenants using the decentralized real estate platform, according to various aspects of the present disclosure.

FIG. 21 is a flowchart illustrating an example process 2100 for the renting real property by new tenants using the decentralized real estate platform, according to various aspects of the present disclosure. The process 2100, in some embodiments, may be performed by a processor of a server, such as the backend server 115 of FIGS. 1A-1B. The process 2100 is described with reference to FIGS. 22A-22B.

Figures 22A, 22B:
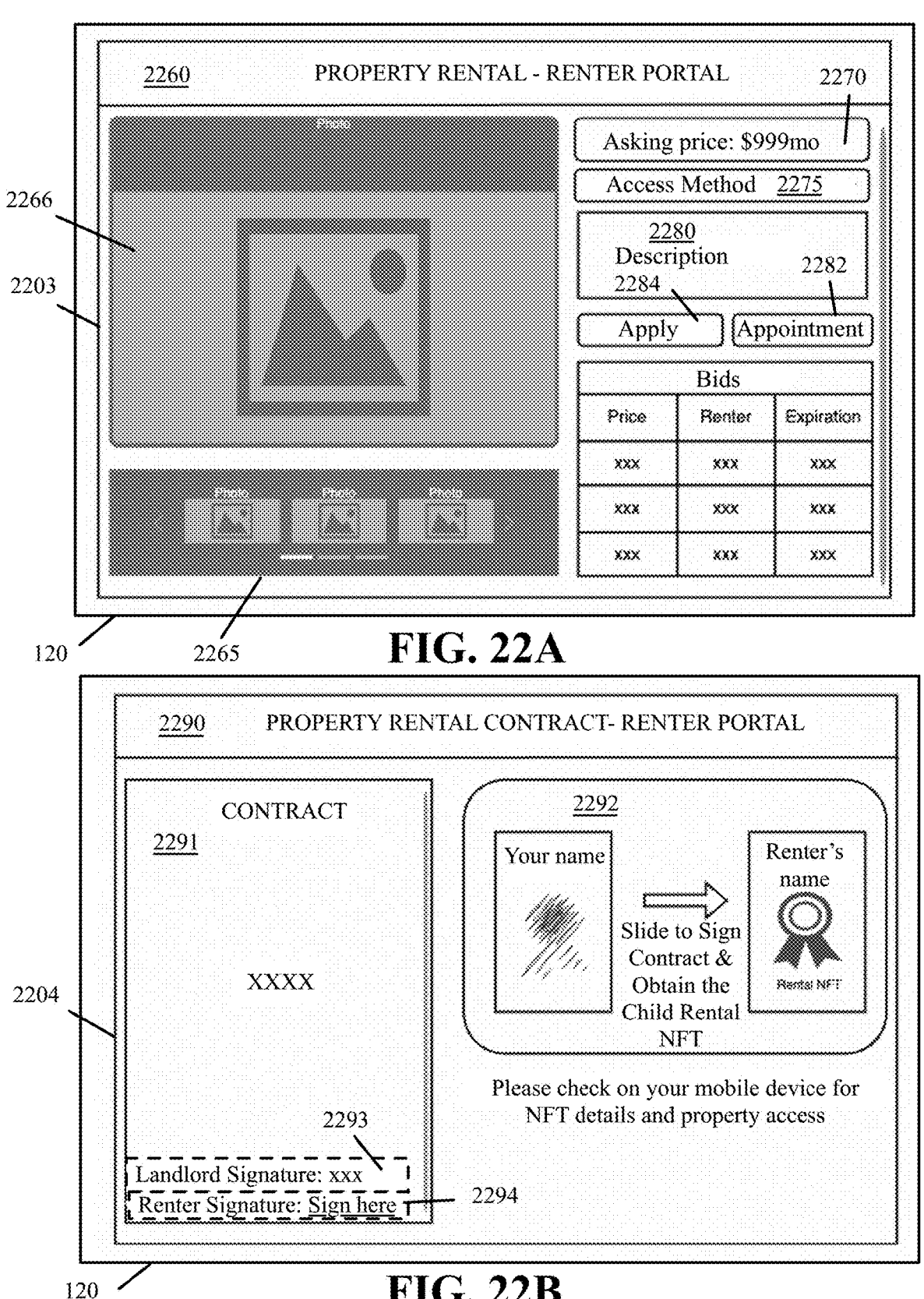
FIGS. 22A-22B illustrate a schematic front view of a client device with a UI displayed on the display of the client device for renters during the property renting process, according to various aspects of the present disclosure.

FIGS. 22A-22B illustrate a schematic front view of a client device with a UI displayed on the display of the client device for renters during the property renting process, according to various aspects of the present disclosure. With reference to FIG. 22A-22B, the client device 120 may be any of the electronic devices 120 of FIG. 1A and the UIs 2203-2204 may be parts of the UI 102 of FIG. 1A.

With reference to FIG. 21, search keywords and filters may be received (at block 2110) from the client device of the renter. For example, the search keyword and filters may include location, number of bedrooms and bathrooms, price range, etc. The search results may be sent (at block 2117) to the client device of the renter. For example, different databases may be queried to find results the match the search keywords and filters. An example of the search results returned by the process 2100 is shown in FIG. 22A. The UI 2203 may include a banner 2260 and a display area 2265 for displaying one or more thumbnail photos of the property. Selecting any of the thumbnails may result in displaying a larger image of the selected thumbnail in the display area 2266. The UI 2203 may include a display area 2280 to show the property description. In the embodiments that the property is divided by space, the UI 2203 may display additional information, such as, a photo of each space (e.g., photo of each room) and the asking rental price for the space.

A determination may be made (at block 2120 of FIG. 21) whether the renter wants to apply to rent a property. The UI 2203 of FIG. 22A illustrates different actions that a renter may take to rent a property. The UI 2203 may include a display area 2270 to show the asking rental price, a display area 2275 to show the access method (e.g., face recognition, NFT key, fingerprint, QR code, etc., as selected by the landlord), and a description 2280 of the property.

If the renter does not want to apply to rent a property, the process 2100 may return back to block 2110, which was described above. Otherwise, a request for more information or scheduling a tour of a property may be received (at block 2125) from the renter. For example, the option 2282 of FIG. 22A may be selected by the renter to see the property or otherwise receive assistant from the landlord.

A determination may be made (at block 2130 of FIG. 21) whether the renter is interested to apply for rent. For example, a determination may be made whether the option 2284 of FIG. 22A is selected. If not, the process 2100 may return back to block 2110, which was described above. Otherwise, the renter's identity may be verified (at block 2130). For example, the renter may use the connect wallet component of the smart contract application to connect a web3 wallet, such as metamask or Coinbase wallet, to verify the renter's identity. The renter may provide photo identification, biometric information such as fingerprint, etc. The confidential information may be kept securely on the blockchain network and burnt as soon as the renters move out.

A rental application may be received (at block 2145) from the renter and may be forwarded (at block 2145) to the landlord. The UI 2204 of FIG. 22B may be displayed to handle the contract for purchasing a property. The UI 2204 may include a banner 2290 and a display area 2291 for displaying a contract for purchase of a property. The UI 2204 may include a slider in the display area 2292. The slider is configured to allow for the child rental NFT token transfer from the landlord to the renter. Should the renter accept the contract's details, they may proceed to sign online through the interface in the display area 2292. Once the renter signs the contract, they may gain access to the child rental NFT from the landlord.

The landlord and renter may also use the connect wallet component of the smart contract application to connect a web3 wallet, such as metamask or Coinbase wallet, to provide their signature to sign the contract (e.g., as shown in the display areas 2293 and 2294). Any payment from the renter to the landlord may be transferred to the seller.

A determination may be made (at block 2150 of FIG. 21) whether an acceptance is received from the landlord. If not, the process 2100 may proceed back to block 2145, which was described above. Otherwise, when an acceptance is received from the landlord, the rental contract may be finalized (at block 2155). For example, a rental contract may automatically be generated, ready for signature. The renter and landlord may use the connect wallet component of the smart contract application to connect a web3 wallet, such as metamask or Coinbase wallet, to provide their signature to sign the contract. Any payment from the renter to the landlord may be transferred to the seller. The ownership of the rental NFT may be transferred (at block 2160) from the seller to the buyer. The process 2100 may then end.

b. NFT Division Concept and Examples

NFTs representing real properties possess several key attributes, including token ID, property ID, token status, availability, etc. To ensure the token ID is unique, some embodiments use a SHA-256 hash algorithm based on the original property at the time of minting. The property ID is a unique identifier for the house, starting with one or two digits for the property type, followed by around six digits using both alphabets and numbers, enabling over 10 to the power of 9 (10 billion) properties. The token status is conveyed through an enum, indicating whether the token is active, inactive, or void.

Figure 23A:
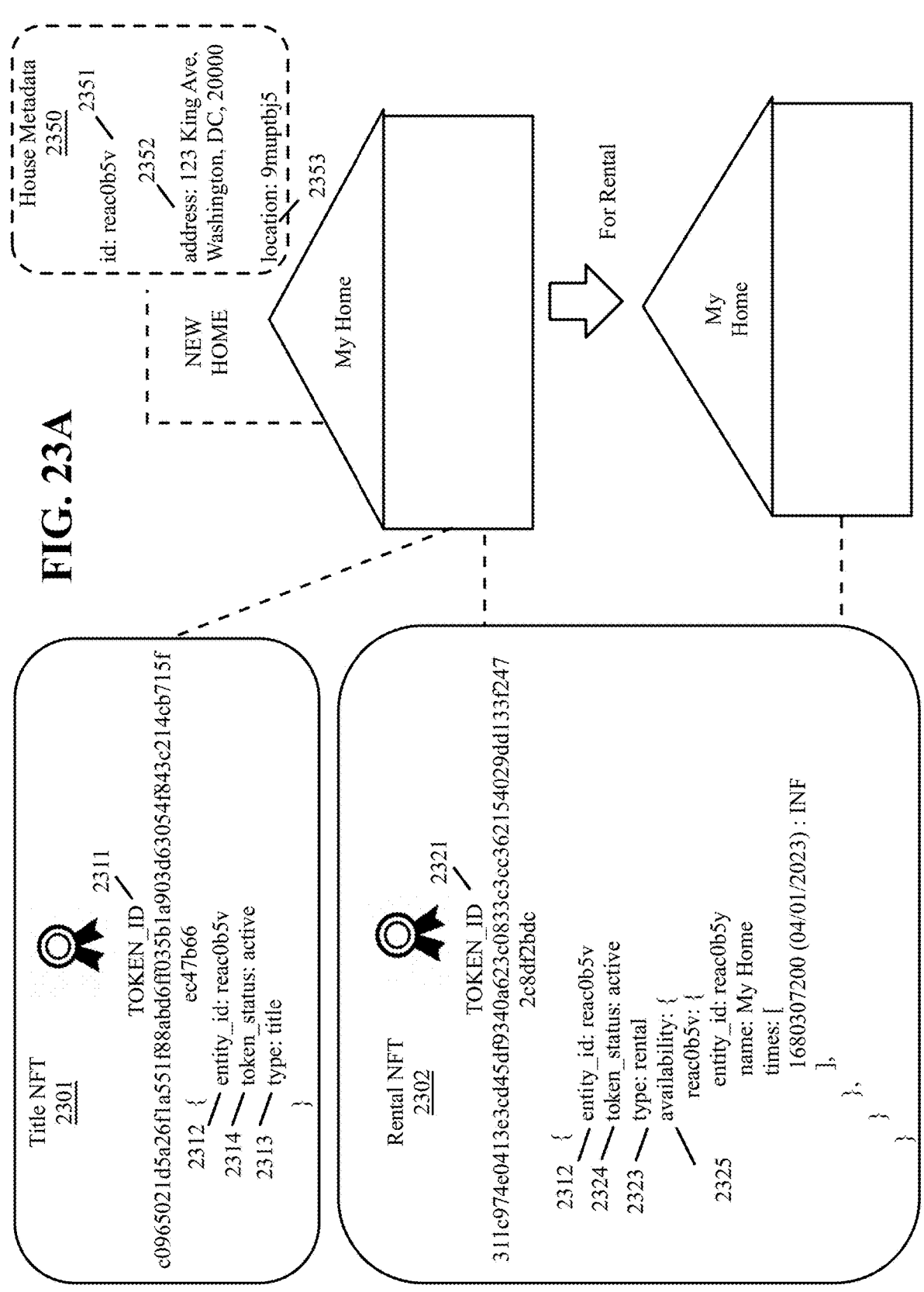
FIG. 23A illustrates examples of the two types of NFTs that may be used in the decentralized real estate platform, according to various aspects of the present disclosure.

FIGS. 23A-23D illustrate an NFT division example for house rental, where this concept is well-suited for this specific use case due to the property's divisibility by time or space. FIG. 23A illustrates examples of the two types of NFTs that may be used in the decentralized real estate platform, according to various aspects of the present disclosure. With reference to FIG. 23A, A property metadata 2360 may include the property ID 2351, the address 2352, and the property location 2353 (e.g., a GPS or lateral and longitude location).

The title NFT 2301 may be used as ownership proof of the property and the rental NFT 2302 may be used as the property is ready for rental. Landlords have the flexibility to rent out a portion of their space and choose to offer a single room, as opposed to the entire house (as depicted in 2301).

With further reference to FIG. 23A, the NFTs 2301 and 2302 are functional diagrams illustrating the title NFTs and the rental NFTs, according to various aspects of the present disclosure. The title NFT 2301 may be attached to a newly constructed house by the builder. Alternatively, the title NFT 2301 may be attached to an existing property the first time the property is registered in the platform of the present embodiments.

The title NFT 2301 serves as a title for the property, providing the homebuyer with indisputable proof of ownership. The title NFT 2301 may include a token ID 2311, a property ID (or entity ID) 2312, a type 2313, and a token status 2314.

The rental NFT 2302 may be generated when the homeowner decides to rent their home for the first time. The rental NFT 2302 may include a token ID 2321, a property ID (or entity ID) 2312, a type 2323, and a token status 2324.

The rental NFT 2302 may include an essential property "availability" 2325 in addition to what the title NFT 2301 has. The "availability" property 2325 may be a map that provides a comprehensive layout of the available spaces with their respective names, IDs, and available time slots.

Figure 23B:
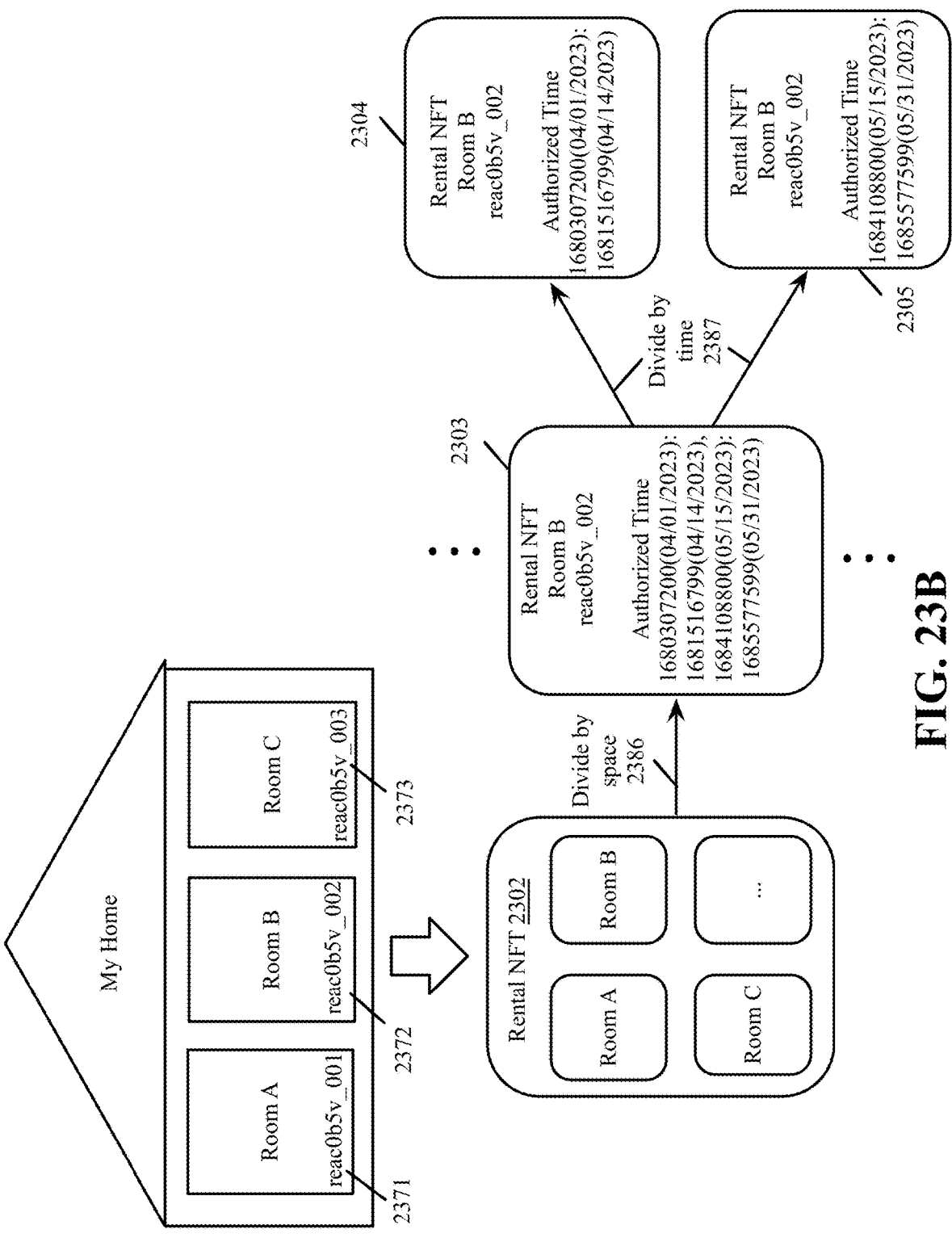
FIG. 23B illustrates a property rental example for one room at two separate time slots together with the respective rental NFT division processes, according to various aspects of the present disclosure.

FIG. 23B illustrates a property rental example for one room at two separate time slots together with the respective rental NFT division processes, according to various aspects of the present disclosure. As shown in FIG. 23B, to identify each available space, the system may rely on the property ID 2312 of the parent NFT 2302 and may add a unique or sequential identifier to generate the ID 2371, as shown in FIG. 23B 2773 for each additional space. For example, since the house has the property ID 2312 of reac0b5v, room B gets assigned an ID 2372 of reac0b5v_002. Furthermore, during the NFT division process, the parent NFT's availability data is utilized to generate new child NFTs upon request since the child NFT are always a subset of the parent NFT.

With reference to FIG. 23B, an example of dividing a rental NFT 2303 into two NFTs with mutually exclusive space and time availability is illustrated on the upper half of the diagram. As shown, the rental NFT 2302 is first divided by space (as shown by 2386) into several child NFTs (only the child NFT 2303 for room B is shown for clarity. The child NFT 2303 may be further divided into additional child NFTs by time (as shown by 2387) to rent room B in different time durations. The parent and child NFTs are, therefore, rea hierarchical NFTs where each NFT may include one or more child NFTs and each child NFT may include one or more other child NFTs to cover different space and time aspects of the rental property.

The rental NFT room B 2304 represents room B and has two available time slots: April 1st to April 14th and May 15th to May 31st. This NFT has been further divided into two other rental NFTs 2304 and 2305, each with a mutually exclusive availability period. The number of generations of the NFT is almost limitless, as each NFTs may have the ability to generate new descendants. In the example of FIG. 23B, the NFT 2304 and NFT 2305 are offspring of the NFT 2303 and may represent subleasing of room B.

Figures 23C, 23D:
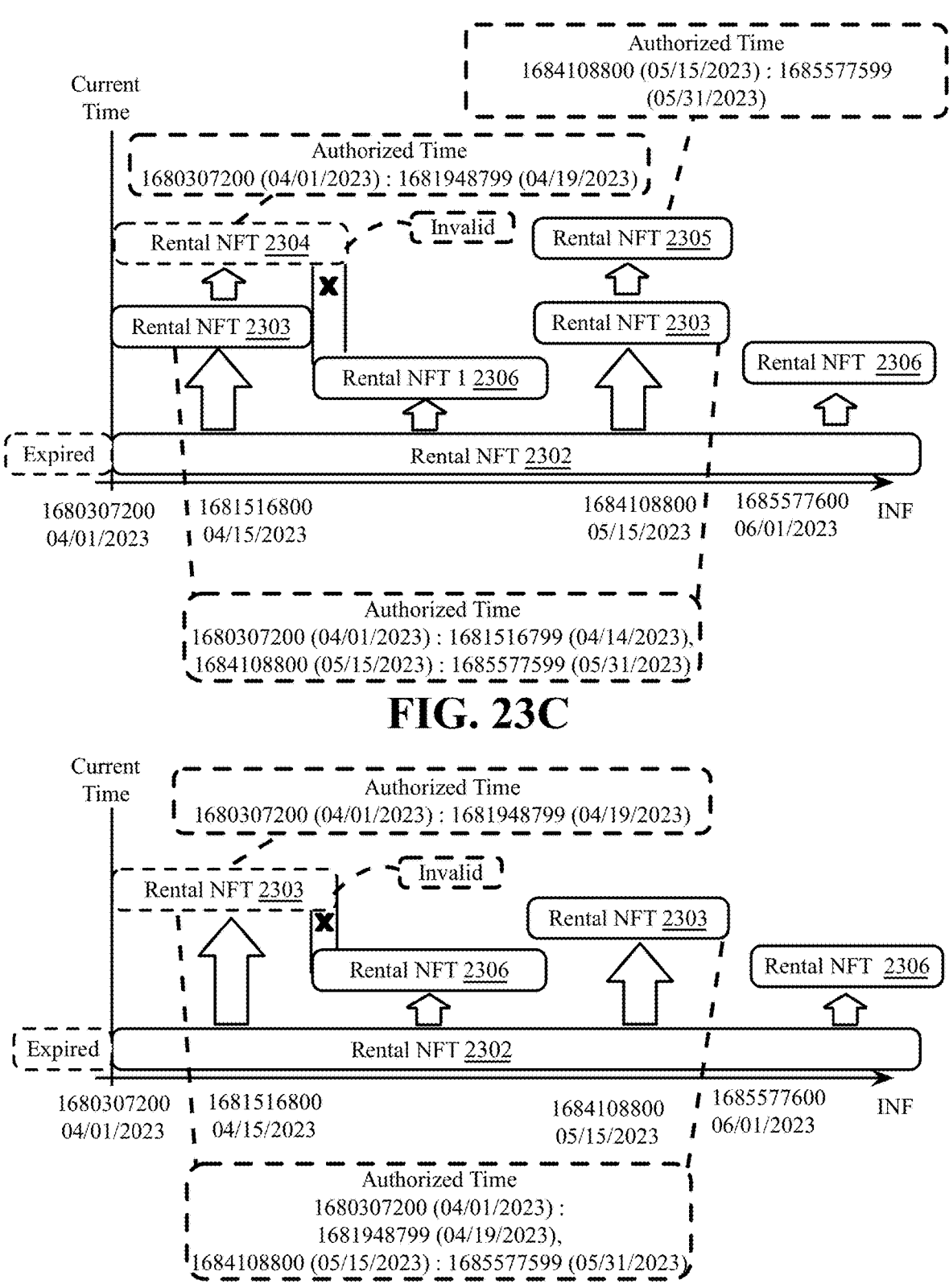
FIG. 23C is a time chart illustrating an invalid example for the divide by time process such that the authorized timeframe overtakes the availability of the rental NFT in hand, according to various aspects of the present disclosure.
FIG. 23D is a time chart illustrating another invalid example for the divide by time process such that the authorized timeframe overtakes the availability of the rental NFT in hand, according to various aspects of the present disclosure.

FIG. 23C is a time chart illustrating an invalid example for the divide by time process such that the authorized timeframe overtakes the availability of the rental NFT in hand, according to various aspects of the present disclosure. In FIG. 23C, the owner of NFT 2303 tried to post a listing that authorizes room B from Apr. 1, 2023, to Apr. 19, 2023, which exceeds the time slot for NFT 2303 itself. Since a new NFT generated from division should always be the subset of its parent, this case is invalid.

FIG. 23D is a time chart illustrating another invalid example for the divide by time process such that the authorized timeframe overtakes the availability of the rental NFT in hand, according to various aspects of the present disclosure. The example of FIG. 23D violates the mutually exclusion principle of child NFTs. In this example, the rental NFT 2306 and NFT 2303 are both divided from the rental NFT 2302 so that they should share on time authorization in common. Partial time assigned for NFT 2303 in this example has conflict with NFT 2306 between April 15th and April 19th which is not possible.

c. Property Access (Hardware)

Based on the nature of house rental, access to the property could be tedious for both the landlord and the tenant due to the lack of automation on existing platforms. As a result, the landlord would either need to send a copy of their keys in person to the tenant or use a remote-controlled door lock which is not secure for both parties. The decentralized real estate platform of the present embodiments provides various forms of authentication methods including facial recognition, fingerprint auth, passcode, QR code and NFC home entry key. The landlord and tenant may have a wide flexibility to assign and choose their desired way for property and/or room access. More specifically, the landlord may have the ability to select the authentication methods they offer (e.g., as shown in the display area 2090 of FIG. 20C) when posting new listings. Similarly, renters may select whichever verifications that work for them and provide the required information such as biological information and have them verified ahead of time.

The property entry lock of the present embodiments provides the technical advantage of being controlled and maintained by the platform instead of the landlord. The lock may be automatically set up after the contract has been signed and authorized by the details from the rental NFT held by the tenant. FIGS. 24A-24E show different forms of available property access methods offering an automatic and secure solution for property access. The security locks 2410, 2420, and 2430 may include a processor and computer readable media and may be remotely connected to the backend server(s) 115 of FIGS. 1A-1B through one or more networks 103.

Figures 24A, 24B, 24C:
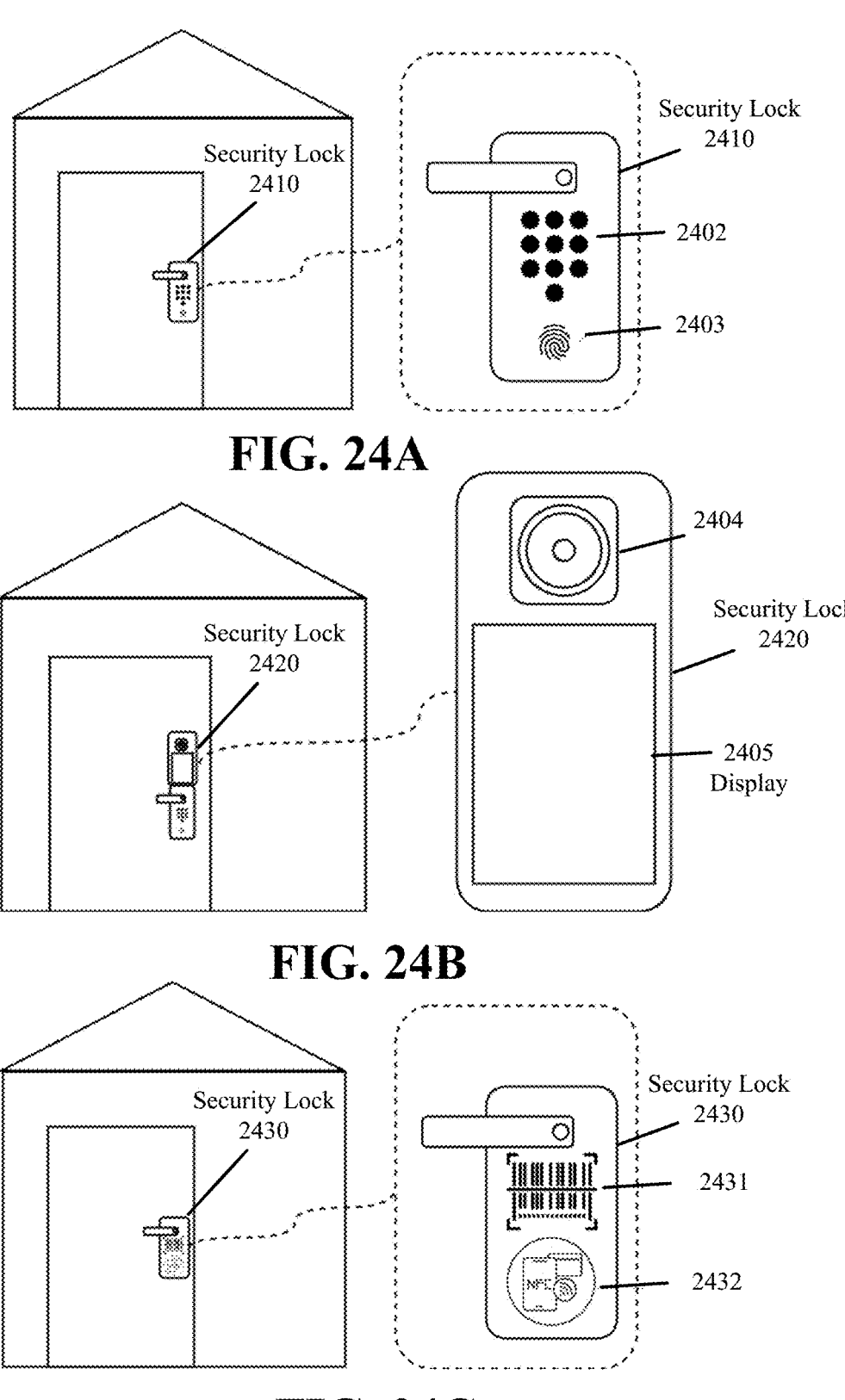
FIG. 24A is a functional diagram illustrating an example of a door lock which is equipped with a fingerprint reader and a keypad, according to various aspects of the present disclosure.
FIG. 24B is a functional diagram illustrating an example of using facial recognition for gaining access to a property, according to various aspects of the present disclosure.
FIG. 24C is a functional diagram illustrating an example of using QR code or the NFC home entry key security lock for gaining access to a property, according to various aspects of the present disclosure.

FIG. 24A is a functional diagram illustrating an example of a door lock which is equipped with a fingerprint reader 2403 and a keypad 2402, according to various aspects of the present disclosure. With reference to FIG. 24A, the renter may consent to, and may provide, a fingerprint to the backend server 115 when the renter signs the contract. The platform 105 may remotely program the lock 2410 to recognize the fingerprint as a valid entry method during the rental period. The lock 2410 may be remotely programmed by the backend server 115 not to allow entry based on the renter's fingerprint after the end of the rental period.

With further reference to FIG. 24A, the renter may choose a sequence of characters for entry and the keypad 2402 may be remotely programmed to recognize the sequence of character during the rental period to unlock the security lock 2410.

FIG. 24B is a functional diagram illustrating an example of using facial recognition for gaining access to a property, according to various aspects of the present disclosure. As shown, the security lock 2420 may include a high-resolution camera 2404 and an optional display 2405. The high-resolution camera 2404 may have the minimum requirement for a facial recognition application. For example, and without limitation, the camera 2404 may have a minimum resolution of 1080p (1920×1080 pixels). The security lock 2420, in some embodiments may include higher end camera systems which support 4K resolution, night view capability, or a depth sensor used for 3D facial recognition. The optional display 2405 may be included to assist a person to have a better idea of their position for better authentication. The display 2405 may also provide for video calls with the homeowner for guidance and assistance.

The renter may consent to, and may provide, a facial photo to the backend server 115 when the renter signs the contract. The platform 105 may remotely program the lock 2420 to recognize the face as a valid entry method during the rental period. The lock 2420 may be remotely programmed by the backend server 115 not to allow entry based on the renter's facial recognition after the end of the rental period.

FIG. 24C is a functional diagram illustrating an example of using QR code or the NFC home entry key security lock for gaining access to a property, according to various aspects of the present disclosure. As shown in FIG. 24C, the security lock 2430 may include a QR code scanner 2431. The QR code scanner 2431 enables the scanning of QR codes provided by tenants, allowing the system to recognize them.

It should be noted that in some embodiments, other codes such as barcodes may be used. Consequently, the scanner may also be configured as a barcode scanner. In addition to, or in lieu of the QR code (or bar code) scanner 2431, the security lock 2430 may include an NFC scanner 2432, which may be utilized to scan NFC tags or NFCs from NFC-enabled smartphones, enabling the system to accurately recognize them.

The renter may provide, or may be assigned a QR code, a bar code, and/or an NFC tag when the renter signs the contract. The platform 105 may remotely program the lock 2430 to recognize the assigned QR code, the bar code, and/or the NFC tag as a valid entry method during the rental period. The lock 2430 may be remotely programmed by the backend server 115 not to allow entry based on the assigned QR code, the bar code, and/or the NFC tag after the end of the rental period.

Figure 24D:
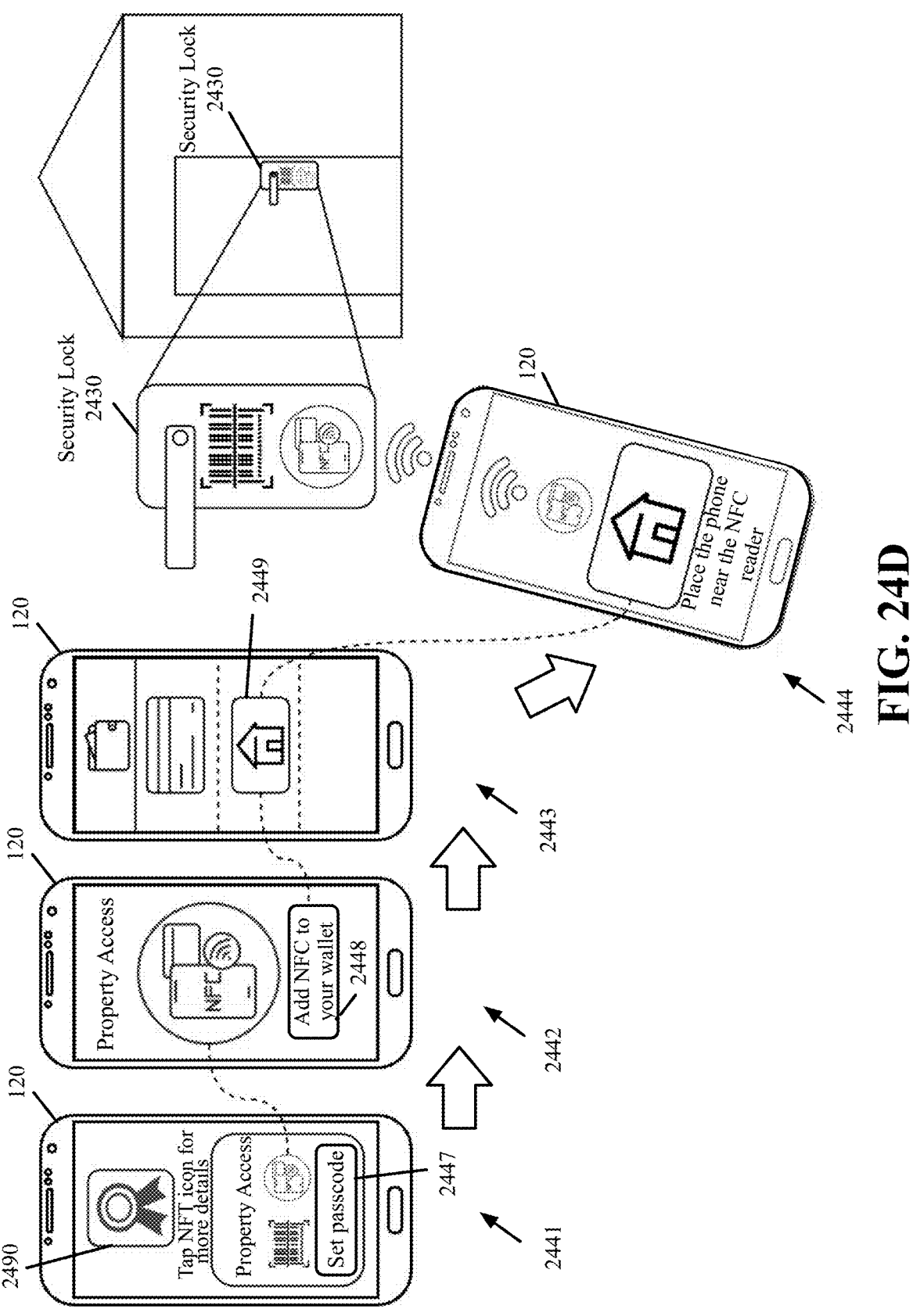
FIG. 24D is a functional diagram illustrating how tenants may utilize an NFC to gain access to their rented properties, according to various aspects of the present disclosure.

FIG. 24D is a functional diagram illustrating how tenants may utilize an NFC to gain access to their rented properties, according to various aspects of the present disclosure. The mobile device 120 may be the mobile device of a renter. Information regarding the rental contract, such as the property address, rental duration, etc., may be displayed on the mobile device 120 by selecting the NFT icon 2490.

FIG. 24D, as shown includes four operational stages 2441-2444. In stage 2441, the tenants receive emails or text messages (e.g., at the mobile device 120) from the platform 105 (FIGS. 1A-1B) once the rental NFT is purchased and the contract is generated. The option 2447 may allow the renter to set a passcode and obtain the NFC tag.

In stage 2442, the option 2448 (e.g., a button) may be selected to add the NFC tag to the mobile device's wallet. In stage 2443, the NFC tag is added to the wallet 2449. In stage 2444, the mobile device 120 may be brought to the vicinity of the security lock 2430 to provide the NFC tag from the mobile device 120 to the security lock 2430.

Figure 24E:
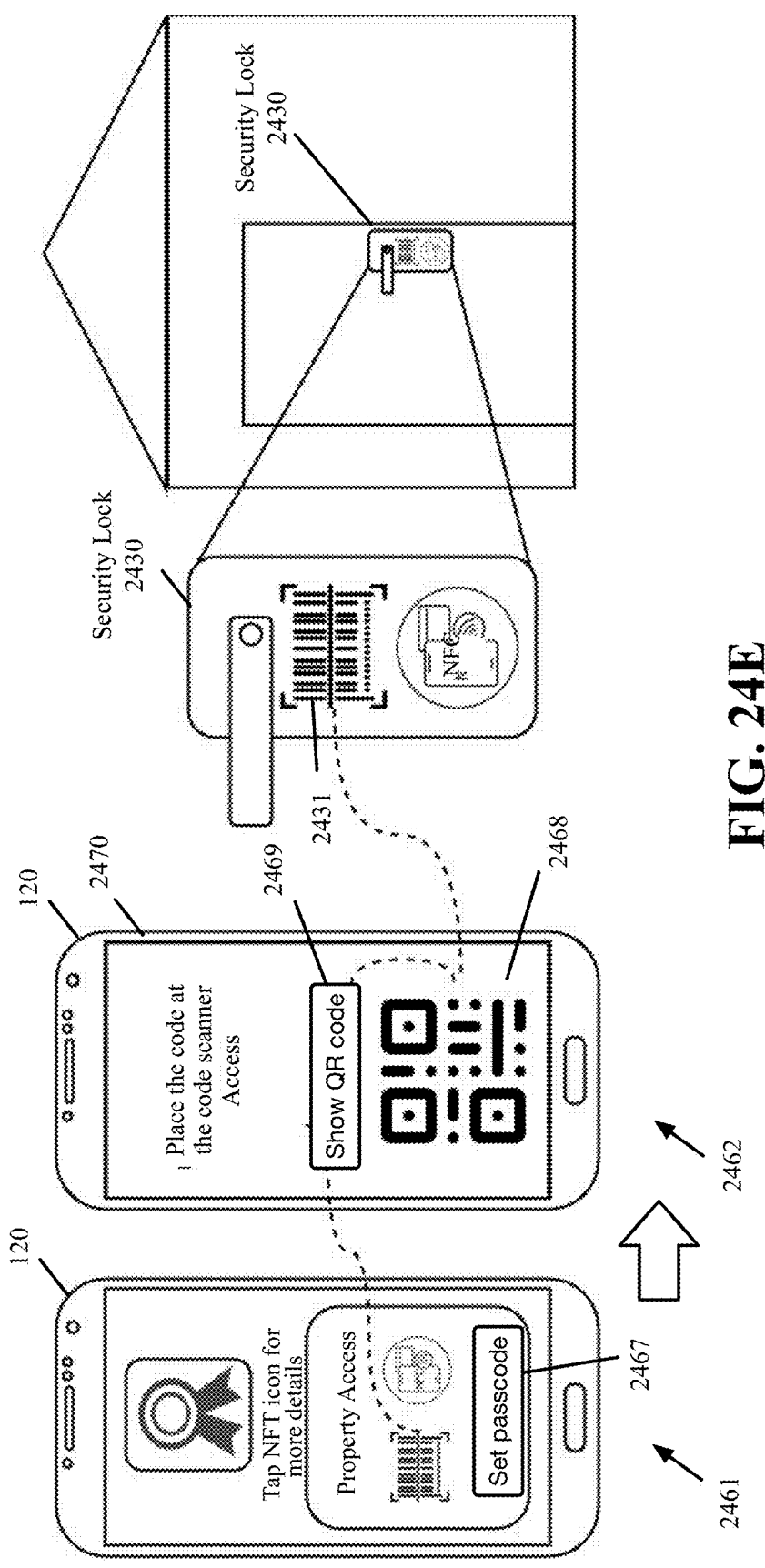
FIG. 24E is a functional diagram illustrating how tenants may utilize a QR code to gain access to their rented properties, according to various aspects of the present disclosure.

FIG. 24E is a functional diagram illustrating how tenants may utilize a QR code to gain access to their rented properties, according to various aspects of the present disclosure. The tenants, in FIG. 24E, may click on a button to obtain the QR code necessary to successfully enter the house. The mobile device 120 may be the mobile device of a renter. FIG. 24E, as shown includes two operational stages 2461-2462. In stage 2461, the tenants receive emails or text messages (e.g., at the mobile device 120) in from the platform 105 (FIGS. 1A-1B) once the rental NFT is purchased and the contract is generated.

In stage 2461, the tenants receive emails or text messages (e.g., at the mobile device 120) in from the platform 105 (FIGS. 1A-1B) once the rental NFT is purchased and the contract is generated. The option 2467 may allow the renter to set a passcode and obtain the QR code. In stage 2462, the mobile device 120 QR code 2468 may be displayed on the display 2470 of the mobile device 120 screen by selecting the option 2469 (e.g., a button) and the mobile device 120 may be brought to the vicinity of the security lock 2430 to allow the QR code 2468 to be scanned by the QR code scanner 2469 of the security lock 2430.

As described above, landlords and tenants may have the flexibility to choose any type of authentication method according to their circumstances. Some embodiments may require a minimum of two forms of authentication, one primary and one for backup in case the system is partially down unexpectedly.

d. Custom Service Components and Marketplace

In some embodiments, the platform 105 of FIGS. 1A-1B is customizable. In these embodiments, the users may implement their own services under certain conditions. It should be noted that the platform 105 is not solely intended for real estate or vehicle transactions. Instead, the platform is highly extensible, catering to different industries. There is a broad spectrum of possibilities to expand the available features to align with diverse needs. For example, in scenarios where the property owner fails to pay off their outstanding mortgage or a substantial number of buyers express interest in a single property, an auction may be conducted. This necessitates the need for a bidding service. A bidding service may share some similarities with the usual contract service, except that there is no fixed selling price for the property. Consequently, it requires incorporating additional logic on top of the traditional transaction process. The followings provide a non-limiting example of customizing platform 105 for real estate transaction.

To facilitate this use case, users may extend the transaction logic on the contract services through inheriting the logic code. This allows them to create custom implementations bypassing the standard type of transaction. Providing this flexibility provides the technical advantage of allowing the users to tailor real estate trading to their specific needs.

Figure 25:
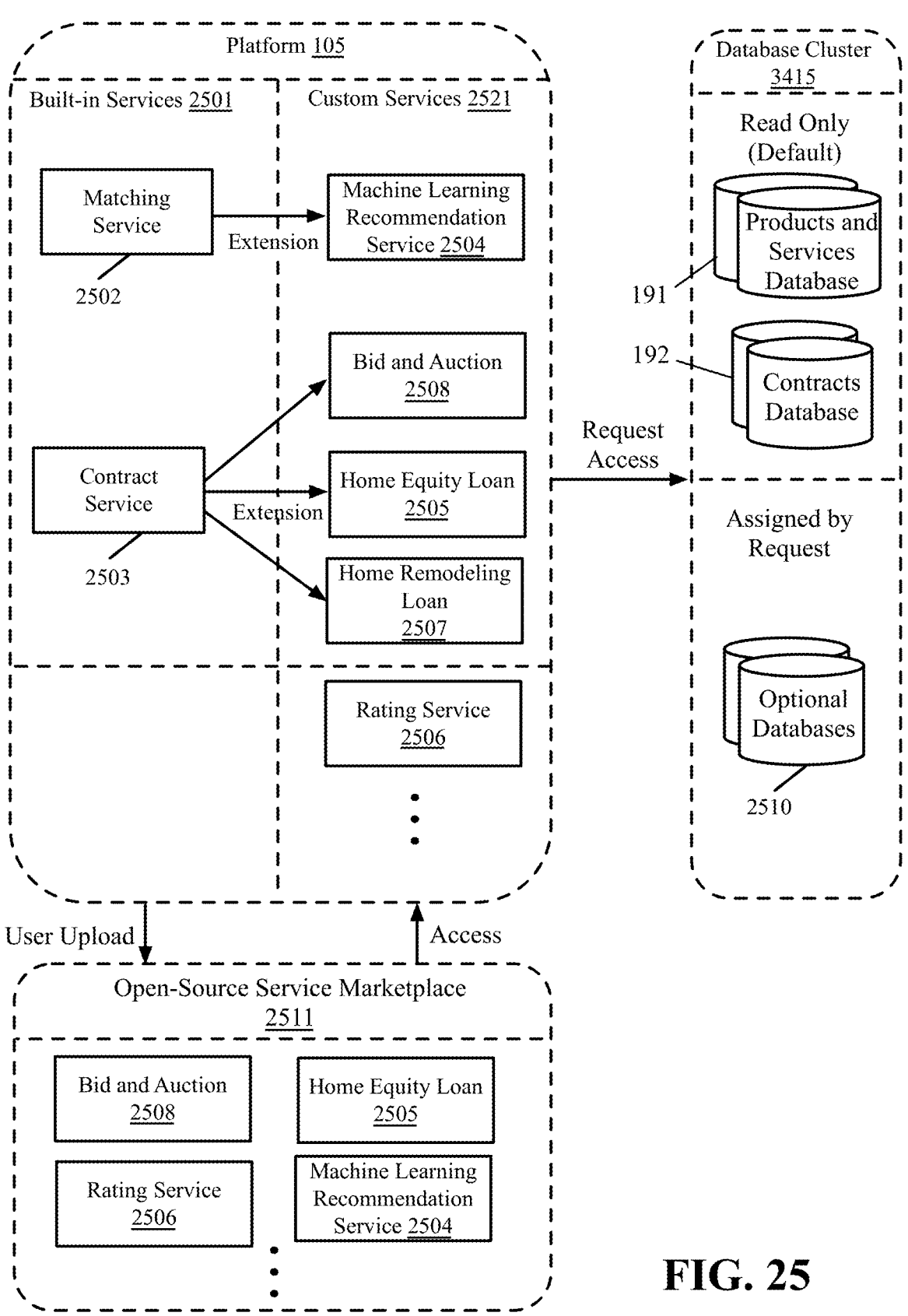
FIG. 25 is a functional block diagram illustrating the integration of custom services into the platform, along with an open-source marketplace facilitating the exchange and sharing of these services, according to various aspects of the present disclosure.

FIG. 25 is a functional block diagram illustrating the integration of custom services into the platform, along with an open-source marketplace facilitating the exchange and sharing of these services, according to various aspects of the present disclosure. The figure shows the built-in (or standard) services 2501 of the platform 105 that allow extensions and the custom services 2521. The matching service 2502 includes the basic search functionality, but the clients may require a more advanced search engine to locate the ideal property or attract more buyers. Consequently, a machine learning recommendation service 2504 may be implemented that bases its recommendations on a user's previous searching history and interests. In addition, there may be transaction methods beyond what the standard version of contract service supports. For example, an individual may transact with a financial institution, allowing the homeowner to apply for a home equity loan 2505 or a home remodeling loan 2507 based on their property's current value. Furthermore, additional services may be created from scratch, such as a rating service 2506 that supports client or property ratings and reviews, bid and action 2508 that supports bids and auctions, etc.

Custom services may have access to the existing databases in the database cluster 2515, including the products and services database 191 and the contracts database 192, but with limited access permission (e.g., a read only default permission). If necessary, optional databases 2510 may be assigned by request. Data partition may be handled automatically by the system or may be designated by the developers.

To enable users to leverage the benefits of customized services created by other developers, some embodiments may establish an open-source service marketplace 2511 that facilitates sharing and reducing the effort required to customize the platform. The developers may open source their source code for maximum transparency per the nature of blockchain applications. The developers may be encouraged to provide straightforward APIs and comprehensive documentation which may be beneficial for other users. A rating system may also be introduced which rewards top-notch developers.

III. Decentralized Vehicle Transaction Platform

Some of the present embodiments provide a decentralized vehicle transaction and record platform that offers transparency and integrity to the market and history data. The platform utilizes NFTs for assigning ownership and controlling access to the vehicles. The platform also integrates with remote tracking devices and smart vehicle keys and locks.

The decentralized vehicle transaction platform of the present embodiments facilitates vehicle transactions and record-keeping and ensures market transparency and data integrity. The platform leverages NFTs to assign ownership and access control to vehicles. The platform also integrates with remote tracking devices and smart keys and locks, adding a seamless and smooth experience for users.

A. System Overview

Vehicles, such as automobiles, yachts, drones, airplanes, and helicopters are movable objects, making them ideal for blockchain technology. The decentralized vehicle transaction platform of the present embodiments provides solutions for purchasing, selling, renting, and limiting access to vehicles while eliminating intermediaries in the transaction process. Employing blockchain technology provides the technical advantage of storing all transaction details on the blockchain, providing a transparent and secure system.

The NFT division techniques described above is utilized in vehicle rental. To facilitate vehicle rental, the rental NFTs may be divided based on the authorized time for usage. The title NFTs and the rental NFTs work in conjunction with two other NFTs for vehicles, namely, insurance NFTs and license NFTs. Further details on how the NFTs are used during vehicle rental, in some embodiments, are described below.

The decentralized vehicle transaction system 100 of the present embodiments may include the components shown in FIGS. 1A-1B. Maintaining vehicle databases is crucial for recording the metadata of the vehicles. The information stored includes the type of vehicle, such as automobiles (cars, SUVs, trucks), boats (yacht, private carrier), motorcycles, recreational vehicles (RVs), all-terrain vehicles (ATVs), drones, airplanes, helicopters, etc. Additionally, the vehicle's status should be recorded in the database to indicate whether the vehicle is currently rented, on sale, or off the market. The vehicle identification number (VIN) may be used as the unique identifier for each entity, or a new unique identification (ID) may be created for the records. Four different NFT IDs (the title NFT, the rental NFT, the insurance NFT, and the license NFT) associated with the vehicle may also be stored. The entry records may be the ID if already generated, otherwise they may be a 'null' value. Moreover, the status of the vehicle may be included in the schema to identify whether the vehicle is in good condition or retired if being totaled in an accident.

The products and services database 191 of FIG. 1A may be used to store all current and historical listings of the vehicles. The products and services database 191 may include a unique ID as primary key for a record and the vehicle ID as a foreign key from the vehicle database for easy linking back. A listing type field may be used determine whether a listing is a rental listing or a sales listing. A status field may be 'on market' if currently available on the marketplace or 'off market' for historical records. A price filed may store the price for a specific listing.

The transaction database 193 of FIG. 1A may store the details of every transaction, including new purchases, sales, as well as rentals. A UUID may be generated to serve as the unique identifier for each record. The vehicle ID may be required as a foreign key from the products and services database 191 to keep track of the specific vehicle involved in the transaction. A type field may denote the category of the transaction, which may be either a rent, a purchase, or a test drive. The renter and buyer IDs may identify the two users or parties participating in the transaction. Finally, a status field may indicate whether or not the transaction has been completed.

The tracking history database 194 of FIG. 1A may store the record of the vehicle location history for a certain period of time that may be specified by the user. The tracking history database 194 may be used by the tracking service 162 of the vehicle access and use component 160 of FIG. 1B. A preset refresh rate and storage limit may be predefined, and the stale location data may be stashed frequently by an automated task.

b. Vehicle Transaction Workflow

Figure 26:
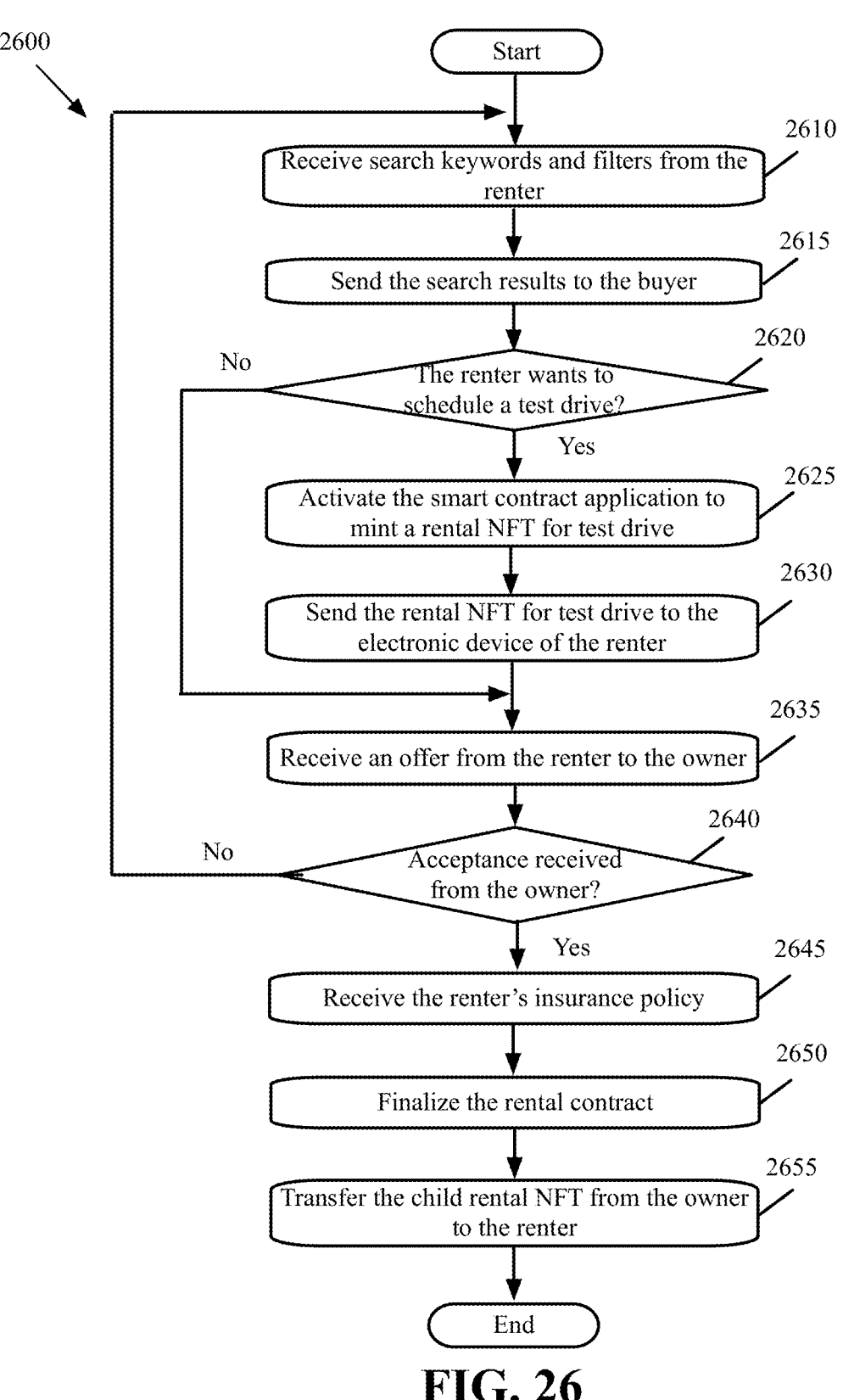
FIG. 26 is a flowchart illustrating a process for the renting vehicles using NFTs, according to various aspects of the present disclosure.

FIG. 26 is a flowchart illustrating a process 2600 for the renting vehicles using NFTs, according to various aspects of the present disclosure. The process 2600, in some embodiments, may be performed by a processor of a server, such as the backend server 115 of FIGS. 1A-1B. The process 2600 shows a vehicle rental process using NFTs. All communications of process 2600 to or from the owner and renter are made through their corresponding electronic devices.

With reference to FIG. 26, search keywords and filters may be received (at block 2610) from the renter. For example, the search keyword and filters may include type of vehicle, color, price range, etc. The search results may be sent (at block 2615) to the seller. For example, different databases may be queried to find results the match the search keywords and filters.

In some embodiments, the renter may use the search component 141 of FIG. 1B to search for vehicles. FIGS. 27A-27D illustrate a schematic front view of a client device with a UI displayed on the display of the client device for vehicle renters during the vehicle rental process, according to various aspects of the present disclosure. With reference to 27A-27D, the client device 120 may be any of the electronic devices 120 of FIG. 1A and the UIs 2701-2704 may be parts of the UI 102 of FIG. 1A.

Figure 27A:
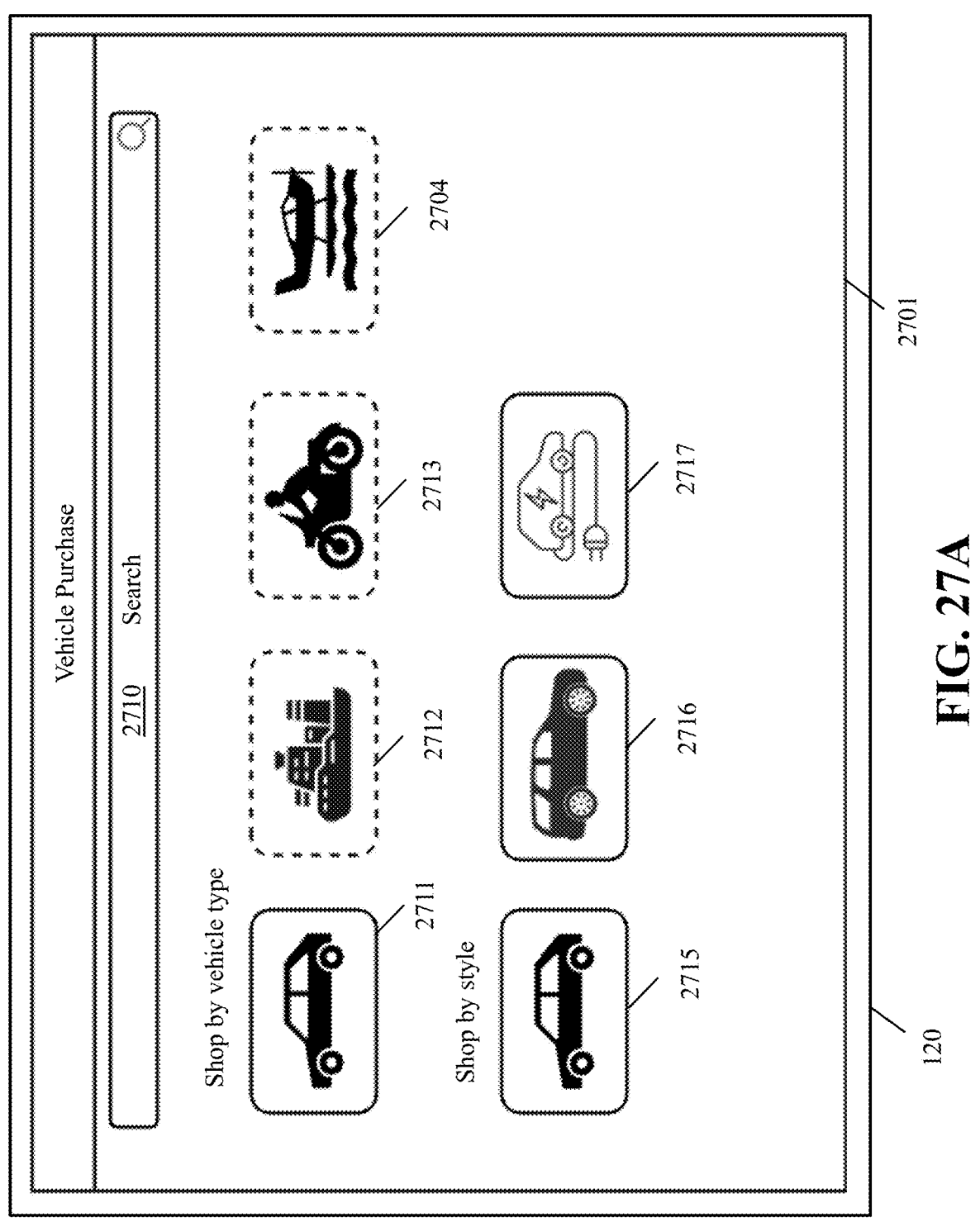
FIGS. 27A-27D illustrate a schematic front view of a client device with a UI displayed on the display of the client device for vehicle renters during the vehicle rental process, according to various aspects of the present disclosure.

The UI 2701 of FIG. 27A shows the vehicle renter landing page, where the renters may select their preferred vehicle type and body style. It should be noted that this platform is designed to support transactions for a variety of vehicles, not just limited to cars. Therefore, the users may have rent cars 2711, boats 2712, motorcycles 2713, airplanes 2714, and other types of vehicles using the system of the present embodiments. In the example of FIG. 27A, the client is looking for car rentals and may have selected on the car icon 2711 to begin search for vehicles. As shown, the car icon 2711 is shown by solid line and the icons for other types of vehicles 2712-2714 are shown by dashed lines. Selection of the car icon 2711 may result in displaying additional options 2715-2717 to shop by style. For example, the buyer may then select from a range of subcategories, including cars 2715, SUVs 2716, and electric vehicles (EVs) 2717 to narrow down their search. Alternatively, the users may enter their search criteria in the search area 2710.

Figure 27B:
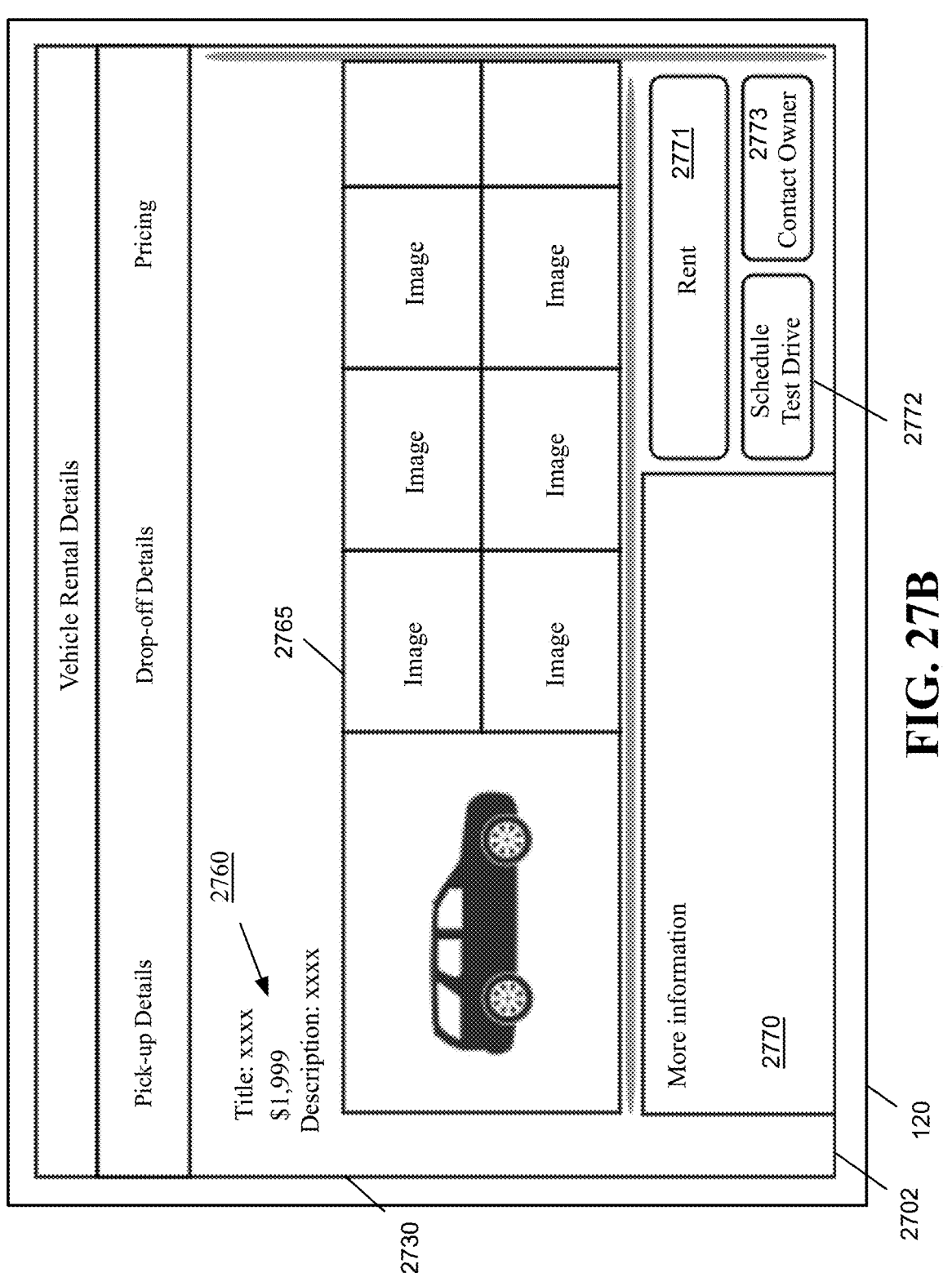

After a vehicle that best suits the renter's need is selected, the UI 2702 of FIG. 27B may provide the vehicle details. The UI 2702 may have the title, price and brief description 2760. The images of the vehicle may be displayed in the display area 2765. More information 2770 such as the information of the vehicle, equipment on board and owner's notes may be listed on the page. The renter may have may be provided with options (e.g., buttons) to rent the vehicle 2771, schedule a test drive 2772, or contact 2773 the owner for more information.

Referring back to FIG. 26, a determination may be made (at block 2620 of FIG. 26) whether the renter wants to schedule a test drive. For example, a determination may be made whether the option to schedule test drive 2772 of FIG. 27B is selected. If the buyer does not want to schedule a test drive, the process 2600 may proceed to block 2635, which is described below.

Otherwise, the smart contract application may be activated to mint (at block 2625) a rental NFT for test drive. The test drive rental NFT may be sent (at block 2630) to the renter's electronic device. The test drive rental NFT may be a short term rental NFT from the owner, which, together with an insurance NFT and license NFT, grants the buyer access to the vehicle within a specified timeframe. A UI similar to the UI 2704 of FIG. 27D, which is described below, may be displayed to handle the contract for an NFT to test drive a vehicle by a car renter.

At block 2635, an offer may be received from the buyer to the seller. A determination may be made (at block 2640) whether an acceptance is received from the owner. If not, the process 2600 may proceed back to block 2610, which was described above. Otherwise, when an acceptance is received from the owner, the renter's insurance policy may be received (at block 2645).

Figure 27C:
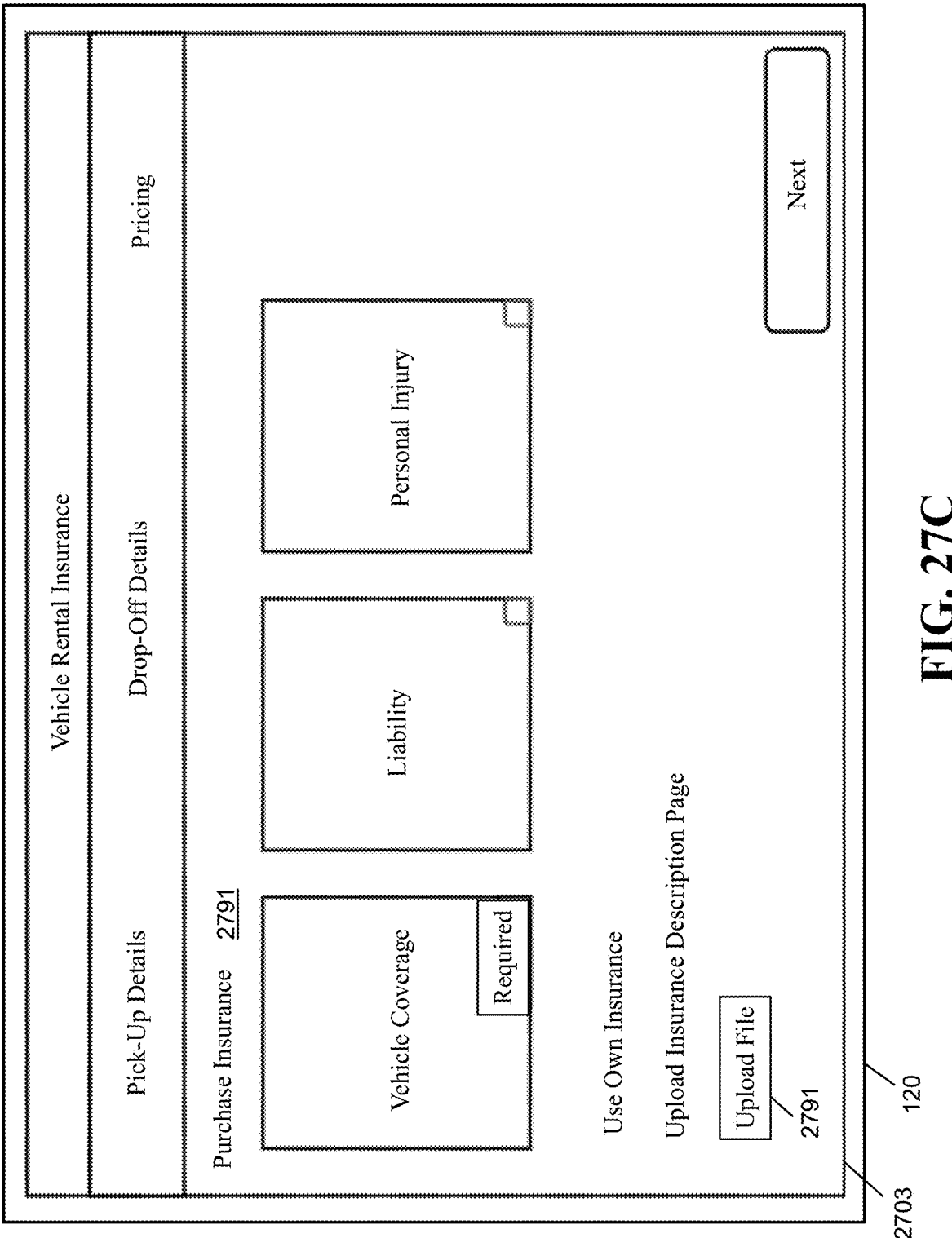
Figure 27D:
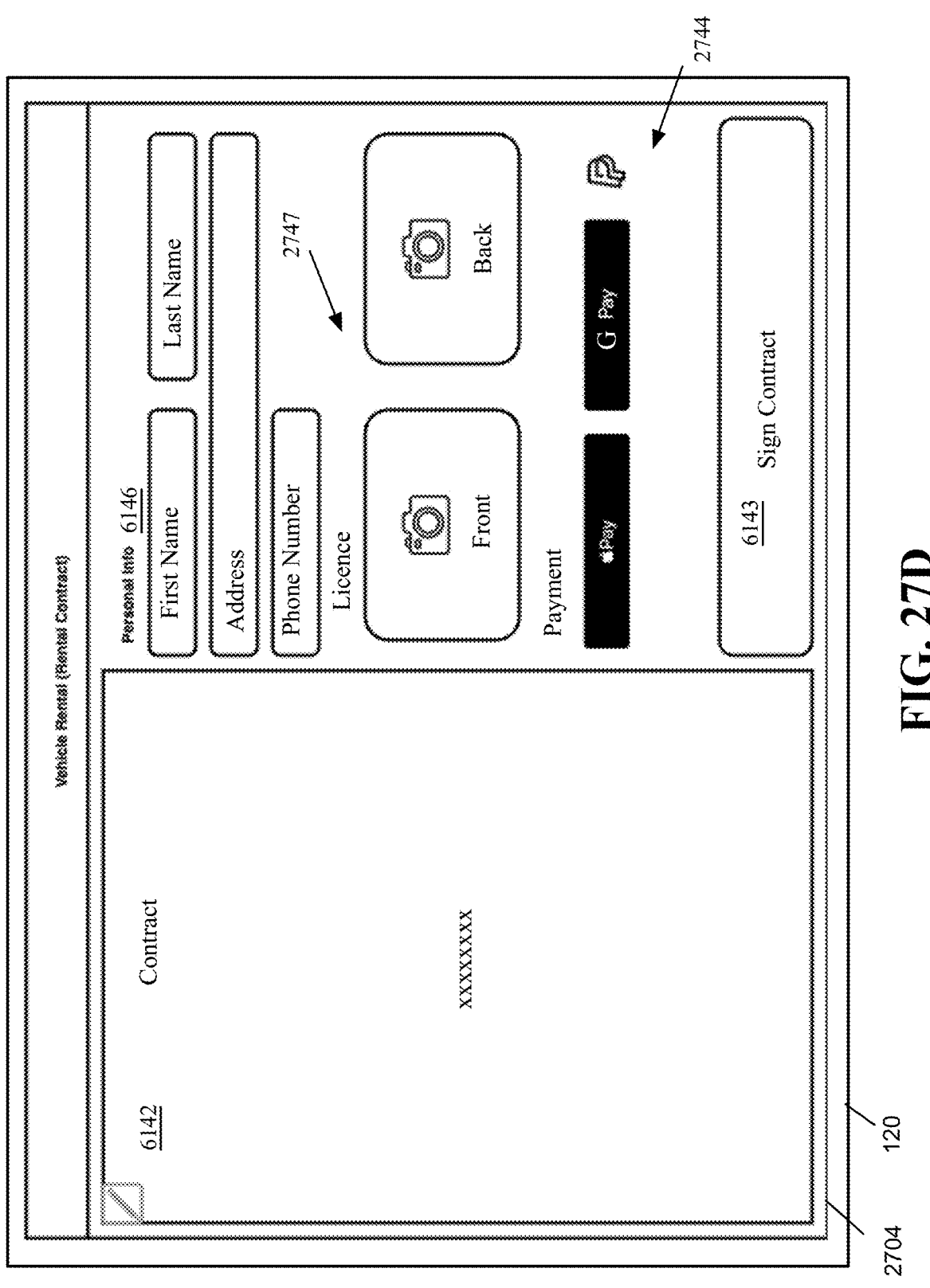

The UI 2703 of FIG. 27C may be displayed at the renter's client device to provide evidence of insurance coverage. The renter, in some embodiments, is required to purchase or provide insurance proof since every vehicle may need valid insurance to be operated legally. Vehicle coverages are usually coming from the owner of the vehicle while liability and personal injury coverage may be purchased through the display area 2792 of UI 2703 of FIG. 27C. If the renter has their own insurance which meets the requirement, they option 2791 may be selected to upload and validate the insurance declaration page.

The rental contract may be finalized (at block 2650 of FIG. 26). For example, a contract may automatically be generated, ready for signature through the contract component 146 of FIG. 1B. Finalizing the The UI 2704 of FIG. 27D may be displayed to handle the contract for renting a vehicle. The UI 2704 may include a display area 2742 for displaying the contract for renting of the vehicle. The UI 2704 may include options 2746 to enter personal information, options 2747 to provide photos of driver license, options 2744 to enter payment terms, and an option 2743 to sign the contract to get the vehicle's child rental NFT that covers the rental period. Once the renter signs the contract, they may gain access to the child rental NFT from the vehicle owner.

The renter and owner may also use the connect wallet component of the smart contract application to connect a web3 wallet, such as metamask or Coinbase wallet, to provide their signature to sign the contract. Any payment from the buyer to the renter may be transferred to the owner. The financial documents may be finalized, etc. The child rental NFT for the vehicle may be transferred (at block 2655) from the owner to the renter. The process 2600 may then end.

Figure 27E:
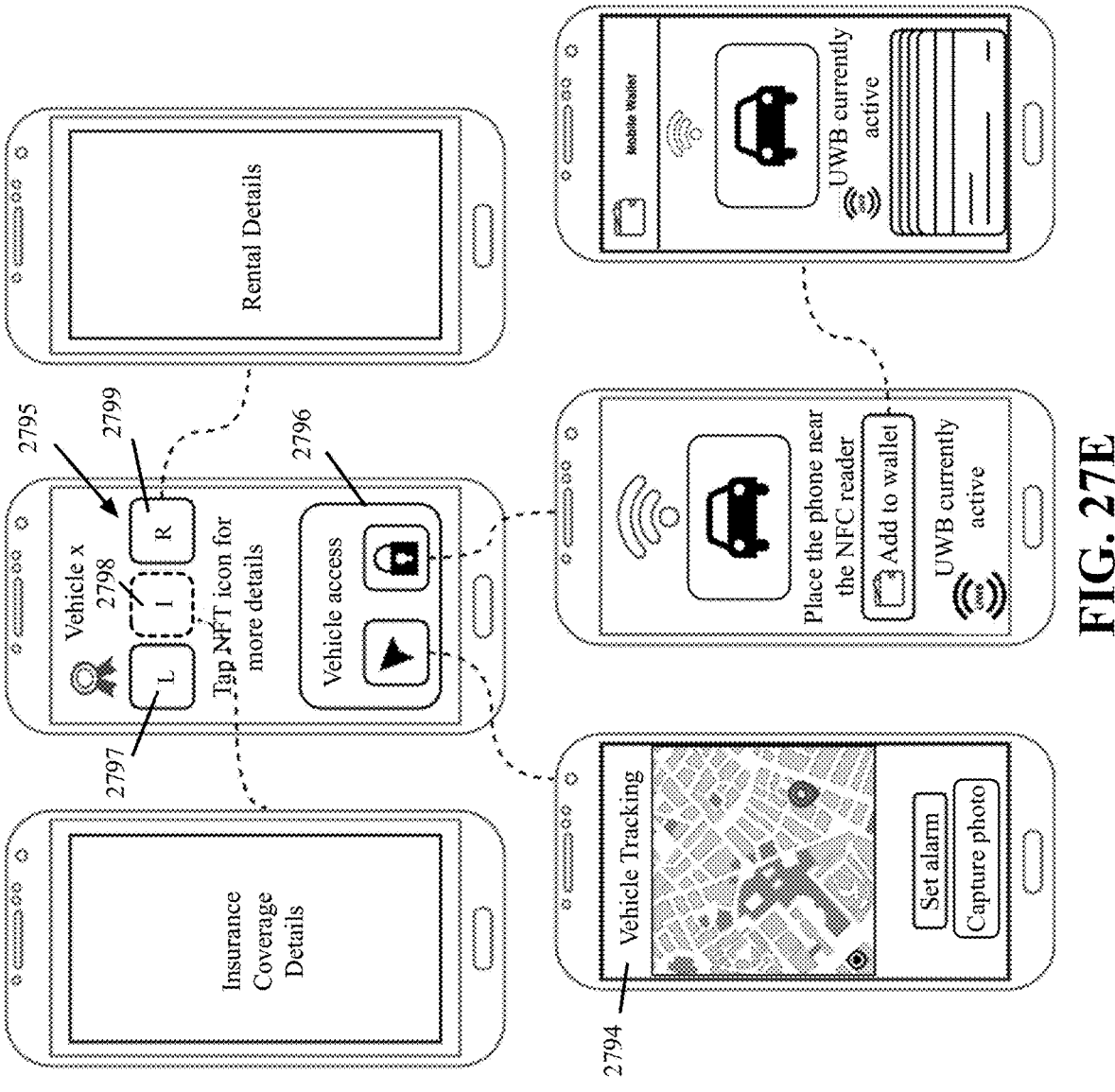
FIG. 27E is a functional diagram illustrating how a renter may gain access to the essential documents and the NFTs via their electronic devices, according to various aspects of the present disclosure.

FIG. 27E is a functional diagram illustrating how a renter may gain access to the essential documents and the NFTs via their electronic devices, according to various aspects of the present disclosure. As shown, the users may be welcomed with the dashboard with NFT information 2795, and the vehicle access tools 2796. All NFTs which the user is in control of (e.g., the license NFTs 2797, the insurance NFTs 2798, and the rental NFTs 2799) may be displayed in solid lines in the NFT section. The client may click on each of them for more detailed information such as the insurance coverage or license number and expiration date. After the rental contract has been signed, the rental NFT may be transferred to the renter. The insurance NFT is missing in this example, so that the renter may only gain limited access to the vehicle so that they may not be able to start up the vehicle. The insurance NFT may be minted via file upload after the vehicle is rented, the new renter may do so by uploading the ID card and the declaration page for the coverage. Once all three essential NFTs (rental, insurance, and license) are ready, the renter may obtain full access to the new vehicle.

As the renter taps the vehicle lock button, they may be provided with a digital key card which supports NFC and/or Ultra-wide band technology depending on the mobile device. The renter may have the option to save it to the mobile wallet built in their phone for easier access. Once they are on this page, the user may tap the phone on the vehicle lock or even walk close to the door with UWB technology and the vehicle will be unlocked automatically.

The tracking dashboard 2794 may allow the renter to see the live location, set an alarm to help them find the vehicle or capture an image of the surrounding area. Furthermore, the renter may also lock the vehicle at any time if the renter finds their vehicle is stolen. In this case, the access of the vehicle may be immediately removed. If the vehicle is still moving, it may slow down gradually for safety. For planes, it may trigger the auto landing procedure if available. A similar tracking dashboard as the tracking dashboard 2794 may also be provided to a client device of the owner of the vehicle to help them find the vehicle. The owner may also lock the vehicle at any time if the owner finds their vehicle is stolen or abused by the renter (e.g., if the renter has not returned the vehicle after the expiration of the rental period or if the renter is driving outside an agreed upon area).

The renter may have access to the NFT details by tapping the icon such as the license details, insurance coverages in effect and rental information including the valid time or other rules. The vehicle access tools may be similar to the owner's version. The renter may track the vehicle at any time by tapping the location button. The renter may track the live location, set an alarm to help them better locate the vehicle, or capture a photo for the surrounding area via the onboard camera. The vehicle lock function may provide access to the vehicle key. If the owner manually locks the vehicle remotely, the renter may not be able to unlock or start up the vehicle and the lock button may turn gray.

C. The Use of NFT Division Concept in Vehicle Transaction

The NFT division process entails splitting an NFT into two pieces, each containing a portion of the original NFT's information and mutually exclusive with the other piece. This theorem has particular relevance in vehicle rental use cases, where authorized use time may be divided as a splitable property. Additionally, other basic NFT operations like ownership transfer and combine may handle vehicle ownership and access by serving as proof of ownership or the right to use.

The vehicle market application may utilize several types of NFTs, such as, title/rental NFT, insurance NFT, and driver license NFT. The title NFT may function as a virtual title for the vehicle and may serve as proof of ownership. The rental NFT may serve as an authorization for use, assigned to test drives and rentals, and typically separate from the title NFT. the driver license NFT may be used as the proof that a person has a valid driver license. As operating a vehicle requires proof of insurance and license, the insurance and driver license NFTs may represent essential tokens throughout the entire process.

When breaking down the NFT details, each NFT type may have a 'type' property in the schema indicating its specific token type. Additionally, the 'status' field may represent whether the NFT is active or inactive. The title NFT may include the vehicle ID, while the rental NFT may also include an 'availability' property listing the owner-specified available time slots for rentals. Like the rental NFT, the insurance NFT may have a specific property for coverage which may state the authorized time period as well as the coverage details including the covered amount and deductible information.

Figure 28A:
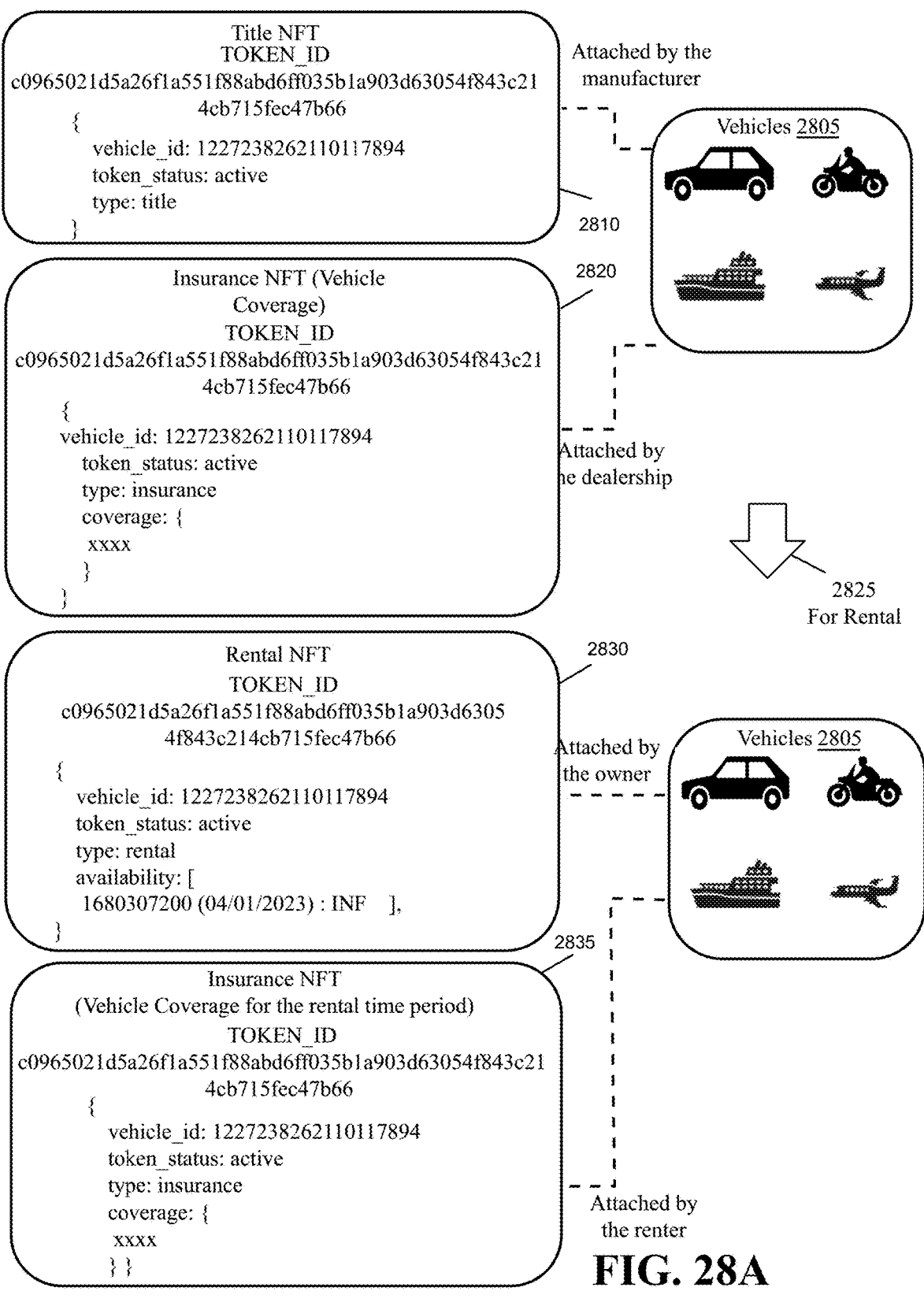
FIG. 28A is a functional diagram illustrating the application of the NFT concept in vehicle transactions and highlighting the different types of NFTs utilized in the system, according to various aspects of the present disclosure.

FIG. 28A is a functional diagram illustrating the application of the NFT concept in vehicle transactions and highlighting the different types of NFTs utilized in the system, according to various aspects of the present disclosure. The title NFT may serve as proof of vehicle ownership. The rental NFT may confirm legal vehicle usage for rental. The insurance NFT and the license NFT may certify the user's legality to operate the vehicle.

As shown in FIG. 28A, each vehicle 2805 may be assigned one title NFT 2810 at the time the vehicle comes out of the factory or is newly onboarded to the platform. This is a proof of the ownership which may be transferred from the manufacturer to the dealership during the time of transit. When the vehicle arrives at the dealership, the insurance NFT 2820 may be attached to the vehicle to insure the vehicle during the time at the store.

When the vehicle is ready for rental (as shown by 2825) by individual owners or rental companies, the rental NFT 2830 for the vehicle may be minted with a list of time availability indicated by the owner. In addition, since insurance may be mandatory for most of the vehicles during operations, the owner may also divide the insurance NFT 2820 in alignment with the time slots for the rental NFT 2830. For example, the insurance NFT 2835 may be minted to cover a vehicle for a rental period. The renter may take advantage of the vehicle coverage by paying some fee to the owner and bring or purchase insurance policy to cover for their body injury, financial protection and liability.

In order to access the vehicle, the user may provide several pieces of NFTs, such as, the title/rental NFT, the insurance NFT, and the license NFT. During the authentication process for vehicle locks or start button, the client needs to provide all required NFTs that may vary by use cases. In other words, owning different NFTs may grant the user with different access levels. By doing so, it is guaranteed that the vehicle operator may always have the right authorization to use the vehicle.

Figure 28B:
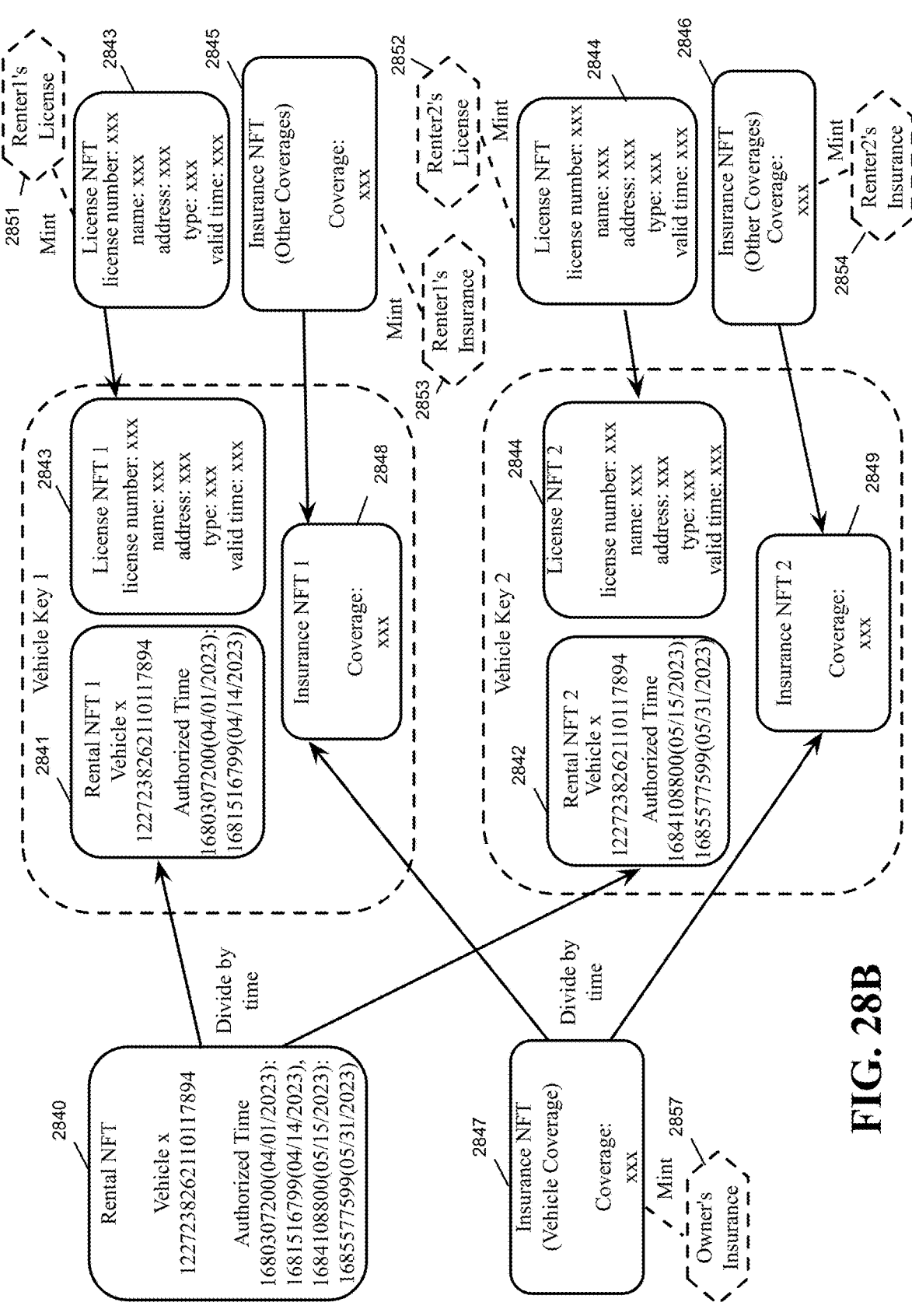
FIG. 28B illustrates an example of vehicle rental with two separate time slots alongside the corresponding rental NFT division process, according to various aspects of the present disclosure

FIG. 28B illustrates an example of vehicle rental with two separate time slots alongside the corresponding rental NFT division process, according to various aspects of the present disclosure. Suppose the original rental NFT indicated availability from April 1st to April 14th and May 15th to May 31st. In that case, the owner may split the rental NFT 2840 into two separate rental NFTs 2841 and 2842, each occupying a different time slot and enabling two different renters to use the vehicle.

To rent the vehicle, renters may present valid driver's licenses 2851-2852 and coverage declaration pages for their insurance policies 2853-2854, whether they buy a new policy or bring their own. New license NFTs 2843-2844 may be minted from the corresponding driver's licenses 2851-2852. New insurance NFTs 2845-2846 may be minted from the corresponding insurance policies 2853-2854. Vehicle coverage insurance NFT 2847 may be minted from the owner's insurance policy 2857. Vehicle coverage insurance from the owner and personal liability insurance from the renter may then be combined into comprehensive insurance NFTs 2848-2849, which may be used as virtual vehicle key to access the vehicle access at a later time.

Figure 28C:
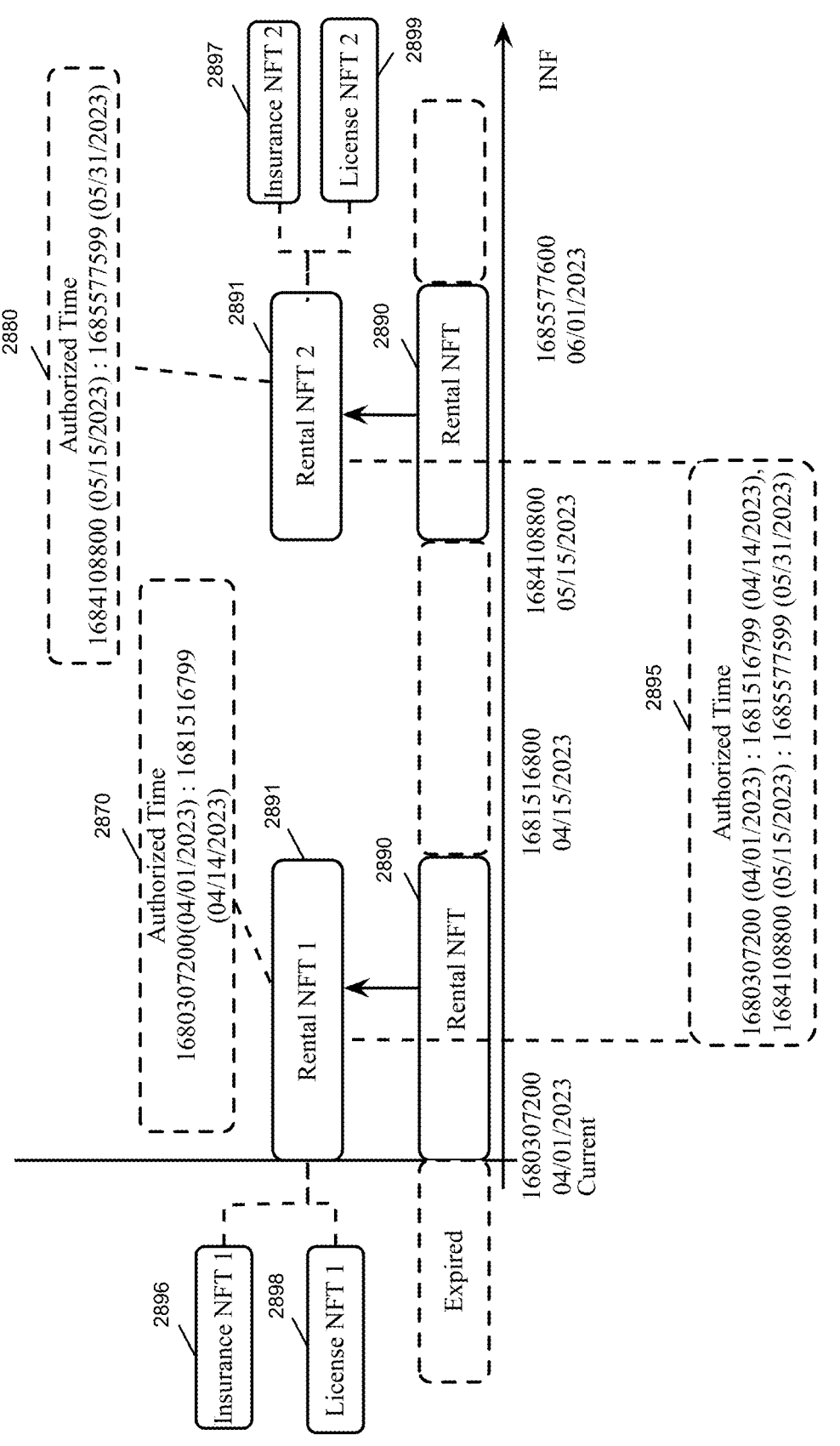
FIG. 28C is a time chart illustrating an example for the divide by time process, according to various aspects of the present disclosure.

FIG. 28C is a time chart illustrating an example for the divide by time process, according to various aspects of the present disclosure. As shown by the two authorized time periods 2870 and 2880, the initial rental NFT 2890 has the availability from April 1st to April 14th and from May 15th to May 31st as shown by 2895. Other portions with dashed lines may be related to the time periods the owner decides to keep the vehicle off the market. The two available time frames, one of which in April and the other for May are further divided into two exclusive rental NFTs named rental NFT 2891 and rental NFT 2892. The two NFTs 2891-2892 may be appointed to the same or two different clients. Once each rental NFT 2891-2892 is combined with the corresponding insurance NFT 2896-2897 and the corresponding license NFT 2898-2899, the renter may gain full access to the vehicle.

Figure 29:
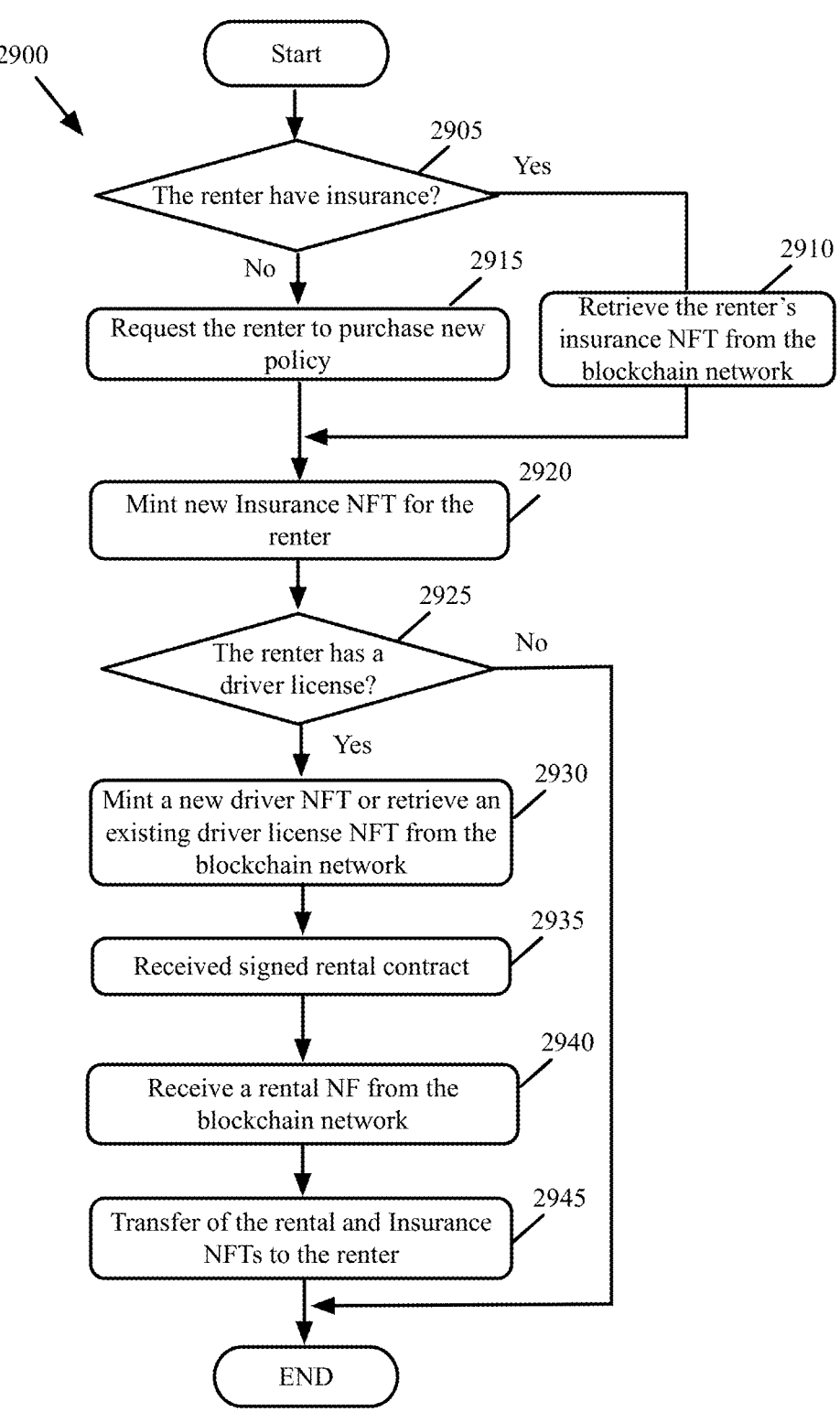
FIG. 29 is a flowchart illustrating a process for performing the NFT workflow for a new rental process, according to various aspects of the present disclosure.

The NFT smart contract service plays an important role in all NFT operations. The workflow and logic for common use cases is illustrated in the following flowcharts. FIG. 29 is a flowchart illustrating an example process 2900 for performing the NFT workflow for a new rental process, according to various aspects of the present disclosure. The process 2900 may be performed by a processor of a server, such as the backend server 115 of FIGS. 1A-1B.

After the vehicle rental contract is signed, the NFT ownership service may request for sales agreements and contracts. For a rental transaction, the insurance and the driver license may be required for driving a vehicle. For insurance, the platform 1-5 (FIG. 1A-1B) may grant the renter two options of purchasing a new insurance policy or uploading their current insurance.

With reference to FIG. 29, a determination may be made (at block 2905) whether the renter has insurance. If yes, the process may retrieve (at block 2910) the renter's insurance NFT from the blockchain network. The process 2900 may then proceed block 2920, which is described below. Otherwise, a request may be sent (at block 2915) to the renter to purchase a new insurance policy. A new insurance NFT may be minted (at block 2920). For example, after the renter purchases a liability insurance policy, an insurance NFT may be newly minted by combining the vehicle coverage insurance and the liability insurance purchased by the renter.

A determination may be made (at block 2925) whether the renter has a driver license. If not, the process 29 may end. Otherwise, at block 2930 a new driver license NFT may be minted or an existing driver NFT may be retrieved from the blockchain network. The signed rental contract may be received (at block 2935). A rental NFT may be received f (at block 2940) from the blockchain network. The rental NFT and the insurance NFT may be transferred (at block 2945) to the renter. The process 2900 may then end. A test drive may have a similar process as the process 2900 as a simplified version of the rental. For example, it may not be necessary for the test driver to sign a formal contract.

Figure 30:
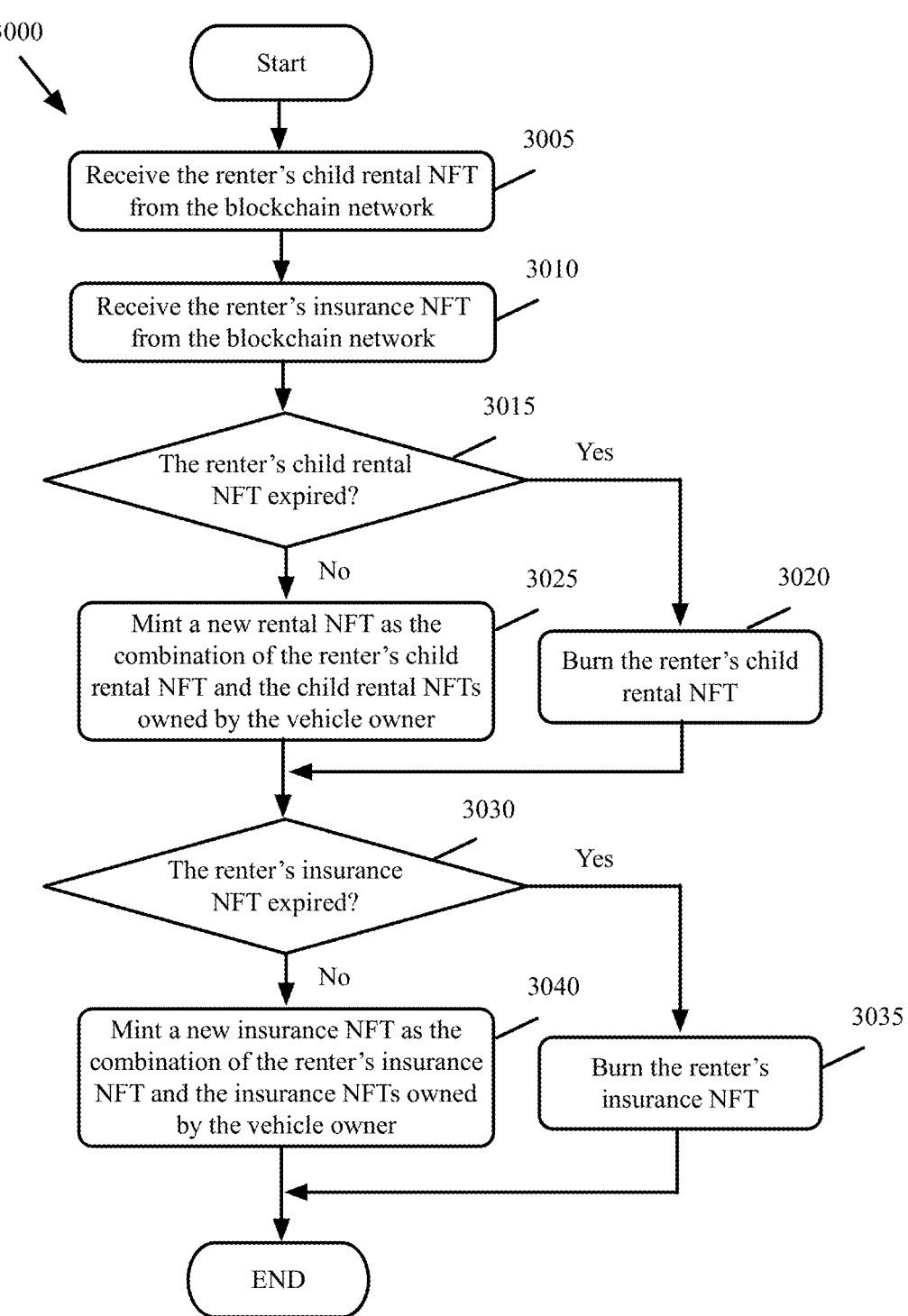
FIG. 30 is a flowchart illustrating a process for required steps after the vehicle rental ends, according to various aspects of the present disclosure.

FIG. 30 is a flowchart illustrating an example process 3005 for required steps after the vehicle rental ends, according to various aspects of the present disclosure. The process 3000 may be performed by a processor of a server, such as the backend server 115 of FIGS. 1A-1B. With reference to FIG. 30, the renter's child rental NFT may be received (at block 3005) from the blockchain network. The renter's insurance NFT may be received (at block 3010) from the blockchain network.

A determination may be made (at block 3015) whether the renter's child rental NFT has expired. If yes, the renter's child rental NFT may by burnt (at block 3020). The process 3000 may then proceed to block 3030, which is described below. Otherwise, a new rental NFT may be minted (at block 3025) as the combination of the renter's child rental NFT and the child rental NFTs owned by the vehicle owner.

At block 3030, a determination may be made whether the renter's insurance NFT has expired. If yes, the renter's insurance NFT may by burnt (at block 3035). The process 3000 may then end. Otherwise, a new insurance NFT may be minted (at block 3040) as the combination of the renter's insurance NFT and the insurance NFTs owned by the vehicle owner. The process 3000 may then end.

Figure 31:
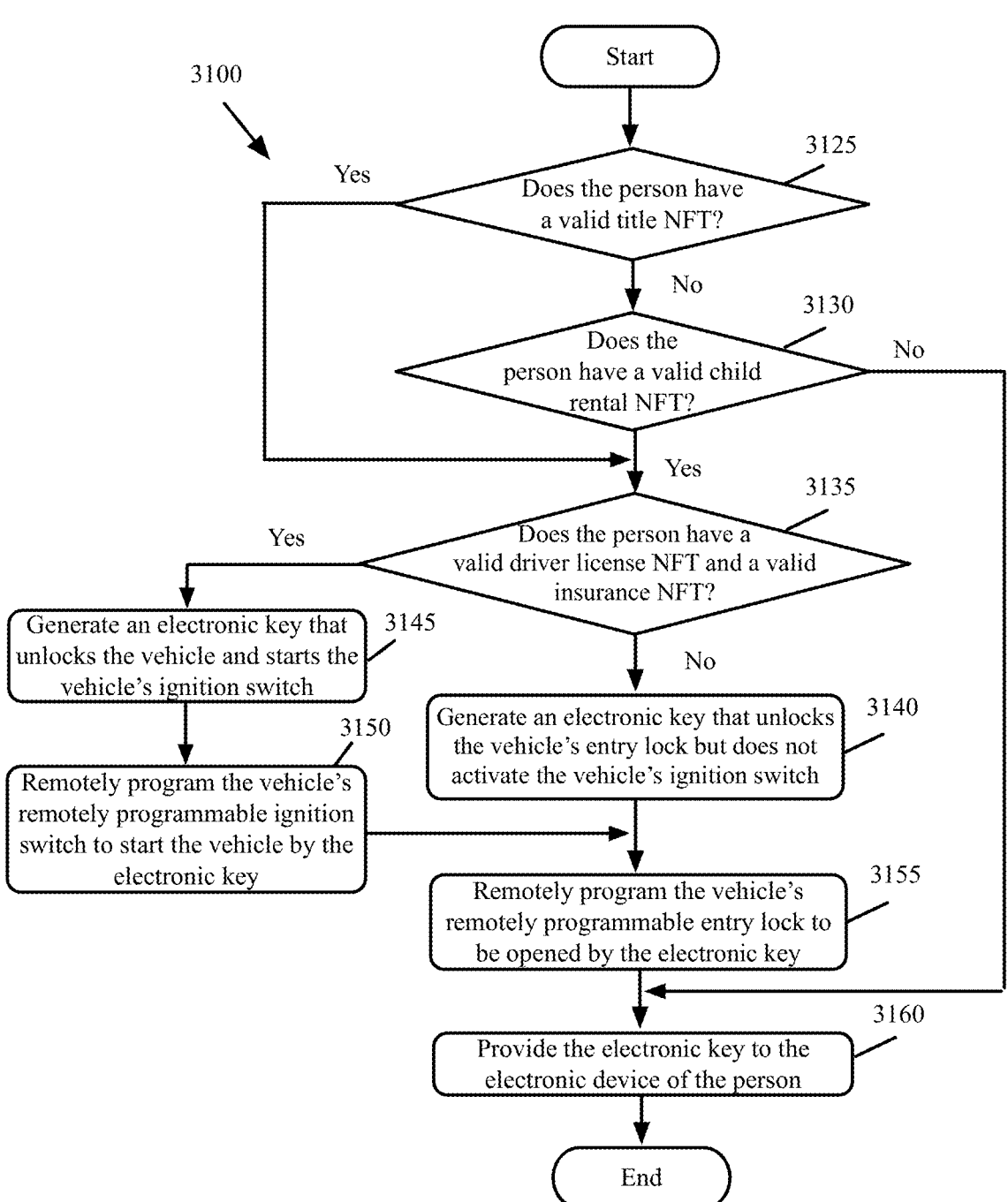
FIG. 31 is a flowchart illustrating a process for vehicle access under different circumstances, according to various aspects of the present disclosure.

As a nature of vehicle access, both the operator and passenger should have access to the vehicle but only the one with valid license and insurance may be able to start up and operate the vehicle. Some embodiments may provide limited access or full access to a vehicle. The two different levels of access may have different requirements. A person may only provide the title (e.g., when the person is the owner of the vehicle) or the child rental NFT (e.g., when the person is a renter) in order to unlock the door. Once a person decides to start up the vehicle, the person may need to provide the insurance and license NFTs. The system may then generate a virtual vehicle key based on the three pieces of information FIG. 31 is a flowchart illustrating an example process 3100 for vehicle access to a person under different circumstances, according to various aspects of the present disclosure. The process 3100 may be performed by a processor of a server, such as the backend server 115 of FIGS. 1A-1B. With reference to FIG. 31, a determination may be made (at block 3125) whether the person has a valid title NFT. For example, the person may be the owner of the vehicle and may provide a valid title NFT to the backend server 115. If yes, the process may proceed to block 3130, which is described below.

Otherwise, a determination may be made (at block 3130) whether the person has a valid child rental NFT. For example, the person may be the renter of the vehicle and may provide a valid child rental NFT to the backend server 115. If not, the person is neither the owner nor has a valid child rental NFT. The process 3100 may then end.

At block 3135, a determination may be made whether the person has a valid driver license NFT and a valid insurance NFT. If yes, the process 3100 may proceed to block 3145, which is described below. Otherwise, an electronic key may be remotely generated (at block 3140) that unlocks the vehicle's entry lock but does not activate the vehicle's ignition switch. The process 3100 may proceed to block 3155, which is described below.

At block 3145, an electronic key may be generated that unlocks the vehicle and starts the vehicle's ignition switch. The vehicle's remotely programmable entry lock may be remotely programmed (at block 3150) to start the vehicle by the electronic key. At block 3155, the vehicle's remotely programmable entry lock may be remotely programmed to be opened by the electronic key. The electronic key may be provided (at block 3160) to the electronic device of the person to access the vehicle. The process 3100 may then end.

d. Vehicle Access Hardware for the Application

Figure 32A:
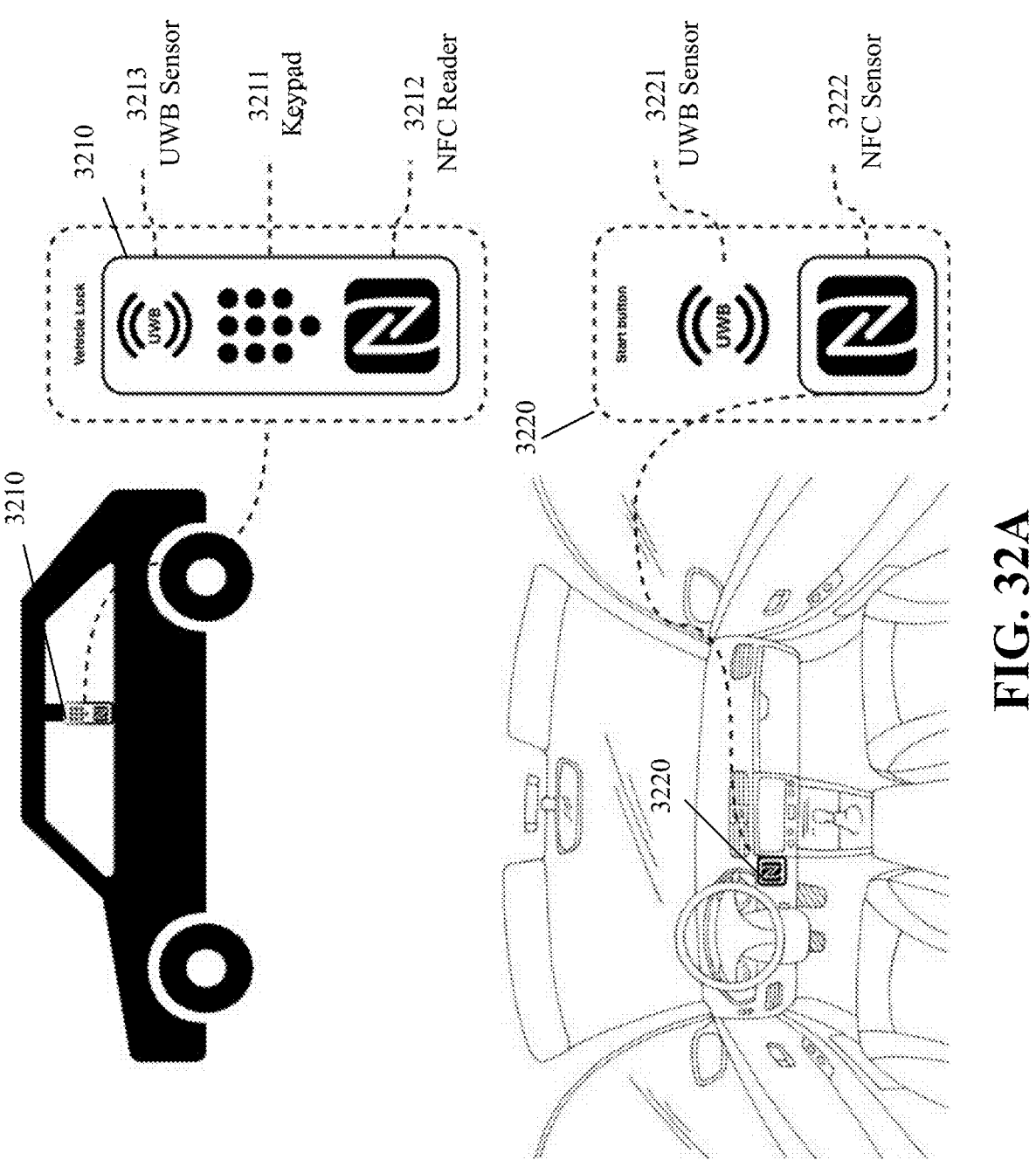
FIGS. 32A and 32B are functional diagrams illustrating the design of a smart vehicle lock, according to various aspects of the present disclosure.
Figure 32B:
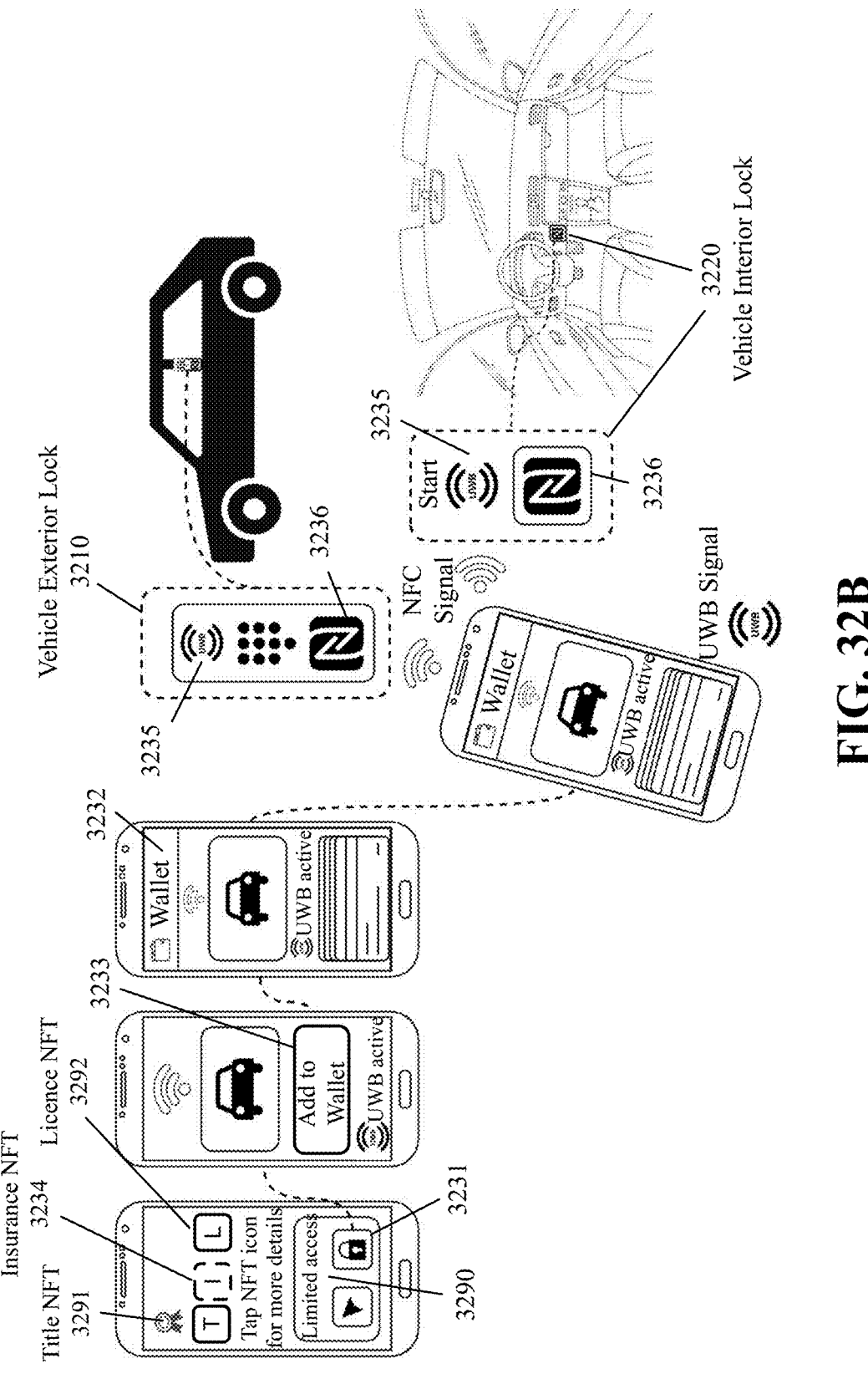

The hardware used for the system may include locks and tracking devices. FIGS. 32A and 32B are functional diagrams illustrating the design of a smart vehicle lock, according to various aspects of the present disclosure. FIG. 32A shows two types of vehicle locks, the exterior lock 3210 and the interior lock 3220. The exterior lock 3210 may be installed near the applicable door, such as the door pillar or handle of a car, or the door lock of a boat or other types of vehicles. The exterior lock 3210 may include a keypad 3211, an NFC reader 3212, and/or an ultra-wideband (UWB) sensor 3213, providing a seamless and effortless user experience.

The interior lock 3220 may be typically found close to the driver's seat and may be integrated into the vehicle's engine start button. Like the exterior lock 3210, the interior lock 3220 may include UWB sensors 3221 or NFC readers 3222 to ensure smooth functionality.

The details of the authentication steps are shown in FIG. 32B. The user may be able to access the key by tapping the lock button 3231 and from there they may also add the key to their mobile wallet 3232 by clicking the 'Add to wallet' button 3233. The key may be updated automatically if the information of NFTs in hand changes. The access level of the key may vary depending on which NFT the user has. For example, the key may have full access to the door as well as the vehicle start function only when the operator has all three valid NFTs in hand: the title/rental NFT 3291, the insurance NFT 3234, and the license NFT 3292. In the example of FIG. 32B, the insurance NFT 3234 is missing, represented by a dashed line which limits the user's full access to the vehicle (as shown by 3290).

On supported devices, the user may simply walk close to the vehicle and the ultra-wideband sensor 3235 may automatically detect the signal and unlock the door. Based on the NFT details, the locks and buttons on the vehicle may behave differently as explained previously. If the UWB technology is not supported on either the mobile device or the vehicle, NFC 3236 may be used as a backup method for access. Like many vehicles currently on the market, the user may simply tap their phone at the NFC reader to unlock.

Figure 33:
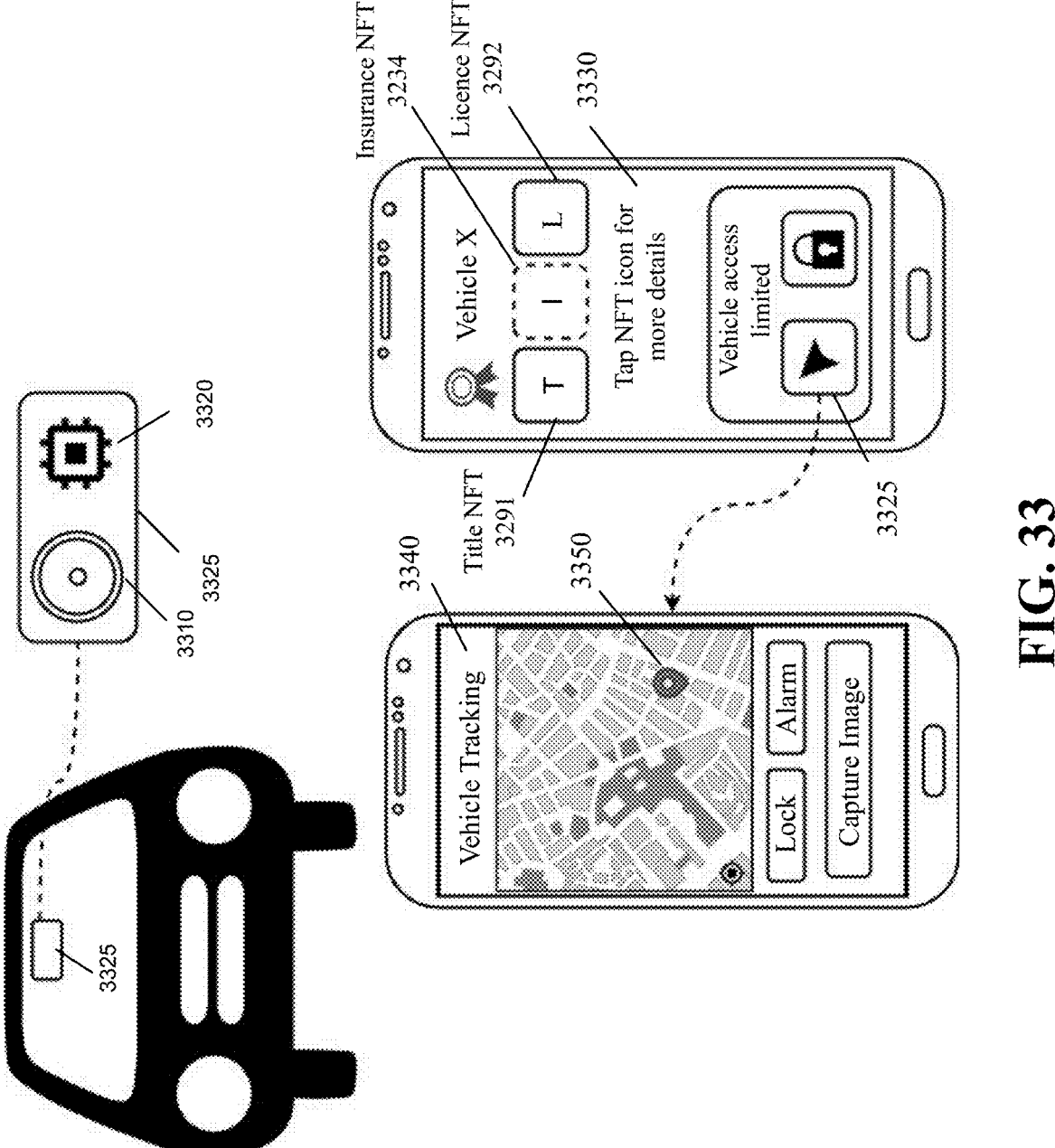
FIG. 33 is a functional diagrams illustrating the vehicle tracking hardware and user interfaces, according to various aspects of the present disclosure.

FIG. 33 is a functional diagram illustrating the vehicle tracking hardware and user interfaces, according to various aspects of the present disclosure. Tracking may be a critical feature for movable assets like vehicles. To ensure optimal tracking, each vehicle incorporated into the system may include a basic dash camera 3310 pointed forward and a high-precision GPS receiver 3320 (collectively shown as 3325). The GPS receiver 3320 may be accurately aligned with a network access device to transmit location details efficiently. The onboard system may capture location details and camera footage once per user-defined or system-default time period. The device may automatically adjust the accuracy of location details and the resolution of camera footage to guarantee optimal tracking capabilities. This way, the system may offer accurate details to the user effectively. With the tracking system in place, the rental experience is seamless, and both the owner and the renter may stay informed throughout the rental period. The cameras 2410 may be equipped at any position on a vehicle per requirements. The existing cameras and GPS chip pre-installed on the vehicle may be used by providing APIs for the onboard system to upload data.

FIG. 33 shows an example of the tracking user interface 3330. An authorized user may tap the location icon 3325 to get navigated to the tracking dashboard 3340. From there, they may see live location 3350 for the vehicle as the location data may be updated much more frequently when tracking. Moreover, the user may also gain the ability to lock the vehicle at any time or set an alarm. The user may also capture images to accurately locate the vehicle at any time.

Figures 34, 35:
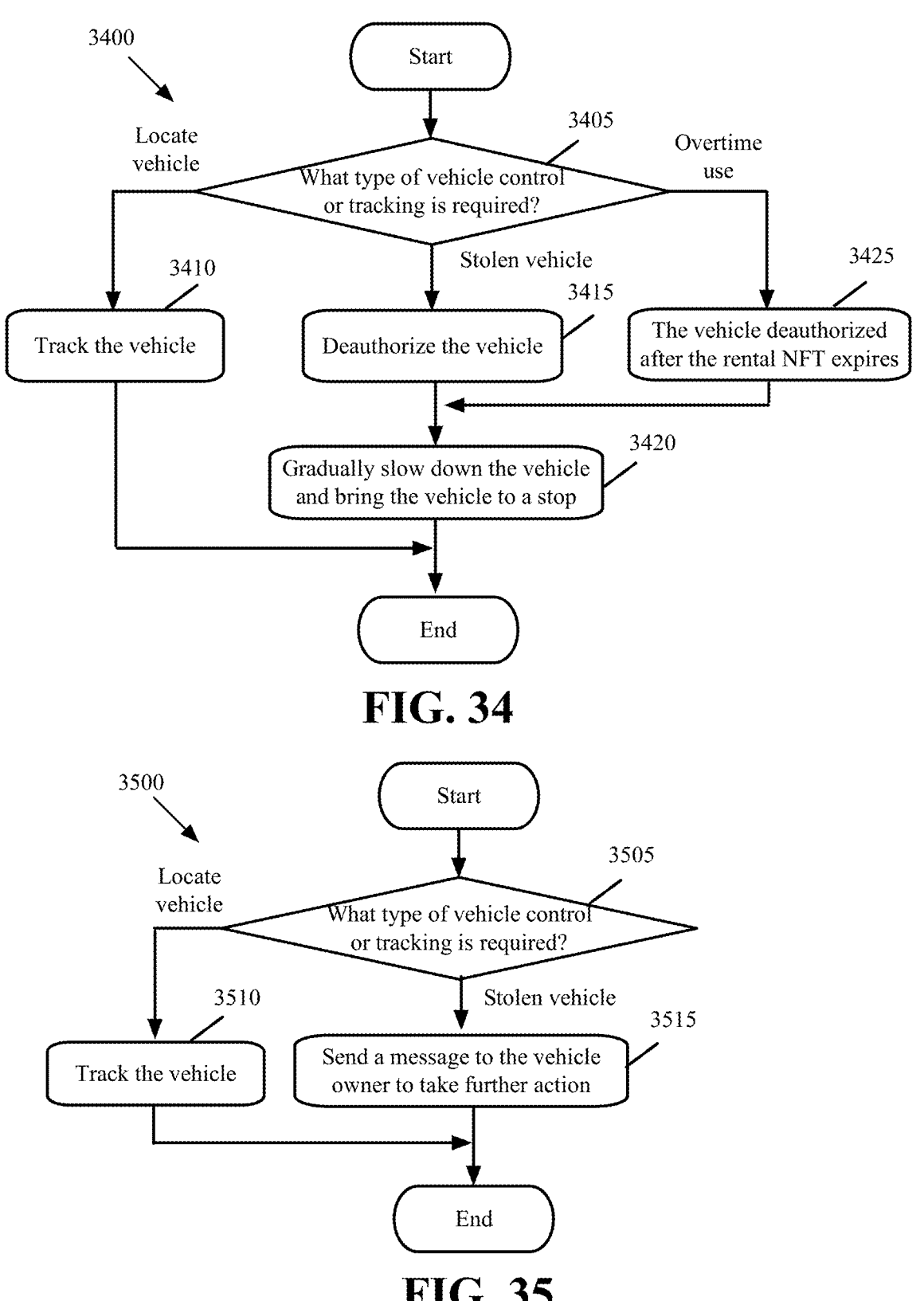
FIG. 34 is a flowchart illustrating a process for vehicle tracking and control by an owner, according to various aspects of the present disclosure.
FIG. 35 is a flowchart illustrating a process for vehicle tracking and control by a vehicle renter, according to various aspects of the present disclosure.

FIGS. 34-35 show the workflow for vehicle tracking and control is illustrated for the owner and renter, respectively. The level of control over the vehicle may vary depending on the user's role. As discussed above, the users' access level may be determined by the NFT they own. With the title NFT, the vehicle owner has the ability to track a reported stolen vehicle and take necessary actions. When a non-owner user (e.g., a renter) sends a lock request remotely, the vehicle may be deauthorized unless the owner authenticates it again. Following a deauthorize request, the vehicle may slow down gradually to ensure the safety of passengers, eventually coming to a complete stop. In addition, the system may take the same action if any of the NFTs have expired, for example, the renter has been using the vehicle for an extended period without returning it. The user may locate the vehicle like the owner. If the vehicle has been stolen, the user may report the incident to the owner immediately and the owner may take the next step.

FIG. 34 is a flowchart illustrating a process 3400 for vehicle tracking and control by an owner, according to various aspects of the present disclosure. The process 3400, in some embodiments, may be performed by a processor of a server, such as the backend server 115 of FIGS. 1A-1B.

With reference to FIG. 34, a determination may be made (at block 3405) for the type tracking or control required. If vehicle tracking is requested, the vehicle tracking is enabled, and the vehicle is tracked (at block 3410). The process 3400 may then end. If vehicle is reported as stolen, the vehicle is deauthorized (at block 3415). The vehicle is gradually slowed down (at block 3400) and is brought to a stop. The process 3400 may then end.

If vehicle is used after the end of the rental period, the vehicle is deauthorized (at block 3425) after the NFT rental expire. The process 3400 may then proceed to block 3420, which was described above.

FIG. 35 is a flowchart illustrating a process 3500 for vehicle tracking and control by a vehicle renter, according to various aspects of the present disclosure. The process 3500, in some embodiments, may be performed by a processor of a server, such as the backend server 115 of FIGS. 1A-1B.

With reference to FIG. 35, a determination may be made (at block 3505) for the type tracking or control required. If vehicle tracking is requested, the vehicle tracking is enabled, and the vehicle is tracked (at block 3510). The process 3500 may then end. If vehicle is reported as stolen, a message is sent (at block 3515) to the owner to take further action. For example, the owner may report the vehicle as stolen as described above with reference to FIG. 34. The process 3500 may then end.

The present embodiments provide the technical advantage of integrating bio-contracts which make the transactions standardized, ensuring a secure and consistent experience. Furthermore, the present embodiments' automation ensures instant settlement, reduces administrative overhead, and offers dynamic pricing. The inheritable NFT mechanism also provides the technical advantage of promoting interoperability with other platforms, potentially expanding the asset's ecosystem. The digital nature of these transactions minimizes the environmental footprint and allows for a global reach, revolutionizing the traditional approach to real estate and vehicle transactions and positioning the embodiments of the present disclosure as a superior advancement over previous methodologies.

Some of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 36:
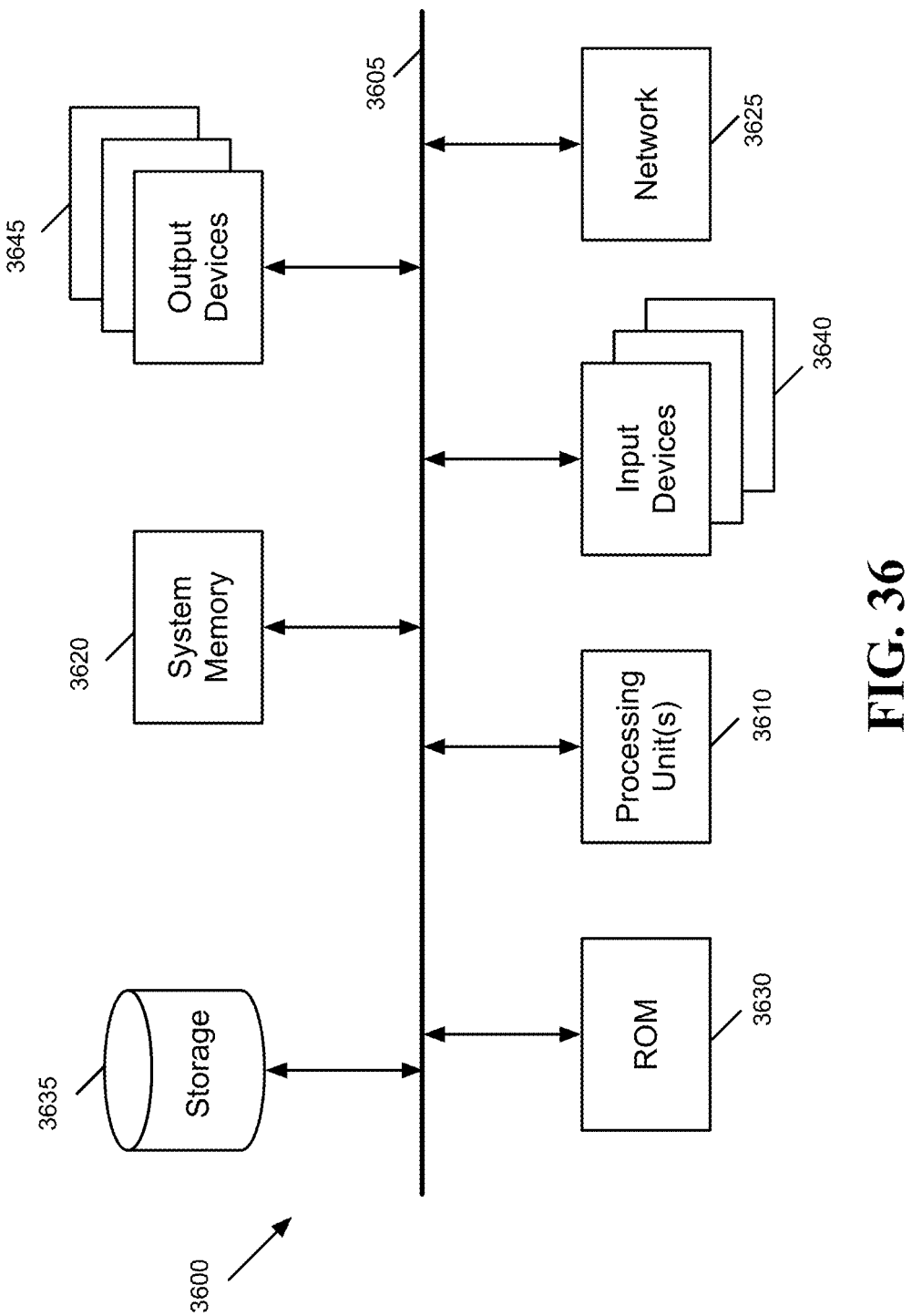
FIG. 36 conceptually illustrates an electronic system with which some embodiments of the invention are implemented.

FIG. 36 conceptually illustrates an electronic system 3600 with which some embodiments of the invention (e.g., the video game platform, the servers, the client devices, etc., described above) are implemented. The electronic system 3600 can be used to execute any of the control, virtualization, or operating system applications described above. The electronic system 3600 may be a computer (e.g., desktop computer, personal computer, tablet computer, server computer, mainframe, blade computer etc.), phone, PDA, or any other sort of electronic device. Such an electronic system includes various types of computer readable media and interfaces for various other types of computer readable media. Electronic system 3600 includes a bus 3605, processing unit(s) 3610, a system memory 3620, a read-only memory (ROM) 3630, a permanent storage device 3635, input devices 3640, and output devices 3645.

The bus 3605 collectively represents all system, peripheral, and chipset buses that communicatively connect the numerous internal devices of the electronic system 3600. For instance, the bus 3605 communicatively connects the processing unit(s) 3610 with the read-only memory 3630, the system memory 3620, and the permanent storage device 3635.

From these various memory units, the processing unit(s) 3610 retrieve instructions to execute and data to process in order to execute the processes of the invention. The processing unit(s) may be a single processor or a multi-core processor in different embodiments.

The read-only-memory 3630 stores static data and instructions that are needed by the processing unit(s) 3610 and other modules of the electronic system. The permanent storage device 3635, on the other hand, is a read-and-write memory device. This device is a non-volatile memory unit that stores instructions and data even when the electronic system 3600 is off. Some embodiments of the invention use a mass-storage device (such as a magnetic or optical disk and its corresponding disk drive) as the permanent storage device 3635.

Other embodiments use a removable storage device (such as a floppy disk, flash drive, etc.) as the permanent storage device. Like the permanent storage device 3635, the system memory 3620 is a read-and-write memory device. However, unlike storage device 3635, the system memory is a volatile read-and-write memory, such as random-access memory. The system memory stores some of the instructions and data that the processor needs at runtime. In some embodiments, the invention's processes are stored in the system memory 3620, the permanent storage device 3635, and/or the read-only memory 3630. From these various memory units, the processing unit(s) 3610 retrieve instructions to execute and data to process in order to execute the processes of some embodiments.

The bus 3605 also connects to the input and output devices 3640 and 3645. The input devices enable the user to communicate information and select commands to the electronic system. The input devices 3640 include alphanumeric keyboards and pointing devices (also called "cursor control devices"). The output devices 3645 display images generated by the electronic system. The output devices include printers and display devices, such as cathode ray tubes (CRT) or liquid crystal displays (LCD). Some embodiments include devices, such as a touchscreen, that function as both input and output devices.

Finally, as shown in FIG. 36, bus 3605 also couples electronic system 3600 to a network 3625 through a network adapter (not shown). In this manner, the computer can be a part of a network of computers (such as a local area network ("LAN"), a wide area network ("WAN"), an Intranet, or a network of networks, such as the Internet. Any or all components of electronic system 3600 may be used in conjunction with the invention.

Some embodiments include electronic components, such as microprocessors, storage, and memory, that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

In a first aspect, a method of renting rentable items using NFTs is provided. The method receives, by a server in communication with a distributed ledger system via a network, a request from an owner of a rentable item to list the rentable item for rent. The method causes the distributed ledger system, by the server, to mint a rental NFT for the rentable item and assign the rental NFT to the owner of the rentable item. The method lists, by the server, the rentable item for rent and receives a request, by the server, from a rent applicant to rent the rentable item for a first set of one or more time durations. The method, in response to the request to rent the rentable item, causes the distributed ledger system, by the server, to mint a first set of one or more child rental NFTs, where each child rental NFT in the first set of child rental NFTs associated with a time duration in the first set of time durations, assign the first set of child rental NFTs to the rent applicant, mint a second set of one or more child rental NFTs for the rentable item for time durations other than the first set of time durations, assign the second set of child rental NFTs to the owner of the rentable item, and burn the rental NFT. The method provides a confirmation of the renting of the rentable item for the first set of time durations to the rent applicant and to the owner of the rentable item.

In an embodiment of the first aspect where the rental NFT is a first rental NFT, the method further receives a request from the rent applicant to return a first child rental NFT in the first set of child rental NFTs, determines that the time duration associated with the first child rental NFT is not expired and there is at least a second NFT in the second set of child rental NFTs is associated with an unexpired time period, in response to the determination, sends an authorization request to the owner to authorize the return of the at least one child NFT and receives an authorization from the owner for the return of the at least one child NFT. The method, in response to receiving the authorization, causes the distributed ledger system, by the server, to mint a second rental NFT for the combined duration of the first and the at least second child rental NFTs, assign the second rental NFT to the owner, and burn the first and the at least second child NFTs.

In another embodiment of the first aspect where the rentable item is a real property that includes a remotely programmable entry lock, the method further receives, by the server, one of a facial image, a fingerprint, a voice recording, or a 3D face point cloud of the rent applicant from an electronic device associated with the rent applicant, and remotely programs, by the server, the entry lock of the real property to unlock after recognizing the facial image, the fingerprint, the voice recording, or the face point cloud o of the rent applicant during the set of one or more time durations.

In another embodiment of the first aspect where the rentable item is a real property that includes a remotely programmable entry lock, the method further assigns, by the server, one of a bar code or an NFC tag to the rent applicant, remotely programs, by the server, the entry lock of the real property to unlock after recognizing the bar code or the NFC tag during the set of one or more time durations, and sends the bar code or the NFC tag to an electronic device associated with the rent applicant.

In another embodiment of the first aspect where the rentable item is a vehicle that includes a remotely programmable ignition switch that requires an electronic key provided by a mobile electronic device to start, the method further provides, by the server, an electronic key to a mobile electronic device of the rent applicant to start the vehicle, determines, by the server, that the rent applicant has not provided an evidence of insurance, and in response to the determination, remotely programs the ignition switch of the vehicle not to start with the electronic key provided to a mobile electronic device of the rent applicant.

In another embodiment of the first aspect the method further receives, by the server, an evidence of insurance from the rent applicant and in response to receiving the evidence of insurance, remotely programming the ignition switch of the vehicle by the server to start with the electronic key provided to a mobile electronic device of the rent applicant.

In another embodiment of the first aspect the method, in response to receiving the evidence of insurance, causes the distributed ledger system, by the server, to mint an insurance NFT and assigns the insurance NFT to the rent applicant for use as the evidence of insurance in the future by the rent applicant.

In another embodiment of the first aspect where the rentable item is a vehicle that includes a remotely programmable ignition switch requiring an electronic key provided by a mobile electronic device to start, the method further provides, by the server an electronic key to a mobile electronic device of the rent applicant to start the vehicle, determines, by the server, that the rent applicant has not provided an evidence of having a driver license, and in response to the determination, remotely programming the ignition switch of the vehicle not to start with the electronic key provided to a mobile electronic device of the rent applicant.

In another embodiment of the first aspect the method further receives, by the server, an evidence of having a driver license from the rent applicant and in response to receiving the evidence of having the driver license, remotely programming the ignition switch of the vehicle by the server to start with the electronic key provided to a mobile electronic device of the rent applicant.

In another embodiment of the first aspect, the method, in response to receiving the evidence of having the driver license, causes the distributed ledger system, by the server, to mint a driver license NFT and assigns the driver license NFT to the rent applicant for use as the evidence of having the driving in the future by the rent applicant.

In another embodiment of the first aspect where the rentable item is a vehicle that includes a remotely programmable entry lock, the method further receives, by the server, one of a facial image, a fingerprint, a voice recording, or a 3D face point cloud of the rent applicant from an electronic device associated with the rent applicant and remotely programs, by the server, the entry lock of the vehicle to unlock after recognizing the facial image, the fingerprint, the voice recording, or the face point cloud of the rent applicant during the set of one or more time durations.

In another embodiment of the first aspect where the rentable item is a vehicle that includes a remotely programmable entry lock, the method further assigns, by the server, one of a bar code or an NFC tag to the rent applicant, remotely programs, by the server, the entry lock of the vehicle to unlock after recognizing the bar code or the NFC tag during the set of one or more time durations, and sends the bar code or the NFC tag to an electronic device associated with the rent applicant.

In a second aspect, a method of renting rentable items using NFTs is provided. The method receives, by a server in communication with a distributed ledger system via a network, a request from an owner of a rentable item to list the rentable item for rent. The method causes the distributed ledger system, by the server, to mint a rental NFT for the rentable item and assign the rental NFT to the owner of the rentable item. The method receives, by the server a request from the owner of the rentable item to list the rentable item for rent for a first time duration, the request includes instructions to divide the first time duration into several time durations for rent. The method, in response to the request to list the rentable item for rent, causes the distributed ledger system, by the server, to mint several child rental NFTs, each child rental NFT associated with a time duration in the several time durations, assign the several child rental NFTs to the owner, and burn the rental NFT. The method lists the rentable item for rent for the several time durations and receives a request by the server from a rent applicant to rent the rentable item for a second time duration in the several time durations. The method in response to the request to rent the rentable item for the second time duration, causes the distributed ledger system, by the server, to transfer the child rental NFT associated with the second time duration to the rent applicant. The method provides a confirmation of the renting of the rentable item for the second time duration to the rent applicant and to the owner of the rentable item.

In an embodiment of the second aspect, the method further receives a request from the rent applicant to return a first child rental NFT in the first set of child rental NFTs, determining that the time duration associated with the first child rental NFT is not expired, in response to the determination, sends an authorization request to the owner to authorize the return of the at least one child NFT, receives an authorization from the owner for the return of the at least one child NFT, and in response to receiving the authorization, causes the distributed ledger system, by the server, to transfer the second rental NFT to the owner.

In another embodiment of the second aspect where the rentable item is a real property that includes a remotely programmable entry lock, the method further assigns, by the server, one of a bar code or an NFC tag to the rent applicant, remotely programs, by the server, the entry lock of the real property to unlock after recognizing the bar code or the NFC tag during the set of one or more time durations, and sends the bar code or the NFC tag to an electronic device associated with the rent applicant.

In another embodiment of the second aspect where the rentable item is a vehicle that includes a remotely programmable ignition switch that requires an electronic key provided by a mobile electronic device to start, the method further provides, by the server, an electronic key to a mobile electronic device of the rent applicant to start the vehicle, determines, by the server, that the rent applicant has not provided an evidence of insurance, and in response to the determination, remotely programs the ignition switch of the vehicle not to start with the electronic key provided to a mobile electronic device of the rent applicant.

In another embodiment of the second aspect the method further receives, by the server, an evidence of insurance from the rent applicant and in response to receiving the evidence of insurance, remotely programming the ignition switch of the vehicle by the server to start with the electronic key provided to a mobile electronic device of the rent applicant.

In another embodiment of the second aspect the method, in response to receiving the evidence of insurance, causes the distributed ledger system, by the server, to mint an insurance NFT and assigns the insurance NFT to the rent applicant for use as the evidence of insurance in the future by the rent applicant.

In another embodiment of the second aspect where the rentable item is a vehicle that includes a remotely programmable ignition switch requiring an electronic key provided by a mobile electronic device to start, the method further provides, by the server an electronic key to a mobile electronic device of the rent applicant to start the vehicle, determines, by the server, that the rent applicant has not provided an evidence of having a driver license, and in response to the determination, remotely programming the ignition switch of the vehicle not to start with the electronic key provided to a mobile electronic device of the rent applicant.

In another embodiment of the second aspect the method further receives, by the server, an evidence of having a driver license from the rent applicant and in response to receiving the evidence of having the driver license, remotely programming the ignition switch of the vehicle by the server to start with the electronic key provided to a mobile electronic device of the rent applicant.

In another embodiment of the second aspect, the method, in response to receiving the evidence of having the driver license, causes the distributed ledger system, by the server, to mint a driver license NFT and assigns the driver license NFT to the rent applicant for use as the evidence of having the driving in the future by the rent applicant.

In another embodiment of the second aspect where the rentable item is a vehicle that includes a remotely programmable entry lock, the method further receives, by the server, one of a facial image, a fingerprint, a voice recording, or a 3D face point cloud of the rent applicant from an electronic device associated with the rent applicant and remotely programs, by the server, the entry lock of the vehicle to unlock after recognizing the facial image, the fingerprint, the voice recording, or the face point cloud of the rent applicant during the set of one or more time durations.

In another embodiment of the second aspect where the rentable item is a vehicle that includes a remotely programmable entry lock, the method further assigns, by the server, one of a bar code or an NFC tag to the rent applicant, remotely programs, by the server, the entry lock of the vehicle to unlock after recognizing the bar code or the NFC tag during the set of one or more time durations, and sends the bar code or the NFC tag to an electronic device associated with the rent applicant.

In a third aspect, a method of renting real properties using NFTs is provided. The method receives, by a server in communication with a distributed ledger system via a network, a request from an owner of a real property to list the real property for rent. The method causes the distributed ledger system, by the server, to mint a rental NFT for real property and assign the rental NFT to the owner of the real property. The method receives, by the server, a request from the owner of the real property to list the real property for rent, where the request includes instructions to divide the real property into several spaces for rent, where each space is for renting for a corresponding set of one or more time durations. The method lists the several spaces of the real property for rent for the corresponding set of one or more time durations, and receives a request, by the server, from a rent applicant to rent a first space in the several spaces for a first time duration in the corresponding set of one or more time durations. The method, in response to receiving the request from the rent applicant, causes the distributed ledger system, by the server, to mint several child rental NFTs, where each child rental NFT is associated with a space in the several spaces and a time duration of the set of one or more time durations corresponding to the space, assign a first child rental NFT in the several child rental NFTs that is associated with the first space and the first time duration to the rent applicant, assign the child rental NFTs in the several associated other than the first child rental NFT to the owner of the real property, and burn the rental NFT. The method provides a confirmation of the renting of the first space to the rent applicant and the owner of the real property.

In a fourth aspect, a method of renting real properties using NFTs is provided. The method receives, by a server in communication with a distributed ledger system via a network, a request from an owner of a real property to list the real property for rent. The method causes the distributed ledger system, by the server, to mint a rental NFT for the real property and assign the rental NFT to the owner of the real property. The method receives, by the server a request from the owner of the real property to list the real property for rent, where the request includes instructions to divide the real property into several spaces for rent, where each space is for renting for a corresponding set of one or more time durations. The method, in response to the request to list the real property for rent, causes the distributed ledger system, by the server, to mint several child rental NFTs, each child rental NFT associated with a space in the several spaces and a time duration of the set of one or more time durations corresponding to the space, assign the several child rental NFTs to the owner, and burn the rental NFT. The method lists the several spaces of the real property for rent for the corresponding set of one or more time durations, and receives a request, by the server, from a rent applicant to rent a first space in the several spaces for a first time duration in the corresponding set of one or more time durations. The method, in response to receiving the request from the rent applicant, causes the distributed ledger system, by the server, to transfer a first child rental NFT in the several child rental NFTs that is associated with the first space and the first time duration to the rent applicant and provides a confirmation of the renting of the rentable item for the second time duration to the rent applicant and to the owner of the rentable item.

In a fifth aspect, a non-transitory computer readable medium storing a program for renting rentable items using NFTs is provided. The program is executable by at least one processor of a server in communication with a distributed ledger system via a network. The program includes sets of instructions for receiving a request from an owner of a rentable item to list the rentable item for rent, causing the distributed ledger system to mint a rental NFT for the rentable item and assign the rental NFT to the owner of the rentable item, listing the rentable item for rent, receiving a request from a rent applicant to rent the rentable item for a first set of one or more time durations, in response to the request to rent the rentable item, causing the distributed ledger system to mint a first set of one or more child rental NFTs, each child rental NFT in the first set of child rental NFTs associated with a time duration in the first set of time durations, assign the first set of child rental NFTs to the rent applicant, mint a second set of one or more child rental NFTs for the rentable item for time durations other than the first set of time durations, assign the second set of child rental NFTs to the owner of the rentable item and burn the rental NFT, and providing a confirmation of the renting of the rentable item for the first set of time durations to the rent applicant and to the owner of the rentable item.

What is claimed is:

1. A method of renting rentable items using non-fungible tokens (NFTs), the method comprising:

receiving, by a server in communication with a distributed ledger system via a network, a request from an owner of a rentable item to list the rentable item for rent for a plurality of time durations;

causing the distributed ledger system, by the server, to:

mint a rental NFT for the rentable item, the rental NFT defining the plurality of time durations; and assign the rental NFT to the owner of the rentable item;

listing, by the server, the rentable item for rent;

receiving a request, by the server, from a rent applicant to rent the rentable item for a first set of one or more time durations in the plurality of time durations;

in response to the request to rent the rentable item, causing the distributed ledger system, by the server, to simultaneously:

mint a first set of one or more child rental NFTs, each child rental NFT in the first set of child rental NFTs associated with a time duration in the first set of time durations;

assign the first set of child rental NFTs to the rent applicant;

mint a second set of one or more child rental NFTs for the rentable item for a second set of time durations in the plurality of time durations, wherein the second set of time durations are time durations other than the first set of time durations;

assign the second set of child rental NFTs to the owner of the rentable item; and burn the rental NFT such that the rental NFT does not coexist with the first set and the second set of child rental NFTs on the distributed ledger system; and providing a confirmation of the renting of the rentable item for the first set of time durations to the rent applicant and to the owner of the rentable item.

2. The method of claim 1, wherein the rental NFT is a first rental NFT, the method further comprising:

receiving a request from the rent applicant to return a first child rental NFT in the first set of child rental NFTs;

determining that the time duration associated with the first child rental NFT is not expired and there is at least a second child rental NFT in the second set of child rental NFTs that is associated with an unexpired time period;

in response to the determination, sending an authorization request to the owner to authorize the return of the at least second child rental NFT;

receiving an authorization from the owner for the return of the at least second child rental NFT;

in response to receiving the authorization, causing the distributed ledger system, by the server, to simultaneously:

mint a second rental NFT for a combined duration of the first child rental NFT and the at least second child rental NFT;

assign the second rental NFT to the owner; and burn the first child rental NFT and the at least second child rental NFT such that the first child rental NFT and the at least second child rental NFT do not coexist with the second rental NFT on the distributed ledger system.

3. The method of claim 1, wherein the rentable item is a real property comprising a remotely programmable entry lock, the method further comprising:

receiving, by the server, one of a facial image, a fingerprint, a voice recording, or a three-dimensional (3D)

face point cloud of the rent applicant from an electronic device associated with the rent applicant; and remotely programming, by the server, the entry lock of the real property to unlock after recognizing the facial image, the fingerprint, the voice recording, or the face point cloud of the rent applicant during the first set of one or more time durations.

4. The method of claim 1, wherein the rentable item is a real property comprising a remotely programmable entry lock, the method further comprising:

assigning, by the server, one of a bar code or a near field communication (NFC) tag to the rent applicant;

remotely programming, by the server, the entry lock of the real property to unlock after recognizing the bar code or the NFC tag during the first set of one or more time durations; and sending the bar code or the NFC tag to an electronic device associated with the rent applicant.

5. The method of claim 1, wherein the rentable item is a vehicle comprising a remotely programmable ignition switch requiring an electronic key provided by a mobile electronic device to start, the method further comprising:

providing, by the server, an electronic key to a mobile electronic device of the rent applicant to start the vehicle;

determining, by the server, that the rent applicant has not provided an evidence of insurance; and in response to the determination, remotely programming the ignition switch of the vehicle not to start with the electronic key provided to the mobile electronic device of the rent applicant.

6. The method of claim 5 further comprising:

receiving, by the server, an evidence of insurance from the rent applicant; and in response to receiving the evidence of insurance, remotely programming the ignition switch of the vehicle by the server to start with the electronic key provided to the mobile electronic device of the rent applicant.

7. The method of claim 6 further comprising:

in response to receiving the evidence of insurance, causing the distributed ledger system, by the server, to mint an insurance NFT; and assigning the insurance NFT to the rent applicant for use as the evidence of insurance in the future by the rent applicant.

8. The method of claim 1, wherein the rentable item is a vehicle comprising a remotely programmable ignition switch requiring an electronic key provided by a mobile electronic device to start, the method further comprising:

providing, by the server, an electronic key to a mobile electronic device of the rent applicant to start the vehicle;

determining, by the server, that the rent applicant has not provided an evidence of having a driver license; and in response to the determination, remotely programming the ignition switch of the vehicle not to start with the electronic key provided to the mobile electronic device of the rent applicant.

9. The method of claim 8 further comprising:

receiving, by the server, an evidence of having a driver license from the rent applicant; and in response to receiving the evidence of having the driver license, remotely programming the ignition switch of the vehicle by the server to start with the electronic key provided to the mobile electronic device of the rent applicant.

10. The method of claim 9 further comprising:

in response to receiving the evidence of having the driver license, causing the distributed ledger system, by the server, to mint a driver license NFT; and assigning the driver license NFT to the rent applicant for use as the evidence of having the driving in the future by the rent applicant.

11. The method of claim 1, wherein the rentable item is a vehicle comprising a remotely programmable entry lock, the method further comprising:

receiving, by the server, one of a facial image, a fingerprint, a voice recording, or a three-dimensional (3D) face point cloud of the rent applicant from an electronic device associated with the rent applicant; and remotely programming, by the server, the entry lock of the vehicle to unlock after recognizing the facial image, the fingerprint, the voice recording, or the face point cloud of the rent applicant during the first set of one or more time durations.

12. The method of claim 1, wherein the rentable item is a vehicle comprising a remotely programmable entry lock, the method further comprising:

assigning, by the server, one of a bar code or a near field communication (NFC) tag to the rent applicant;

remotely programming, by the server, the entry lock of the vehicle to unlock after recognizing the bar code or the NFC tag during the first set of one or more time durations; and sending the bar code or the NFC tag to an electronic device associated with the rent applicant.

13. A non-transitory computer readable medium storing a program for renting rentable items using non-fungible tokens (NFTs), the program executable by at least one processor of a server in communication with a distributed ledger system via a network, the program comprising sets of instructions for:

receiving a request from an owner of a rentable item to list the rentable item for rent for a plurality of time durations;

causing the distributed ledger system to:

mint a rental NFT for the rentable item, the rental NFT defining the plurality of time durations; and assign the rental NFT to the owner of the rentable item;

listing the rentable item for rent;

receiving a request from a rent applicant to rent the rentable item for a first set of one or more time durations in the plurality of time durations;

in response to the request to rent the rentable item, causing the distributed ledger system to simultaneously:

mint a first set of one or more child rental NFTs, each child rental NFT in the first set of child rental NFTs associated with a time duration in the first set of time durations;

assign the first set of child rental NFTs to the rent applicant;

mint a second set of one or more child rental NFTs for the rentable item for a second set of time durations in the plurality of time durations, wherein the second set of time durations are time durations other than the first set of time durations;

assign the second set of child rental NFTs to the owner of the rentable item; and burn the rental NFT such that the rental NFT does not coexist with the first set and the second set of child rental NFTs on the distributed ledger system; and providing a confirmation of the renting of the rentable item for the first set of time durations to the rent applicant and to the owner of the rentable item.

14. The non-transitory computer readable medium of claim 13, wherein the rentable item is a real property comprising a remotely programmable entry lock, the program further comprising sets of instructions for:

receiving, by the server, one of a facial image, a fingerprint, a voice recording, or a three-dimensional (3D) face point cloud of the rent applicant from an electronic device associated with the rent applicant; and remotely programming, by the server, the entry lock of the real property to unlock after recognizing the facial image, the fingerprint, the voice recording, or the face point cloud of the rent applicant during the first set of one or more time durations.

15. The non-transitory computer readable medium of claim 13, wherein the rentable item is a real property comprising a remotely programmable entry lock, the program further comprising sets of instructions for:

assigning, by the server, one of a bar code or a near field communication (NFC) tag to the rent applicant;

remotely programming, by the server, the entry lock of the real property to unlock after recognizing the bar code or the NFC tag during the first set of one or more time durations; and sending the bar code or the NFC tag to an electronic device associated with the rent applicant.

16. The non-transitory computer readable medium of claim 13, wherein the rentable item is a vehicle comprising a remotely programmable ignition switch requiring an electronic key provided by a mobile electronic device to start, the program further comprising sets of instructions for:

providing, by the server, an electronic key to a mobile electronic device of the rent applicant to start the vehicle;

determining, by the server, that the rent applicant has not provided an evidence of insurance; and in response to the determination, remotely programming the ignition switch of the vehicle not to start with the electronic key provided to the mobile electronic device of the rent applicant.

17. The non-transitory computer readable medium of claim 16, the program further comprising sets of instructions for:

receiving, by the server, an evidence of insurance from the rent applicant; and in response to receiving the evidence of insurance, remotely programming the ignition switch of the vehicle by the server to start with the electronic key provided to the mobile electronic device of the rent applicant.

18. The non-transitory computer readable medium of claim 17, the program further comprising sets of instructions for:

in response to receiving the evidence of insurance, causing the distributed ledger system, by the server, to mint an insurance NFT; and assigning the insurance NFT to the rent applicant for use as the evidence of insurance in the future by the rent applicant.

19. The non-transitory computer readable medium of claim 13, wherein the rentable item is a vehicle comprising a remotely programmable ignition switch requiring an electronic key provided by a mobile electronic device to start, the program further comprising sets of instructions for:

providing, by the server, an electronic key to a mobile electronic device of the rent applicant to start the vehicle;

determining, by the server, that the rent applicant has not provided an evidence of having a driver license; and in response to the determination, remotely programming the ignition switch of the vehicle not to start with the electronic key provided to the mobile electronic device of the rent applicant.

20. The non-transitory computer readable medium of claim 13, wherein the rental NFT is a first rental NFT, the program further comprising sets of instructions for:

receiving a request from the rent applicant to return a first child rental NFT in the first set of child rental NFTs;

determining that the time duration associated with the first child rental NFT is not expired and there is at least a second child rental NFT in the second set of child rental NFTs that is associated with an unexpired time period;

in response to the determination, sending an authorization request to the owner to authorize the return of the at least second child rental NFT;

receiving an authorization from the owner for the return of the at least second child rental NFT;

in response to receiving the authorization, causing the distributed ledger system, by the server, to simultaneously:

mint a second rental NFT for a combined duration of the first child rental NFT and the at least second child rental NFT;

assign the second rental NFT to the owner; and burn the first child rental NFT and the at least second child rental NFT such that the first child rental NFT and the at least second child rental NFT do not coexist with the second rental NFT on the distributed ledger system.

* * * * *